United States Patent
Rezazadeh et al.

(10) Patent No.: US 8,515,182 B2
(45) Date of Patent: Aug. 20, 2013

(54) METHOD AND SYSTEM FOR DETERMINING A QUALITY MEASURE FOR AN IMAGE USING MULTI-LEVEL DECOMPOSITION OF IMAGES

(75) Inventors: Soroosh Rezazadeh, Montreal (CA); Stephane Coulombe, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 534 days.

(21) Appl. No.: 12/906,112

(22) Filed: Oct. 17, 2010

(65) Prior Publication Data

US 2011/0038548 A1 Feb. 17, 2011

Related U.S. Application Data

(63) Continuation-in-part of application No. 12/499,928, filed on Jul. 9, 2009, now Pat. No. 8,326,046.

(60) Provisional application No. 61/151,784, filed on Feb. 11, 2009, provisional application No. 61/304,274, filed on Feb. 12, 2010.

(51) Int. Cl.
*G06K 9/48* (2006.01)

(52) U.S. Cl.
USPC ........... 382/199; 382/100; 382/232; 382/233; 382/260; 382/240

(58) Field of Classification Search
USPC ................. 382/100, 199, 232, 233, 128, 240, 382/260, 243, 246, 250, 251, 203; 375/240.18
See application file for complete search history.

(56) References Cited

U.S. PATENT DOCUMENTS

| | | | |
|---|---|---|---|
| 5,799,112 A | 8/1998 | De Queiroz et al. | |
| 6,005,978 A | 12/1999 | Garakani et al. | |
| 6,594,391 B1 | 7/2003 | Quadranti et al. | |
| 7,228,006 B2 | 6/2007 | Stubler et al. | |
| 7,483,486 B2 | 1/2009 | Mantiuk et al. | |
| 8,213,735 B2 | 7/2012 | Cooksey et al. | |
| 2002/0009142 A1 | 1/2002 | Aono et al. | |
| 2003/0169928 A1 | 9/2003 | Stanek | |
| 2004/0146205 A1* | 7/2004 | Becker et al. | 382/232 |
| 2006/0072838 A1* | 4/2006 | Chui et al. | 382/232 |
| 2009/0097721 A1 | 4/2009 | Kingsbury et al. | |
| 2009/0304273 A1* | 12/2009 | Fukuhara | 382/166 |
| 2010/0008574 A1 | 1/2010 | Ishiga | |
| 2010/0048242 A1 | 2/2010 | Rhoads et al. | |
| 2010/0202700 A1 | 8/2010 | Rezazadeh et al. | |
| 2011/0033119 A1 | 2/2011 | Rezazadeh et al. | |
| 2011/0212717 A1 | 9/2011 | Rhoads et al. | |

OTHER PUBLICATIONS

M. Miyahara, K. Kotani, and V. R. Algazi, "Objective Picture Quality Scale (PSQ) for Image Coding", IEEE Trans. Commun., vol. 46, No. 9, pp. 1215-1225, Sep. 1998.

(Continued)

*Primary Examiner* — Ali Bayat
(74) *Attorney, Agent, or Firm* — IP-Mex Inc.; Victoria Donnelly

(57) ABSTRACT

Method and system for determining a measure of quality for images by using multi-level decomposition are presented. Multi-level decomposition of images is performed in the wavelet domain producing subbands at each level of decomposition. Aggregation of subbands is performed across multiple levels to produce an accurate measure of image quality. By aggregating only selected subbands the computational complexity of the method is greatly reduced.

49 Claims, 41 Drawing Sheets

(56) References Cited

OTHER PUBLICATIONS

N. Ponomarenko, F Battisti, K. Egiazarian, J. Astola, and V. Lukin, "Metrics performance comparison for color image database," in Proceedings Fourth International Workshop on Video Processing and Quality Metrics for Consumer Electronics, Jan. 2009, Arizona, USA.
Z.Wang, E. P. Simoncelli, "Translation insensitive image similarity in complex wavelet domain", in Proc. IEEE Int. Conf. Acoustics, Speech, Signal Process., vol. 2, Mar. 2005, pp. 573-576.
M. P. Sampat, Z. Wang, S Gupta, A.C. Bovik, and M. K. Markey, "Complex wavelet structural similarity: A new image similarity index", IEEE Trans. Image Process., vol. 18, No. 11, pp. 2385-2401, Nov. 2009.
H. R. Sheikh, A. C. Bovik, and G. de Veciana, "An information fidelity criterion for image quality assessment using natural scene statistics," IEEE Trans. Image Process., vol. 14, No. 12, pp. 2117-2128, Dec. 2005.
S. L. P. Yasakethu, W.A. C. Fernando, S Adedoyin, and A. Kondoz, "A rate control technique for off line H.264/AVC video coding using subjective quality of video." IEEE Trans. Consum. Electron., vol. 54, No. 3, pp. 1465-1472, Aug. 2008.
M. R. Bolin, and G. W. Meyer, "A visual difference metric for realistic image synthesis," in Proc. SPIE Human Vision, Electron. Imag., vol. 3644, San Jose, pp. 106-120, 1999.
Y.-K. Lai, C.-C. J. Kuo, "A Haar wavelet approach to compressed image quality measurement," J. Visual Commun. Imag. Represent., vol. 11, No. 1, pp. 17-40, Mar. 2000.
Z. Wang's SSIM Research Homepage [Online]. Available at: http://www.ece.uwaterloo.ca/~z70wang/research/ssim/.
J. L. Mannos, and D. J. Sakrison, "The effects of a visual fidelity criterion on the encoding of images," IEEE Trans. Inf. Theory, vol. IT-20, No. 4, pp. 525-536, Jul. 1974.
T. Mitsa, and K. L. Varkur, "Evaluation of contrast sensitivity functions for the formulation of quality measures incorporated in halftoning algorithms," in Proc. IEEE Int. Conf. Acoustics, Speech, Signal Processing, vol. 5, pp. 301-304, Apr. 1993.
Intel 64 and IA32 Architectures Optimization Reference Manual, Intel Corporation, Nov. 2009.
Final report from the Video Quality Experts Group on the validation of Objective Models of Video Quality Assessment, Phase II VQEG, available at: http://www.vqeg.org, Aug. 2003.
Y.Wang, J.Ostermann and Y.-Q Zhang "Video Processing Communications" Prentice Hall, 2001.
Rezazadeh et al., "A Novel Approach for Computing and Pooling Structural Similarity Index in the Discrete Wavelet Domain", 2009 16th IEEE International Conference on Image Processing (ICIP), p. 2209-2212.
Chen et al., "Fast Structural Similarity Index Algorithm" 2010 IEEE International Conference on Acoustics Speech and Signal Processing (ICASSP) p. 994-991.
Shapiro, "Embedded Image Coding Using Zerotrees of Wavelet Coefficients", IEEE Transactions on Signal Processing, vol. 41, Issue:12, 1993, p. 3445-3462.
Z. Wang et al., Image Quality Assessment: From Error Visibility to Structural Similarity, IEEE Transactions on Image Processing, vol. 13, No. 4, pp. 600-612, Apr. 2004.
H.R. Sheikh et al., A Statistical Evaluation of Recent Full Reference Image Quality Assessment Algorithms, IEEE Transactions on Image Processing, vol. 15, No. 11, pp. 3441-3452, Nov. 2006.
Z. Wang et al., Multi-Scale Structural Similarity for Image Qualitiy Assessment, 37th IEEE Asilomar Conference on Signals, Systems and Computers, pp. 1398-1402, Nov. 2003.
D.M. Rouse et al., Understanding and Simplifying the Structural Similarity Metric, IEEE International Conference on Image Processing, San Diego, pp. 1188-1191, Oct. 2008.
C.-L. Yang et al., Discrete Wavelet Transform-Based Structural Similarity for Image Quality Assessment, IEEE International Conference on Image Processing, San Diego, pp. 377-380, Oct. 2008.
Z. Wang et al., Spatial Pooling Strategies for Perceptual Image Quality Assessment, IEEE International Conference on Image Processing, Atlanta, pp. 2945-2948, Oct. 2006.
H.R. Sheikh et al., Image Information and Visual Quality, IEEE Transactions on Image Processing, vol. 15, No. 2, pp. 430-444, Feb. 2006.
Z.Wang et al., Modern Image Quality Assessment, Morgan and Claypool, United States, p. 416, 2006.
Z.Wang and A.C.Bovik, "Mean squared error: Love it or leave it? A new look at signal fidelity measures", IEEE Signal Process.Mag., bol.26, No. 1, pp. 98-117, Jan. 2009.
Tampere Image Database 2008 TID2008, Version 1.0, available at: http://www.ponomarenko.info/tid2008.htm.
A.C.Bovik, The Essential Guide to Image Processing. USA: Academic Press, 2009, ch.21.
S.Daly, "The visible difference predictor: An algorithm for the assessment of image fidelity", in Proc. SPIE, vol. 1616, Feb. 1992, pp. 2-15.
J.Lubin, "A visual discrimination mode for the image system design and evaluation" in Visual Models for Target Detection and Recognition, Singapore: World Scientific, 1995, pp. 207-220.
P.C.Teo and D.J.Heeger, Perceptual Image distortion, in Proc. IEEE. Int. Conf. Image Process., vol. 2, Nov. 1994, pp. 982-986.
D.M.Chandler, and S. S.Hemami, "VSNR: A wavelet-based visual signal-to-noise ratio for natural images" IEEE Trans.Image Process., vol. 16, No. 9, pp. 2284-2298, Sep. 2007.
N.Damera-Venkata, T.D. Kite, W.S. Geisler, B. L. Evans, and A.C. Bovik , "Image quality assessment based on a degradation model" IEEE Trans.Image Process., vol. 9, No. 4, pp. 636-650, Apr. 2000.
H.R. Sheikh et al., LIVE Image Quality Assessment Database, Release 2, http://live.ece.utexas.edu/research/quality, Jan. 2010.
S. Rezazadeh and S. Coulombe, "Low-Complexity computation of visual information fidelity in the discrete wavelet domain," in Proc. IEEE Int. Conf. Acoustics, Speech, Signal Process., Dallas, TX, Mar. 2010, pp. 2438-2441.
Patrick Le Callet and Florent Autrusseau, "Subjective quality assessment IRCCyN/IVC database," available at: http://www.irccyn.ee-nantes.fr/ivcdb.
S. Rezazadeh and S. Coulombe, "A novel discrete wavelet transform framework for full reference image quality assessment" in Signal, Image and Video Processing, pp. 1-15, Sep. 2011.
http://sipi.usc.edu/database/database.php?volume=misc.

\* cited by examiner

| Distortion | PSNR$_A$ (N=2) | PSNR$_A$ (N=3) |
|---|---|---|
| JPEG | 0.9793 | 0.9847 |
| JPEG2000 | 0.9542 | 0.9623 |
| GWN | 0.9806 | 0.9719 |
| GBlur | 0.9241 | 0.9010 |
| FF | 0.8868 | 0.8505 |
| All Data | 0.9288 | 0.9254 |

Table I

*Figure 9(c)*

| Model | JPEG | JPEG2000 | GWN | GBlur | FF | All Data |
|---|---|---|---|---|---|---|
| SSIM$_{spatial}$ | 0.9504 | 0.9413 | 0.9747 | 0.8743 | 0.9449 | 0.9041 |
| SSIM$_{auto-scale}$ | 0.9778 | 0.9669 | 0.9817 | 0.9483 | 0.9545 | 0.9447 |
| SSIM$_{DWT}$ | 0.9832 | 0.9743 | 0.9781 | 0.9697 | 0.9736 | 0.9557 |
| Mean SSIM$_A$ | 0.9762 | 0.9699 | 0.9646 | 0.9548 | 0.9625 | 0.9412 |
| PSNR$_{spatial}$ | 0.8879 | 0.8996 | 0.9852 | 0.7835 | 0.8895 | 0.8701 |
| PSNR$_{A2}$ | 0.9793 | 0.9542 | 0.9806 | 0.9241 | 0.8868 | 0.9288 |
| PSNR$_{DWT2}$ | 0.9786 | 0.9549 | 0.9840 | 0.9233 | 0.9002 | 0.9300 |
| WSNR | 0.9692 | 0.9351 | 0.9776 | 0.9343 | 0.8983 | 0.9211 |
| AD$_{A2}$ | 0.9817 | 0.9587 | 0.9637 | 0.9307 | 0.9005 | 0.9350 |
| AD$_{A3}$ | 0.9834 | 0.9637 | 0.9328 | 0.9346 | 0.8630 | 0.9321 |
| AD$_{DWT2}$ | 0.9807 | 0.9578 | 0.9684 | 0.9252 | 0.9069 | 0.9347 |
| AD$_{DWT3}$ | 0.9832 | 0.9633 | 0.9390 | 0.9336 | 0.8759 | 0.9370 |
| DWT-VIF$_A$ | 0.9856 | 0.9735 | 0.9904 | 0.9615 | 0.9611 | 0.9639 |
| DWT-VIF | 0.9850 | 0.9741 | 0.9879 | 0.9661 | 0.9658 | 0.9654 |
| VIF | 0.9864 | 0.9773 | 0.9901 | 0.9742 | 0.9677 | 0.9593 |

Table II

| Model | JPEG | JPEG2000 | GWN | GBlur | FF | All Data |
|---|---|---|---|---|---|---|
| SSIM$_{spatial}$ | 9.9106 | 8.5151 | 6.2560 | 8.9663 | 9.3253 | 11.6736 |
| SSIM$_{auto\text{-}scale}$ | 6.6751 | 6.4368 | 5.3321 | 5.8625 | 8.4956 | 8.9603 |
| SSIM$_{DWT}$ | 5.8192 | 5.6861 | 5.8323 | 4.5158 | 6.5048 | 8.0446 |
| Mean SSIM$_A$ | 6.9082 | 6.1465 | 7.3787 | 5.4907 | 7.7287 | 9.2270 |
| PSNR$_{spatial}$ | 14.6532 | 11.0174 | 4.7918 | 11.4784 | 13.0148 | 13.4685 |
| PSNR$_{A2}$ | 6.4439 | 7.5467 | 5.4853 | 7.0571 | 13.1668 | 10.1224 |
| PSNR$_{DWT2}$ | 6.5486 | 7.4927 | 4.9838 | 7.0947 | 12.4080 | 10.0404 |
| WSNR | 7.8400 | 8.9401 | 5.8895 | 6.5843 | 12.5139 | 10.6353 |
| AD$_{A2}$ | 6.0741 | 7.1794 | 7.4926 | 6.7566 | 12.3942 | 9.6890 |
| AD$_{A3}$ | 5.7792 | 6.7389 | 10.1739 | 6.5707 | 14.3923 | 9.8982 |
| AD$_{DWT2}$ | 6.2346 | 7.2506 | 6.9774 | 7.0121 | 12.0075 | 9.7191 |
| AD$_{DWT3}$ | 5.8100 | 6.7684 | 9.6913 | 6.6169 | 13.7480 | 9.5500 |
| DWT-VIF$_A$ | 5.3883 | 5.7682 | 3.8822 | 5.0783 | 7.8757 | 7.2755 |
| DWT-VIF | 5.4955 | 5.7091 | 4.3585 | 4.7703 | 7.3947 | 7.1226 |
| VIF | 5.2420 | 5.3498 | 3.9186 | 4.1669 | 7.1968 | 7.7122 |

Table III

*Figure 13*

| Model | JPEG | JPEG2000 | GWN | GBlur | FF | All Data |
|---|---|---|---|---|---|---|
| SSIM$_{spatial}$ | 0.9449 | 0.9355 | 0.9629 | 0.8944 | 0.9413 | 0.9104 |
| SSIM$_{auto\text{-}scale}$ | 0.9764 | 0.9614 | 0.9694 | 0.9517 | 0.9556 | 0.9479 |
| SSIM$_{DWT}$ | 0.9817 | 0.9677 | 0.9664 | 0.9703 | 0.9708 | 0.9601 |
| Mean SSIM$_A$ | 0.9738 | 0.9634 | 0.9490 | 0.9620 | 0.9622 | 0.9441 |
| PSNR$_{spatial}$ | 0.8809 | 0.8954 | 0.9854 | 0.7823 | 0.8907 | 0.8756 |
| PSNR$_{A2}$ | 0.9647 | 0.9499 | 0.9777 | 0.9219 | 0.8853 | 0.9307 |
| PSNR$_{DWT2}$ | 0.9647 | 0.9493 | 0.9820 | 0.9228 | 0.9012 | 0.9324 |
| WSNR | 0.9610 | 0.9292 | 0.9749 | 0.9330 | 0.8990 | 0.9240 |
| AD$_{A2}$ | 0.9666 | 0.9553 | 0.9805 | 0.9335 | 0.9067 | 0.9421 |
| AD$_{A3}$ | 0.9774 | 0.9609 | 0.9752 | 0.9386 | 0.8709 | 0.9415 |
| AD$_{DWT2}$ | 0.9659 | 0.9546 | 0.9835 | 0.9281 | 0.9140 | 0.9410 |
| AD$_{DWT3}$ | 0.9741 | 0.9605 | 0.9792 | 0.9329 | 0.8860 | 0.9446 |
| DWT-VIF$_A$ | 0.9837 | 0.9669 | 0.9848 | 0.9618 | 0.9597 | 0.9663 |
| DWT-VIF | 0.9826 | 0.9680 | 0.9858 | 0.9663 | 0.9648 | 0.9683 |
| VIF | 0.9845 | 0.9696 | 0.9858 | 0.9726 | 0.9649 | 0.9635 |

Table IV

*Figure 14*

METHOD AND SYSTEM FOR DETERMINING A QUALITY MEASURE FOR AN IMAGE USING MULTI-LEVEL DECOMPOSITION OF IMAGES

RELATED APPLICATIONS

This application is a Continuation-in-Part (CIP) of U.S. application Ser. No. 12/499,928 filed on Jul. 9, 2009, now U.S. Pat. No. 8,326,046 which claims priority from U.S. provisional application 61/151,784 filed on Feb. 11, 2009. This application also claims priority from the U.S. provisional application Ser. No. 61/304,274 filed on Feb. 12, 2010.

FIELD OF THE INVENTION

The present invention relates to the assessment of image quality, and in particular, to a method and system for determining an improved measure of quality or metric for images with enhanced perceptual performance.

BACKGROUND OF THE INVENTION

Assessment of quality of images is important in various contexts including image transcoding and compression. Transcoding of images is crucial in the dissemination of rich multimedia content comprising text, voice, still and animated graphics, photos, video clips, in heterogeneous networks composed of mobile terminals, cell phones, computers and other electronic devices. Image quality can be assessed by measuring similarity between an original image (often referred to as a reference image) and an image obtained after image processing (often referred to as a distorted image). Such an assessment of quality can be used for example to determine the effectiveness of an image processing technique.

Image quality assessment has an important role in developing various image and video processing applications including multimedia applications to provide acceptable outputs for the end-user, the human clients. Image quality is best evaluated subjectively by human viewers. However, subjective assessment of quality is time consuming, expensive, and cannot be done for real time applications. Thus, it is necessary to define an objective criterion that can measure the difference between the undistorted original image and the distorted image signals. Ideally, such an objective measure should correlate well with the perceived difference between two image signals and can vary linearly with the subjective quality. Subjective image quality is concerned with how processed images are perceived by a human viewer and designates his opinion of quality.

Objective methods are usually classified based on the availability of the reference images. If the reference image is available, the measure of quality or the quality metric is considered as a full-reference (FR) assessment measure. The peak signal-to-noise ratio (PSNR) is the oldest and most widely used FR assessment measure and has a number of attractive characteristics. It is simple, has clear physical meaning, is parameter free, and performs superbly in various optimization contexts as described by Z. Wang, and A. C. Bovik, in Mean squared error: Love it or leave it? A new look at signal fidelity measures, *IEEE Signal Processing Mag.*, vol. 26, no. 1, pp. 98-117, January 2009. This measure is defined as:

$$PSNR(X, Y) = 10 \cdot \log_{10}\left(\frac{X_{max}^2}{MSE(X, Y)}\right)$$

$$MSE(X, Y) = \frac{1}{N_P} \cdot \sum_{mn} (X(m, n) - Y(m, n))^2$$

where X and Y denote the reference (original) and distorted images respectively, $X_{max}$ is the maximum possible pixel value of the reference image X (the minimum pixel value is assumed to be zero), and $N_P$ is the number of pixels in each of the images.

The conventional PSNR, however, cannot sufficiently reflect the human perception of image fidelity, that is, a large PSNR gain may result in a small improvement in visual quality. Thus, a number of other quality measures have been developed by researches. Generally speaking, the FR assessment of image signals involves two types of approaches: a bottom-up approach and a top-down approach that are discussed in Z. Wang, and A. C. Bovik, in "*Modern Image Quality Assessment*", USA: Morgan & Claypool, 2006.

In the bottom-up approach, the perceptual measures of quality are best estimated by quantifying the visibility of errors. In order to quantize errors according to human visual system (HVS) features, techniques in this category try to model the functional properties of different stages of the HVS as characterized by both psychophysical and physiological experiments. This is usually accomplished in several stages of preprocessing, frequency analysis, contrast sensitivity analysis, luminance masking, contrast masking, and error pooling as described by Z. Wang, and A. C. Bovik, in "*Modern Image Quality Assessment*", USA: Morgan & Claypool, 2006 and by A. C. Bovik, in "*The Essential Guide to Image Processing*", USA: Academic Press, 2009, ch. 21. Most of HVS-based quality assessment techniques use multi-channel models which assume that each band of spatial frequencies is handled by an independent channel. With the visible difference predictor (VDP) model, discussed by S. Daly, in "The visible difference predictor: An algorithm for the assessment of image fidelity", *Proc. SPIE*, vol. 1616, February 1992, pp. 2-15, the image is decomposed into five spatial levels followed by six orientation levels using a variation of Watson's Cortex transform. Then, a threshold map is computed from the contrast in that channel. In Lubin's model, which is also known as the Sarnoff visual discrimination model (VDM) presented in "A visual discrimination mode for image system design and evaluation", *Visual Models for Target Detection and Recognition*, Singapore: World Scientific, 1995, pp. 207-220, the images are decomposed into seven resolutions after low-pass filtering and resampling. P. C. Teo and D. J. Heeger uses the steerable pyramid transform to decompose the image into several spatial frequency levels within which each level is further divided into a set of (six) orientation bands. Their approach is described in "Perceptual Image distortion", in *Proc. IEEE. Int. Conf. Image Processing*, vol. 2, November 1994, pp. 982-986. VSNR, discussed by D. M. Chandler, and S. S. Hemami, in "A wavelet-based visual signal-to-noise ratio for natural images", *IEEE Transactions on Image Processing*, vol. 16, no. 9, pp. 2284-2298, September 2007, is another advanced HVS-based metric that after image preprocessing decomposes both the reference image and errors between the reference and distorted images into five levels by using a discrete wavelet transform and 9/7 biorthogonal filters. Then, it computes the contrast detection threshold to assess the ability to detect the distortions for each subband produced by the wavelet decomposition. Other known methods based on the bottom-up approach which exploit Fourier transform rather than multiresolution decomposition include Weighted Signal to Noise Ratio (WSNR), discussed by N. Damera-Venkata, T. D. Kite, W. S. Geisler, B. L. Evans, and A. C. Bovik, in "Image quality assessment based on a degradation model", *IEEE Transactions on Image Processing*, vol. 9, no. 4, pp. 636-650, April 2000 and Picture Quality Scale (PQS) described by M. Miyahara, K. Kotani, and V. R. Algazi, in "Objective Picture Quality Scale (PQS) for image coding", *IEEE Transactions on Communication*, vol. 46, no. 9, pp. 1215-1225, September 1998. Methods based on the bottom-up approach have several important limitations, which are discussed by Z. Wang, and A. C. Bovik, in "*Modern Image Quality Assessment*", USA: Morgan & Claypool, 2006 and by Z. Wang, A. Bovik, H. Sheikh, and E. Simoncelli, in "Image quality assessment: From error visibility to structural similarity", *IEEE Transactions on Image Processing*, vol. 13, no. 4, pp. 600-612, April 2004. Moreover, the error-based techniques, such as WSNR, Noise Quality Measure (NQM), described by N. Damera-Venkata, T. D. Kite, W. S. Geisler, B. L. Evans, and A. C. Bovik, in "Image quality assessment based on a degradation model", *IEEE Transactions on Image Processing*, vol. 9, no. 4, pp. 636-650, April 2000 and VSNR discussed by D. M. Chandler, and S. S. Hemami in "VSNR: A wavelet-based visual signal-to-noise ratio for natural images", IEEE Transactions on Image Processing, vol. 16, no. 9, pp. 2284-2298, September 2007 are less simple to use, as they require sophisticated procedures to compute the human visual system (HVS) parameters.

With the techniques based on the top-down approach, the overall functionality of the HVS is considered as a black box, and the input/output relationship is the focus of attention. Thus, techniques following the top-down approach do not require any calibration parameters from the HVS or viewing configuration. Two main strategies in this category use a structural approach and an information-theoretic approach.

The most important method using the structural approach is the Structural Similarity (SSIM) index described by Z. Wang, A. Bovik, H. Sheikh, and E. Simoncelli, in "Image quality assessment: from error visibility to structural similarity", *IEEE Transactions on Image Processing*, vol. 13, no. 4, pp. 600-612, April 2004. As discussed by H. R. Sheikh, M. F. Sabir, and A. C. Bovik, in "A statistical evaluation of recent full reference image quality assessment algorithms", *IEEE Transactions on Image Processing*, vol. 15, no. 11, pp. 3440-3451, November 2006, SSIM gives an accurate score with acceptable computational complexity compared to other measures of quality. SSIM has attracted a great deal of attention in recent years, and has been considered for a range of applications. As described by Z. Wang, A. Bovik, H. Sheikh, and E. Simoncelli, in "Image quality assessment: from error visibility to structural similarity", *IEEE Transactions on Image Processing*, vol. 13, no. 4, pp. 600-612, April 2004, the principal idea underlying the SSIM approach is that the HVS is highly adapted to extract structural information from visual scenes, and, therefore, a measurement of structural similarity (or distortion) should provide a good approximation of perceptual image quality. Some approaches have tried to improve the SSIM index. The multi-scale SSIM discussed by Z. Wang, E. P. Simoncelli, and A. C. Bovik, in "Multi-scale structural similarity for image quality assessment", *Proc. IEEE Asilomar Conf. Signals, Systems, Computers*, vol. 2, November 2003, pp. 1398-1402, attempts to increase SSIM assessment accuracy by incorporating image details at five different resolutions by applying successive low-pass filtering and downsampling. In "Understanding and simplifying the structural similarity metric", *Proc. IEEE International Conference on Image Processing*, San Diego, October 2008, pp. 1188-1191, D. M. Rouse, and S. S. Hemami investing" Discrete wavelet transform-based structural similarity for image quality assessment", *Proc. IEEE International Conference on Image Processing*, San Diego, October 2008, pp. 377-380, propose to compute it in the discrete wavelet domain using subbands at different levels. Five-level decomposition using the Daubechies 9/7 wavelet is applied to both original and distorted images, and then SSIM is computed between corresponding subbands. Finally, the similarity measure is obtained by computing a weighted mean of all SSIMs. To determine the weights, a large number of experiments have been performed for measuring the sensitivity of the human eye to different frequency bands. Z. Wang, E. P. Simoncelli, in "Translation insensitive image similarity in complex wavelet domain", *Proc. IEEE International Conference on Acoustics, Speech, Signal Processing*, vol. 2, March 2005, pp. 573-576 and M. P. Sampat, Z. Wang, S. Gupta, A. C. Bovik, and M. K. Markey, in "Complex wavelet structural similarity: A new image similarity index", *IEEE Transactions on Image Processing*, vol. 18, no. 11, pp. 2385-2401, November 2009 discuss Complex Wavelet Structural Similarity (CW-SSIM), which benefits from a complex version of a 6-scale, 16-orientation steerable pyramid decomposition characteristic and propose a measure resistant to small geometrical distortions.

With the information-theoretic approach, visual quality assessment is viewed as an information fidelity problem. An information fidelity criterion (IFC) for image quality measurement that is based on natural scene statistics is presented by H. R. Sheikh, A. C. Bovik, and G. de Veciana, in "An information fidelity criterion for image quality assessment using natural scene statistics", *IEEE Transactions on Image Processing*, vol. 14, no. 12, pp. 2117-2128, December 2005. In the IFC, the image source is modeled by using a Gaussian scale mixture (GSM) while the image distortion process is modeled as an error-prone communication channel. The information shared between the images being compared is quantified by using the mutual information that is a statistical measure of information fidelity. Another information-theoretic quality metric is the "Visual Information Fidelity (VIF) index" discussed by H. R. Sheikh, and A. C. Bovik, in "Image information and visual quality", *IEEE Transactions on Image Processing*, vol. 15, no. 2, pp. 430-444, February 2006. The computation of the VIF index follows the same procedure as the IFC, except that, in the determination of the VIF index both the image distortion process and the visual perception process are modeled as error-prone communication channels. For the VIF measure, the HVS distortion channel is modeled with an additive white Gaussian noise. The VIF index is the most accurate image measure of quality according to the performance evaluation of prominent image quality assessment algorithms presented by H. R. Sheikh, M. F. Sabir, and A. C. Bovik, in "A statistical evaluation of recent full reference image quality assessment algorithms", *IEEE Transactions on Image Processing*, vol. 15, no. 11, pp. 3440-3451, November 2006.

Review of existing literature reveals a number of shortcomings of the prior art methods. The limitations of these prior art methods include the following.

First, computational complexity of the existing assessment techniques for accurately determining the measures of quality are very high. Some image/video processing applications, like identifying the best quantization parameters for each frame in video encoding described by S. L. P. Yasakethu, W. A. C. Fernando, S. Adedoyin, and A. Kondoz in a paper entitled "A rate control technique for off line H.264/AVC video coding using subjective quality of video", *IEEE Trans-* actions on Consumer Electronics, vol. 54, no. 3, pp. 1465-1472, August 2008, could be used more efficiently if an accurate low-complexity technique for determining the measure of quality (quality metric) were used.

Second, the bottom-up approach used by prior art methods requires that the associated techniques apply a multiresolution transform, decompose the input image into a large number of resolutions (five or more). While, the HVS is a complex system which is not completely known to us, combining the different bands into a final metric is difficult. In similar top-down methods such as multi-scale and multi-level SSIMs discussed by Z. Wang, E. P. Simoncelli, and A. C. Bovik, in "Multi-scale structural similarity for image quality assessment", *Proc. IEEE Asilomar Conf. Signals, Systems, Computers*, vol. 2, November 2003, pp. 1398-1402 and by C.-L. Yang, W.-R. Gao, cited earlier and L.-M. Po, in "Discrete wavelet transform-based structural similarity for image quality assessment", *Proc. IEEE Int. Conf. Image Processing*, San Diego, October 2008, pp. 377-380, cited earlier, determining the sensitivity of the HVS to different scales or subbands requires many experiments. Moreover, if the wavelet or filter is changed, the computed weights and parameters are no longer optimum and may not even be valid.

Third, top-down methods, such as SSIM, gather local statistics within a square sliding window and may not always be very accurate.

Fourth, the large number of decomposition levels, as discussed by C.-L. Yang, W.-R. Gao, and L.-M. Po, in "Discrete wavelet transform-based structural similarity for image quality assessment", *Proc. IEEE Int. Conf. Image Processing*, San Diego, October 2008, pp. 377-380, cited in the previous paragraph would make the size of the approximation subband that has the main image contents very small, and it would no longer be able to help in the effective extraction of image statistics.

Fifth, previous SSIM methods use the mean of the SSIM quality map to determine the measure of quality for the image (or the overall image quality score). However, distortions in various image areas have different impacts on the HVS.

Thus, there is a further need for the development of an improved measure of quality for images, which would avoid or mitigate the disadvantages of the prior art.

SUMMARY OF THE INVENTION

Therefore it is an objective of the present invention to provide an improved method and system for determining measures of image quality that mitigate the shortcomings of the prior art.

According to one aspect of the invention, there is provided a method for determining a measure of quality for a distorted image Y, characterizing a similarity between the image Y and an undistorted reference image X, having the same number of rows and columns of pixels as the image Y, the method comprising:

(a1) applying a N level multiresolution decomposition, comprising levels 1, 2, . . . i, i+1, . . . N, to the image X, to produce:
   for each level i, with i ranging from 1 to N−1, intermediate subbands of image X for processing at level i+1; and
   for the level N, an approximation subband containing main content of the image X and detail subbands containing edges of the image X;

(b1) applying said N level multiresolution decomposition, comprising levels 1, 2, . . . i, i+1, . . . N, to the image Y, to produce:
   for each level i, with i ranging from 1 to N−1, intermediate subbands of image Y for processing at level i+1; and
   for the level, N, an approximation subband containing main content of the image Y and detail subbands containing edges of the image Y;

(c1) applying an image quality metric (IQM) to the approximation subband of the image X and the approximation subband of the image Y to produce an approximation quality measure characterizing similarity between the main content of the image X and the main content of the image Y;

(d1) aggregating the intermediate subbands at the level i for the image X, with i ranging from levels 1 to N−1, and the detail subbands of the image X to produce an edge map of the image X characterizing the edges of the image X;

(e1) aggregating the intermediate subbands at the level i for the image Y, with i ranging from 1 to N−1, and the detail subbands of the image Y to produce an edge map of the image Y characterizing the edges of image Y;

(f1) applying the IQM between the edge map of the image X and the edge map of the image Y to produce an edge quality measure characterizing similarity between the edges of the image X and the edges of the image Y; and (g1) processing the approximation quality measure and the edge quality measure to determine the measure of quality.

In the method described above:

(a2) the step (d1) further comprises:
   (a2i) selecting the intermediate subbands at each level i, with i ranging from 1 to N−1, and the detail subbands for the image X based on an accuracy to be achieved in determining the measure of quality; and
   (a2ii) aggregating only selected intermediate subbands and selected detail subbands for the image X; and (b2) the step (e1) further comprises:
   (b2i) selecting the intermediate subbands at said each level i and the detail subbands for the image Y based on said accuracy to be achieved in determining the measure of quality; and
   (b2ii) aggregating only selected intermediate subbands and selected detail subbands for the image Y.

The step (a2i) and the step (b2i) further comprise selecting the intermediate subbands at said each level i and the detail subbands for the image X and the image Y based on a number of the intermediate and the detailed subbands required for achieving the accuracy.

The method further comprises:

(a4) at the step (a2ii):
   (a4i) for said each level i, aggregating the selected intermediate subbands for the image X producing an edge map at the level i for the image X;
   (a4ii) aggregating the selected detail subbands for the image X producing an edge map at the level N for the image X; and
   (a4iii) aggregating the edge map at said each level i for the image X with the edge map at the level N for the image X; and (b4) at the step (b2ii):
   (b4i) for said each level i, aggregating the selected intermediate subbands for the image Y producing an edge map at the level i for the image Y;
   (b4ii) aggregating the selected detail subbands for the image Y producing an edge map at the level N for the image Y; and
   (b4iii) aggregating the edge map at said each level i for the image Y with the edge map at the level N for the image Y.

In the method described above:

(a5) the step (a4iii) further comprises:
   (a5i) multiplying the edge map at said each level i for the image X with a predetermined weight for the level i;

(a5ii) multiplying the edge map at the level N for the image X with a predetermined weight at the level N; and (a5iii) summing products resulting from the multiplying in the step (a5i) and a product resulting from the multiplying in the step (a5ii); and (b5) the step (b4iii) further comprises:

(b5i) multiplying the edge map at said each level i for the image Y with the predetermined weight for the level i;

(b5ii) multiplying the edge map at the level N for the image Y with the predetermined weight at the level N; and (b5iii) summing products resulting from the multiplying in the step (b5i) and a product resulting from the multiplying in the step (b5ii).

In the method described above:

(a6) the step (a4i) comprises:

(a6i) for said each level i, squaring each selected intermediate subband for the image X;

(a6ii) multiplying a result of the squaring performed in the step (a6i) with a predetermined weight for said each selected intermediate subband for the image X;

(a6iii) summing products resulting from the multiplying performed in the step (a6ii);

(a6iv) applying a square root function to a result of the summing performed in the step (a6iii) producing the edge map at the level i for the image X;

(b6) the step (a4ii) comprises:

(b6i) squaring each said selected detail subband for the image X;

(b6ii) multiplying a result of the squaring performed in the step (b6i) with a predetermined weight for said each selected detail subband for the image X;

(b6iii) summing products resulting from the multiplying performed in the step (b6ii);

(b6iv) applying a square root function to a result of the summing performed in the step (b6iii) producing the edge map at the level N for the image X;

(c6) the step (b4i) comprises:

(c6i) for said each level i, squaring each selected intermediate subband for the image Y;

(c6ii) multiplying a result of the squaring performed in the step (c6i) with a predetermined weight for said each selected intermediate subband for the image Y;

(c6iii) summing products resulting from the multiplying performed in the step (c6ii);

(c6iv) applying a square root function to a result of the summing performed in the step (c6iii) producing the edge map at the level i for the image Y; and (d6) the step (b4ii) comprises:

(d6i) squaring each said selected detail subband for the image Y;

(d6ii) multiplying a result of the squaring performed in the step (d6i) with a predetermined weight for said each selected detail subband for the image Y;

(d6iii) summing products resulting from the multiplying performed in the step (d6ii);

(d6iv) applying a square root function to a result of the summing performed in the step (d6iii) producing the edge map at the level N for the image Y.

The intermediate subbands at said each level i for the image X and the image Y include for each respective image:

level i-detail subbands and level i-wavelet packet (WP) subbands;

the level i-WP subbands comprising level i-WP approximation subbands and level i-WP detail subbands; and the level i-WP approximation subbands further comprising a level i-horizontal WP approximation subband, a level i-vertical WP approximation subband and a level i-diagonal WP approximation subband.

In the method described above:

(a8) the step (a2i) further comprises selecting one or more of the level i-WP approximation subbands and one or more of the detail subbands for the image X; and (b8) the step (b2i) further comprises selecting one or more of the level i-WP approximation subbands and one or more of the detail subbands for the image Y.

In the method described above:

(a9) the step (a8) further comprises including one or more of the level i-detail subbands for the image X in the selecting; and (b9) the step (b8) further comprises including one or more of the level i-detail subbands for the image Y in the selecting.

In the method described above:

(a10) the step (a2ii) further comprises:

(a10i) aggregating the level i-horizontal WP approximation subband for the image X at said each level i and the horizontal subband for the image X producing a horizontal edge map for the image X;

(a10ii) aggregating the level i-vertical WP approximation subband for the image X at said each level i and the vertical subband for the image X producing a vertical edge map for the image X;

(a10iii) aggregating the level i-diagonal WP approximation subband for the image X at said each level i and the diagonal subband for the image X producing a diagonal edge map for the image X; and (a10iv) aggregating the horizontal edge map, the vertical edge map and the diagonal edge map for the image X; and (b10) the step (b2ii) further comprises:

(b10i) aggregating the level i-horizontal WP approximation subband for the image Y at said each level i and the horizontal subband for the image Y producing a horizontal edge map for the image Y;

(b10ii) aggregating the level i-vertical WP approximation subband for the image Y at said each level i and the vertical subband for the image Y producing a vertical edge map for the image Y;

(b10iii) aggregating the level i-diagonal WP approximation subband for the image Y at said each level i and the diagonal subband for the image Y producing a diagonal edge map for the image Y; and (b10iv) aggregating the horizontal edge map, the vertical edge map and the diagonal edge map for the image Y.

In the method described above, the level i-WP detail subbands for the image X and the image Y further comprise for each respective image, a level i-WP horizontal subband, a level i-WP vertical subband and a level i-WP diagonal subband, and:

(a11) the step (a10i) further comprises including the level i-WP horizontal subband for the image X in the aggregating;

(b11) the step (a10ii) further comprises including the level i-WP vertical subband for the image X in the aggregating;

(c11) the step (a10iii) further comprises including the level i-WP diagonal subband for the image X in the aggregating;

(d11) the step (b10i) further comprises including the level i-WP horizontal subband for the image Y in the aggregating;

(e11) the step (b10ii) further comprises including the level i-WP vertical subband for the image Y in the aggregating; and (f11) the step (b10iii) further comprises including the level i-WP diagonal subband for the image Y in the aggregating.

In the method described above:

(a12) the step (a10iv) comprises:
- (a12i) applying a square root function to the horizontal edge map, the vertical edge map and the diagonal edge map for the image X; and
- (a12ii) summing results of applying said square root function; and (b12) the step (b10iv) comprises:
- (b12i) applying a square root function to the horizontal edge map, the vertical edge map and the diagonal edge map for the image Y; and
- (b12ii) summing results of applying said square root function.

In the method described above:
(a13) the step (a10iv) comprises:
- (a13i) summing the horizontal edge map, the vertical edge map and the diagonal edge map for the image X; and
- (a13ii) applying a square root function to result of the summing performed in the step (a13i); and (b13) the step (b10iv) comprises:
- (b13i) summing the horizontal edge map, the vertical edge map and the diagonal edge map for the image Y; and
- (b13ii) applying a square root function to result of the summing performed in the step (b13i).

In the method described above, the steps (a1) and (b1) comprise applying a N level discrete wavelet transform (DWT). Alternatively, the discrete wavelet transform may be a Haar transform, or one of a Newland transform, or wavelet transform using a Daubechies filter.

The method described above comprises one or more of the following:
(a17) at the step (a1):
- (a17i) for the level 1, applying the multiresolution decomposition to the image X producing intermediate subbands at the level 1 for processing at level 2; and
- (a17ii) for the level i, with i ranging from 2 to N, applying the multiresolution decomposition to one or more of the intermediate subbands produced by the multiresolution decomposition performed at the level i−1; and (b17) at the step (b1):
- (b17i) for the level 1, applying the multiresolution decomposition to the Image Y producing intermediate subbands at the level 1 for processing at level 2; and
- (b17ii) for the level i, with i ranging from 2 to N, applying the multiresolution decomposition to one or more of the intermediate subbands produced by the multiresolution decomposition performed at the level i−1.

In the embodiments of the invention, the approximation quality measure is an approximation quality map, and the edge quality measure is an edge quality map, and the step (g1) further comprises:
(a18) generating a contrast map, including assigning corresponding values to the pixels of the approximation subband and the edge map of the image X and the image Y according to their respective importance to human visual system;
(b18) performing weighted pooling of the approximation quality map using the contrast map to produce an approximation quality score;
(c18) performing weighted pooling of the edge quality map using the contrast map to produce an edge quality score; and
(d18) combining the approximation similarity score with the edge similarity score from the step (c18) to determine the measure of quality.

In the embodiments of the invention, the method further comprises determining N as a function of a minimum size of the approximation subband, S, which produces a substantially peak response for human visual system.

In the method described above:
(a20) the step (c1) comprises applying a structural similarity (SSIM) IQM to the approximation subband of the image X and the approximation subband of the image Y to produce an approximation SSIM map, $SSIM_A$;
(b20) the step (f1) comprises applying the SSIM IQM between the edge map of the image X and the edge map of the image Y to produce an edge SSIM map, $SSIM_E$; and
(c20) the step (g1) comprises processing the $SSIM_A$ and the $SSIM_E$ to determine a $SSIM_{DWT}$ score as the measure of quality.

Alternatively:
(a21) the step (c1) comprises applying an Absolute Difference (AD) IQM to the approximation subband of the image X and the approximation subband of the image Y to produce an approximation AD map, $AD_A$;
(b21) the step (f1) comprises applying the AD IQM between the edge map of the image X and the edge map of the image Y to produce an edge AD map, $AD_E$; and
(c21) the step (g1) comprises processing the $AD_A$ and the $AD_E$ to determine an $AD_{DWT}$ score as the measure of quality.

Yet alternatively:
(a22) the step (c1) comprises applying a peak-signal-to-noise ratio (PSNR) IQM to the approximation subband of the image X and the approximation subband of the image Y to produce a PSNR approximation quality score, $PSNR_A$;
(b22) the step (f1) comprises applying the PSNR IQM between the edge map of the image X and the edge map of the image Y to produce a PSNR edge quality score, $PSNR_E$; and
(c22) the step (g1) comprises processing the $PSNR_A$ and the $PSNR_E$ to determine a $PSNR_{DWT}$ score as the measure of quality.

Yet alternatively:
(a23) the step (c1) comprises applying a Visual Information Fidelity (VIF) IQM to the approximation subband of the image X and the approximation subband of the image Y to produce a VIF approximation quality score, $VIF_A$;
(b23) the step (f1) comprises applying the VIF IQM between the edge map of the image X and the edge map of the image Y to produce a VIF edge quality score, $VIF_E$; and
(c23) the step (g1) comprises processing the $VIF_A$ and the $VIF_E$ to determine a $VIF_{DWT}$ score as the measure of quality.

In the methods described above:
(a24) the step (a2) further comprises choosing the selected intermediate subbands at said each level i and the detail subbands for the image X, having substantially same resolution, for aggregating; and
(b24) the step (b2) further comprises choosing the selected intermediate subbands at said each level i and the detail subbands for the image Y, having substantially same resolution, for aggregating.

According to another aspect of the invention, there is provided a system for determining a measure of quality for a distorted image Y, characterizing a similarity between the image Y and an undistorted reference image X, having the same number of rows and columns of pixels as the image Y, the system comprising:
a processor, and a computer readable storage medium having computer readable instructions stored thereon, which, when executed by the processor, form the following:
- (a25) a first decomposition unit applying a N level multiresolution decomposition, comprising levels 1, 2, . . . i, i+1, . . . N, to the image X, to produce:
  - for each level i, with i ranging from 1 to N−1, intermediate subbands of image X for processing at level i+1; and for the level N, an approximation subband containing main content of the image X and detail subbands containing edges of the image X;

(b25) a second decomposition unit applying said N level multiresolution decomposition, comprising levels 1, 2, . . . i, i+1, . . . N, to the image Y, to produce:

for each level i, with i ranging from 1 to N−1, intermediate subbands for image Y; and for the level, N, an approximation subband containing main content of the image Y and detail subbands containing edges of the image Y;

(c25) an approximation quality measure unit applying an image quality metric (IQM) to the approximation subband of the image X and the approximation subband of the image Y to produce an approximation quality measure characterizing similarity between the main content of the image X and the main content of the image Y;

(d25) a first aggregation unit aggregating the intermediate subbands at the level i for the image X, with i ranging from levels 1 to N−1 and the detail subbands of the image X to produce an edge map of the image X characterizing the edges of the image X;

(e25) a second aggregation unit aggregating the intermediate subbands at the level i for the image Y, with i ranging from 1 to N−1 and the detail subbands of the image Y to produce an edge map of the image Y characterizing the edges of image Y;

(f25) an edge quality measure unit applying the IQM between the edge map of the image X and the edge map of the image Y to produce an edge quality measure characterizing similarity between the edges of the image X and the edges of the image Y; and (g25) a quality measure unit processing the approximation quality measure and the edge quality measure to determine the measure of quality.

In the system described above:

(a26) the first aggregation unit (d25) further comprises:

(a26i) a first selection unit selecting the intermediate subbands at each level i, with i ranging from 1 to N−1, and the detail subbands for the image X based on an accuracy to be achieved in determining the measure of quality; and (a26ii) a first selective aggregation unit aggregating only selected intermediate subbands and selected detail subbands for the image X; and (b26) the second aggregation unit (e1) further comprises:

(b26i) a second selection unit selecting the intermediate subbands at said each level i and the detail subbands for the image Y based on said accuracy to be achieved in determining the measure of quality; and (b26ii) a second selective aggregation unit aggregating only selected intermediate subbands and selected detail subbands for the image Y.

In the system described above:

(a27) the first selection unit (a26i) further comprises a first selection sub-unit selecting the intermediate subbands at said each level i and the detail subbands for the image X based on a number of the intermediate and the detailed subbands required for achieving the accuracy; and (b27) the second selection unit (b26i) further comprises a second selection sub-unit selecting the intermediate subbands at said each level i and the detail subbands for the image Y based on a number of the intermediate and the detailed subbands required for achieving the accuracy.

In the system described above:

(a28) at the first selective aggregation unit (a26ii):

(a28i) a first level i-intermediate subbands aggregation unit aggregating, for said each level i, the selected intermediate subbands for the image X producing an edge map at the level i for the image X;

(a28ii) a first detail subbands aggregation unit aggregating the selected detail subbands for the image X producing an edge map at the level N for the image X; and (a28iii) a first edge map determination unit aggregating the edge map at said each level i for the image X with the edge map at the level N for the image X; and (b28) at the second selective aggregation unit (b26ii):

(b28i) a second level i-intermediate subbands aggregation unit aggregating, for said each level i, the selected intermediate subbands for the image Y producing an edge map at the level i for the image Y;

(b28ii) a second detail subbands aggregation unit aggregating the selected detail subbands for the image Y producing an edge map at the level N for the image Y; and (b28iii) a second edge map determination unit aggregating the edge map at said each level i for the image Y with the edge map at the level N for the image Y.

In the system described above:

(a29) the first edge map determination unit (a28iii) further comprises a first computation unit for:

multiplying the edge map at said each level i for the image X with a predetermined weight for the level i;

multiplying the edge map at the level N for the image X with a predetermined weight for the level N; and summing products resulting from the multiplying the edge map at said each level i for the image X and the multiplying the edge map at the level N for the image X.

(b29) the second edge map determination unit (b28iii) further comprises a second computation unit for:

multiplying the edge map at said each level i for the image Y with the predetermined weight for the level i;

multiplying the edge map at the level N for the image Y with the predetermined weight for the level N; and summing products resulting from the multiplying the edge map at said each level i for the image Y and the multiplying the edge map at the level N for the image Y.

In the system described above:

(a30) the first level i-intermediate subbands aggregation unit (a28i) comprises a first level i-computation unit for:

squaring each selected intermediate subband for the image X for said each level i; multiplying a result of the squaring with a predetermined weight for said each selected intermediate subband for the image X;

summing products resulting from the multiplying; and applying a square root function to a result of the summing producing the edge map at the level i for the image X;

(b30) the first detail subbands aggregation unit (a28ii) comprises a first detail subbands computation unit for:

squaring each said selected detail subband for the image X;

multiplying a result of the squaring with a predetermined weight for said each selected detail subband for the image X;

summing products resulting from the multiplying; and applying a square root function to a result of the summing producing the edge map at the level N for the image X;

(c30) the second level i-intermediate subbands aggregation unit (b28i) comprises a second level i-computation unit for:

squaring each said selected intermediate subband for the image Y for said each level i;

multiplying a result of the squaring performed with a predetermined weight for said each selected intermediate subband for the image Y;

summing products resulting from the multiplying;

applying a square root function to a result of the summing producing the edge map at the level i for the image Y; and (d30) the second detail subbands aggregation unit (b28ii) comprises a second detail subbands computation unit for:
  squaring each said selected detail subband for the image Y;
  multiplying a result of the squaring with a predetermined weight for said each selected detail subband for the image Y;
  summing products resulting from the multiplying; and
  applying a square root function to a result of the summing producing the edge map at the level N for the image Y.

In the system described above, the intermediate subbands at said each level i for the image X and the image Y include for each respective image:
  level i-detail subbands and level i-wavelet packet (WP) subbands;
  the level i-WP subbands comprising level i-WP approximation subbands and level i-WP detail subbands; and
  the level-WP approximation subbands further comprising a level i-horizontal WP approximation subband, a level i-vertical WP approximation subband and a level i-diagonal WP approximation subband.

In the system described above:
(a32) the first selection unit (a26i) further comprises a first WP-detail selection sub-unit selecting one or more of the level i-WP approximation subbands and one or more of the detail subbands for the image X; and
(b32) the second selection unit (b26i) further comprises a second WP-detail selection sub-unit selecting one or more of the level i-WP approximation subbands and one or more of the detail subbands for the image Y.

In the system described above:
(a33) the first WP-detail selection sub-unit (a32) further comprises a first detail-selection module including one or more of the level i-detail subbands for the image X in the selecting; and
(b33) the second WP-detail selection sub-unit (b32) further comprises a second detail-selection module including one or more of the level i-detail subbands for the image Y in the selecting.

In the system described above:
(a34) the first selective aggregation unit (a26ii) further comprises:
  (a34i) a first horizontal edge map unit aggregating the level i-horizontal WP approximation subband for the image X at said each level i and the horizontal subband for the image X producing a horizontal edge map for the image X;
  (a34ii) a first vertical edge map unit aggregating the level i-vertical WP approximation subband for the image X at said each level i and the vertical subband for the image X producing a vertical edge map for the image X;
  (a34iii) a first diagonal edge map unit aggregating the level i-diagonal WP approximation subband for the image X at said each level i and the diagonal subband for the image X producing a diagonal edge map for the image X; and
  (a34iv) a first combination unit aggregating the horizontal edge map, the vertical edge map and the diagonal edge map for the image X; and
(b34) the second selective aggregation unit (b26ii) further comprises:
  (b34i) a second horizontal edge map unit aggregating the level i-horizontal WP approximation subband for the image Y at said each level i and the horizontal subband for the image Y producing a horizontal edge map for the image Y;
  (b34ii) a second vertical edge map unit aggregating the level i-vertical WP approximation subband for the image Y at said each level i and the vertical subband for the image Y producing a vertical edge map for the image Y;
  (b34iii) a second diagonal edge map unit aggregating the level i-diagonal WP approximation subband for the image Y at said each level i and the diagonal subband for the image Y producing a diagonal edge map for the image Y; and
  (b34iv) a second combination unit aggregating the horizontal edge map, the vertical edge map and the diagonal edge map for the image Y.

In the system described above, the level i-WP detail subbands for the image X and the image Y further comprise, for each respective image, a level i-WP horizontal subband, a level i-WP vertical subband and a level i-WP diagonal subband; and
(a35) the first horizontal edge map unit (a34i) further comprises a first horizontal sub-unit including the level i-WP horizontal subband for the image X in the aggregating;
(b35) the first vertical edge map unit (a34ii) further comprises a first vertical sub-unit including the level i-WP vertical subband for the image X in the aggregating;
(c35) the first diagonal edge map unit (a34iii) further comprises a first diagonal sub-unit including the level i-WP diagonal subband for the image X in the aggregating;
(d35) the second horizontal edge map unit (b34i) further comprises a second horizontal sub-unit including the level i-WP horizontal subband for the image Y in the aggregating;
(e35) the second vertical edge map unit (b34ii) further comprises a second vertical sub-unit including the level i-WP vertical subband for the image Y in the aggregating; and
(f35) the second diagonal edge map unit (b34iii) further comprises a second diagonal sub-unit including the level i-WP diagonal subband for the image Y in the aggregating.

In the system described above:
(a36) the first combination unit (a34iv) comprises a first combination sub-unit for:
  applying a square root function to the horizontal edge map, the vertical edge map and the diagonal edge map for the image X; and
  summing results of applying said square root function; and
(b36) the second combination unit (b34iv) comprises a second combination sub-unit for:
  applying a square root function to the horizontal edge map, the vertical edge map and the diagonal edge map for the image Y; and
  summing results of applying said square root function.

In the system described above:
(a37) the first combination unit (a34iv) comprises a third combination sub-unit for:
  summing the horizontal edge map, the vertical edge map and the diagonal edge map for the image X; and
  applying a square root function to result of the summing; and
(b37) the second combination unit (b34iv) comprises a fourth combination sub-unit for:
  summing the horizontal edge map, the vertical edge map and the diagonal edge map for the image Y; and
  applying a square root function to result of the summing.

In the system described above, the first decomposition unit (a1) and the second decomposition unit (b1) comprise computational means for applying a N level discrete wavelet transform (DWT).

In the system described above, the discrete wavelet transform is a Haar transform. Alternatively, the discrete wavelet transform is one of a Newland transform, or wavelet transform using a Daubechies filter.

The system of the embodiments of the invention may comprise one or more of the following:

(a41) at the first decomposition unit (a25):
- (a41i) a first level 1 decomposition unit applying the multiresolution decomposition to the image X producing intermediate subbands at the level 1 for processing at level 2;
- (a41ii) a first level i decomposition unit applying the multiresolution decomposition to one or more of the intermediate subbands produced by the multiresolution decomposition performed at the level i−1, with i ranging from 2 to N;

(b41) at the second decomposition unit (b25):
- (b41i) a second level 1 decomposition unit applying the multiresolution decomposition to the Image Y producing intermediate subbands at the level 1 for processing at level 2;
- (b41ii) a second level i decomposition unit applying the multiresolution decomposition to one or more of the intermediate subbands produced by the multiresolution decomposition performed at the level i−1, with i ranging from 2 to N.

In the system described above, the approximation quality measure is an approximation quality map, and the edge quality measure is an edge quality map, and the quality measure unit (g25) further comprises:

(a42) a contrast map unit generating a contrast map, including assigning corresponding values to the pixels of the approximation subband and the edge map of the image X and the image Y according to their respective importance to human visual system;

(b42) a first pooling unit performing weighted pooling of the approximation quality map using the contrast map to produce an approximation quality score;

(c42) a second pooling unit performing weighted pooling of the edge quality map using the contrast map to produce an edge quality score; and (d42) a score combination unit combining the approximation similarity score from the first pooling unit (b42) with the edge similarity score from the second pooling unit (c42) to determine the measure of quality.

The system as described above may further comprise computational means for determining N as a function of a minimum size of the approximation subband, S, which produces a substantially peak response for human visual system.

In the system of the embodiments of the invention:

(a44) the approximation quality measure unit (c25) comprises an approximation SSIM map unit applying a SSIM IQM to the approximation subband of the image X and the approximation subband of the image Y to produce an approximation structural similarity (SSIM) map, $SSIM_A$;

(b44) the edge quality measure unit (f25) comprises an edge SSIM map unit applying the SSIM IQM between the edge map of the image X and the edge map of the image Y to produce an edge SSIM map, $SSIM_E$; and (c44) the quality measure unit (g25) comprises a $SSIM_{DWT}$ score unit processing the $SSIM_A$ and the $SSIM_E$ to determine a $SSIM_{DWT}$ score as the measure of quality.

In the system described above:

(a45) the approximation quality measure unit (c25) comprises an approximation AD map unit applying an AD IQM to the approximation subband of the image X and the approximation subband of the image Y to produce an approximation AD map, $AD_A$;

(b45) the edge quality measure unit (f25) comprises an edge AD map unit applying the AD IQM between the edge map of the image X and the edge map of the image Y to produce an edge AD map, $AD_E$; and (c45) the quality measure unit (g25) comprises an $AD_{DWT}$ score unit processing the $AD_A$ and the $AD_E$ to determine an $AD_{DWT}$ score as the measure of quality.

Alternatively:

(a46) the approximation quality measure unit (c25) comprises a PSNR approximation quality score unit applying a PSNR IQM to the approximation subband of the image X and the approximation subband of the image Y to produce a PSNR approximation quality score, $PSNR_A$;

(b46) the edge quality measure unit (f25) comprises a PSNR edge quality score determination unit applying the PSNR IQM between the edge map of the image X and the edge map of the image Y to produce a PSNR edge quality score, $PSNR_E$; and (c46) the quality measure unit (g25) comprises a $PSNR_{DWT}$ score unit processing the $PSNR_A$ and the $PSNR_E$ to determine a $PSNR_{DWT}$ score as the measure of quality.

Yet alternatively:

(a47) the approximation quality measure unit (c25) comprises a VIF approximation quality score unit applying a VIF IQM to the approximation subband of the image X and the approximation subband of the image Y to produce a VIF approximation quality score, $VIF_A$;

(b47) the edge quality measure unit (f25) comprises a VIF edge quality score determination unit applying the VIF IQM between the edge map of the image X and the edge map of the image Y to produce a VIF edge quality score, $VIF_E$; and (c47) the quality measure unit (g25) comprises a $VIF_{DWT}$ score unit processing the $VIF_A$ and the $VIF_E$ to determine a $VIF_{DWT}$ score as the measure of quality.

Yet alternatively:

(a48) the first aggregation unit (a26) further comprises computational means for choosing the selected intermediate subbands at said each level i and the detail subbands for the image X having substantially same resolution for aggregating; and (b48) the second aggregation unit (b26) further comprises computational means for choosing the selected intermediate subbands at said each level i and the detail subbands for the image Y having substantially same resolution for aggregating.

According to yet another aspect of the invention, there is provided a computer readable storage medium, having computer readable program code instructions stored thereon, which, when executed by a processor, perform the following:

(a49) applying a N level multiresolution decomposition, comprising levels 1, 2, . . . i, i+1, . . . N, to the image X, to produce:
- for each level i, with i ranging from 1 to N−1, intermediate subbands of image X for processing at level i+1; and
- for the level N, an approximation subband containing main content of the image X and detail subbands containing edges of the image X;

(b49) applying said N level multiresolution decomposition, comprising levels 1, 2, . . . i, i+1, . . . N, to the image Y, to produce:
- for each level i, with i ranging from 1 to N−1, intermediate subbands of image Y for processing at level i+1; and
- for the level, N, an approximation subband containing main content of the image Y and detail subbands containing edges of the image Y;

(c49) applying an image quality metric (IQM) to the approximation subband of the image X and the approximation subband of the image Y to produce an approximation quality measure characterizing similarity between the main content of the image X and the main content of the image Y;

(d49) aggregating the intermediate subbands at the level i for the image X, with i ranging from levels 1 to N−1, and the detail subbands of the image X to produce an edge map of the image X characterizing the edges of the image X;

(e49) aggregating the intermediate subbands at the level i for the image Y, with i ranging from 1 to N−1, and the detail subbands of the image Y to produce an edge map of the image Y characterizing the edges of image Y;

(f49) applying the IQM between the edge map of the image X and the edge map of the image Y to produce an edge quality measure characterizing similarity between the edges of the image X and the edges of the image Y; and (g49) processing the approximation quality measure and the edge quality measure to determine the measure of quality.

Thus, improved methods and systems for determining a quality measure for an image using multi-level decomposition of images have been provided.

BRIEF DESCRIPTION OF THE DRAWINGS

Further features and advantages of the invention will be apparent from the following description of the embodiment, which is described by way of example only and with reference to the accompanying drawings, in which:

FIG. 2 (b) presents a flowchart showing the steps of the method used in the general framework of the system 100 for computing a measure of quality.

FIG. 3(a1) presents the subbands of image X for an example two-level decomposed image;

FIG. 3(a2) presents the subbands of image X for an example three-level decomposed image;

FIG. 9(c) displays the table showing SRCC for $PSNR_A$ values for different types of image distortion in the Live Image Database;

FIG. 13 shows RMSE between different metrics and DMOS values of the LIVE database; and FIG. 14 shows SRCC between metrics and DMOS values of the LIVE database.

DESCRIPTION OF THE EMBODIMENTS OF THE INVENTION

Figure 1A:
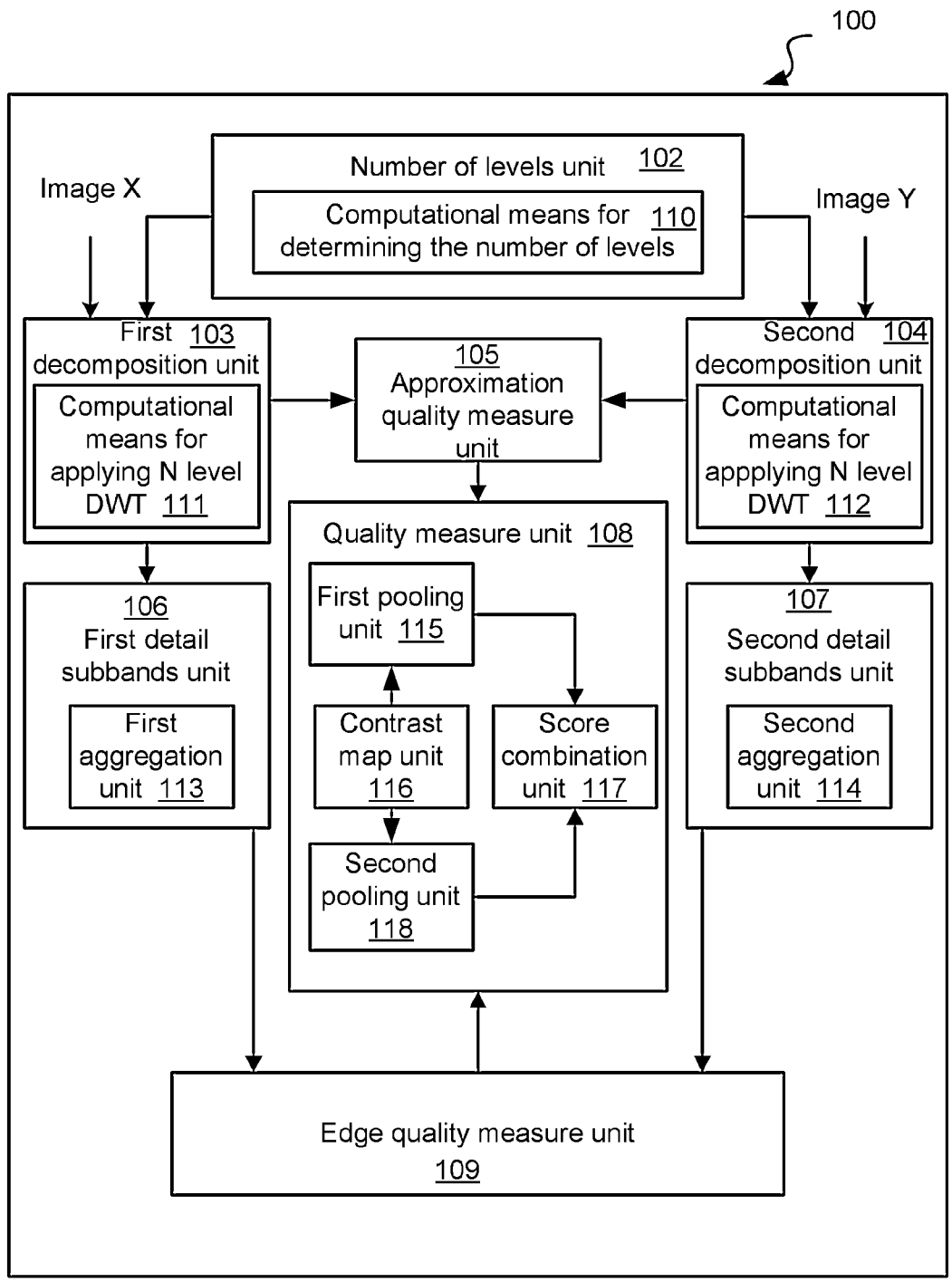
FIG. 1(a) presents system 100 of the embodiment of the invention.

Terminology:

Contrast map: weighting function for automatically assigning weights to different regions of an image or sub-image based on their visual importance.

Differential Mean Opinion Score (DMOS): A DMOS value indicates the subjective quality loss of the distorted image compared to its reference image.

Discrete wavelet transform: transform applied to an image to separate its low frequency components from its high frequency components.

Edge map: characterizes an estimate for the edges of an image.

Gaussian sliding window: a set of coefficients with unit sum and Gaussian probability distribution.

Linear Correlation Coefficient (LCC): Linear or Pearson Correlation coefficient is the measure of dependence between two quantities. It is obtained by dividing the covariance of the two variables by the product of their standard deviations. In the proposed method LCC indicates prediction accuracy.

Multiresolution decomposition: a process (or transform) that is applied on digital images and generates several sub-images. One sub-image represents the low frequency main content of original image and other sub-images show the details of the original image.

Spearman's Rank Correlation Coefficient (SRCC): SRCC is a measure of statistical dependence between two variables. It shows how well the relationship between the two variables can be described using a monotonic function. SRCC of +1 indicates that each of the variables is a perfect monotone function of the other.

Subbands: Various types of subbands are generated during the N level multiresoultion decomposition of an image. The description of these subbands and the terminology used for representing these for an image X are presented. Please note that X and the index variable L used in this section are mere examples and are replaced by other variable names in the discussion presented in this application.

The subbands produced at the end of a N level multiresolution decomposition are called approximation subband and detail subbands that are presented next.

Approximation subband: of an image X obtained after N level of decomposition is denoted by $X_{A_N}(m,n)$. The approximation subband contains the main content of the image.

Detail subbands: of an image X are obtained after N level of decomposition and include a horizontal subband, a vertical subband and a diagonal subband. These are denoted respectively by: $X_{H_N}(m,n)$, $X_{V_N}(m,n)$, $X_{D_N}(m,n)$.

The detail subbands contain the edges of the image. The horizontal subband contains the horizontal edges, the vertical subband contains the vertical edges and the diagonal subbands contain the diagonal edges of the image.

Intermediate subbands: produced at each level L (L=1 to N−1) of decomposition for the image X include level L-wavelet packet (WP) subbands and level L-detail subbands. These are described next.

Level L-WP subbands: include level L-WP approximation subbands and level L-WP detail subbands.

Level L-WP approximation subbands: include a level L-horizontal WP approximation subband, a level L-vertical WP approximation subband, and a level L-diagonal WP approximation subband. These are denoted respectively by: $X_{H_L,A_{N-L}}(m,n)$, $X_{V_L,A_{N-L}}(m,n)$, $X_{D_L,A_{N-L}}(m,n)$.

Level L-WP detail subbands: include a level L-WP horizontal subband, a level L-WP vertical subband and a level L-WP diagonal subband. These are denoted respectively by: $X_{H_L,H_{N-L}}(m,n)$, $X_{V_L,V_{N-L}}(m,n)$, $X_{D_L,D_{N-L}}(m,n)$.

Level L-detail subbands: include a level L-horizontal subband, a level L-vertical, subband and a level L-diagonal subband. These are denoted respectively by: $X_{H_L}(m,n)$, $X_{V_L}(m,n)$, $X_{D_L}(m,n)$.

The embodiments of the present invention present a novel general framework for determining a measure of quality for images more accurately, yet with less computational complexity, in comparison to the prior art in the discrete wavelet domain. Various measures of quality each based on a specific image quality metric (IQM) are determined by the different embodiments of the invention. The proposed framework covers both top-down and bottom-up approaches as described in the following sections and can be applied to IQMs that include Structural Similarity (SSIM) index, absolute difference (AD), peak-signal-to-noise ratio (PSNR) and Visual Information Fidelity (VIF).

The systems of the embodiment of the invention are described next. Two embodiments are presented in FIG. 1(a) and FIG. 1(k). Each of these embodiments comprises units that are also described. The systems of the embodiments of the invention shown in FIG. 1(a) and FIG. 1(k) include a general purpose or specialized computer having a CPU and a computer readable storage medium, e.g., memory, DVD, CD-ROM, floppy disk, flash memory, magnetic tape or other storage medium, having computer readable instructions stored thereon for execution by the CPU. Alternatively, the systems of FIG. 1(a) and FIG. 1(k) can be implemented in firmware, or combination of firmware and a specialized computer having a computer readable storage medium.

The embodiment presented in FIG. 1(a) is presented first. A general framework provided by the embodiment is discussed first followed by a discussion on various other embodiments each of which deploys this framework using a particular IQM.

The system 100 determining a measure of quality for an image comprises a number of levels unit 102, a first decomposition unit 103, a second decomposition unit 104, an approximation quality measure unit 105, a first details subband unit 106, a second details subband unit 107, a quality measure unit 108 and an edge quality measure unit 109. The number of levels unit 102 determines the number of levels of decomposition, N, to be applied to the reference image X and the distorted image Y. The number of levels of decomposition N is obtained as a function of a minimum size of the approximation subband, S, which produces a substantially peak response for human visual system. The value of N is then read by the first decomposition unit 103 and the second decomposition unit 104 that apply N level DWT to the image X and the image Y respectively, thus performing N level decomposition of the image X and the image Y. For each image, the N level decomposition produces intermediate subbands at each level i (i=1 to N−1) for processing at level i+1 and detail subbands at level N. The approximation subbands generated after the multiresolution decomposition performed by the first decomposition unit 103 and the second decomposition unit 104 are fed to the approximation quality measure unit 105. The detail subbands generated after the multiresolution decomposition performed by the first decomposition unit 103 and the second decomposition unit 104 are used as inputs for the first detail subbands unit 106 and the second details subband unit 107 that produce edge maps for the image X and the image Y respectively. The outputs of these units are connected to the edge quality measure unit 109, which processes the edge maps, and produces an output used by the quality measure unit 108 that determines the measure of quality.

The number of levels unit 102 in turn comprises computational means for determining the number of levels 110. The first decomposition unit 103 and the second decomposition unit 104 comprise computational means for applying N level DWT (111 and 112 respectively). The first detail subbands unit 106 comprises a first aggregation unit 113 and the second detail subbands unit 107 comprises a second aggregation unit 114. The quality measure unit 108 comprises a first pooling unit 115, a second pooling unit 118, a contrast map unit 116 and a score combination unit 117. The first pooling unit 115 and the second pooling unit 118 use a contrast map produced by the contrast map unit 116 for performing weighted pooling of the approximation quality map generated by the approximation quality measure unit 105 and the edge map generated by the edge quality measure unit 109. The output of the first pooling unit 115 and the second pooling unit 118 are used by the score combination unit 117 to produce the measure of quality.

Figure 1B:
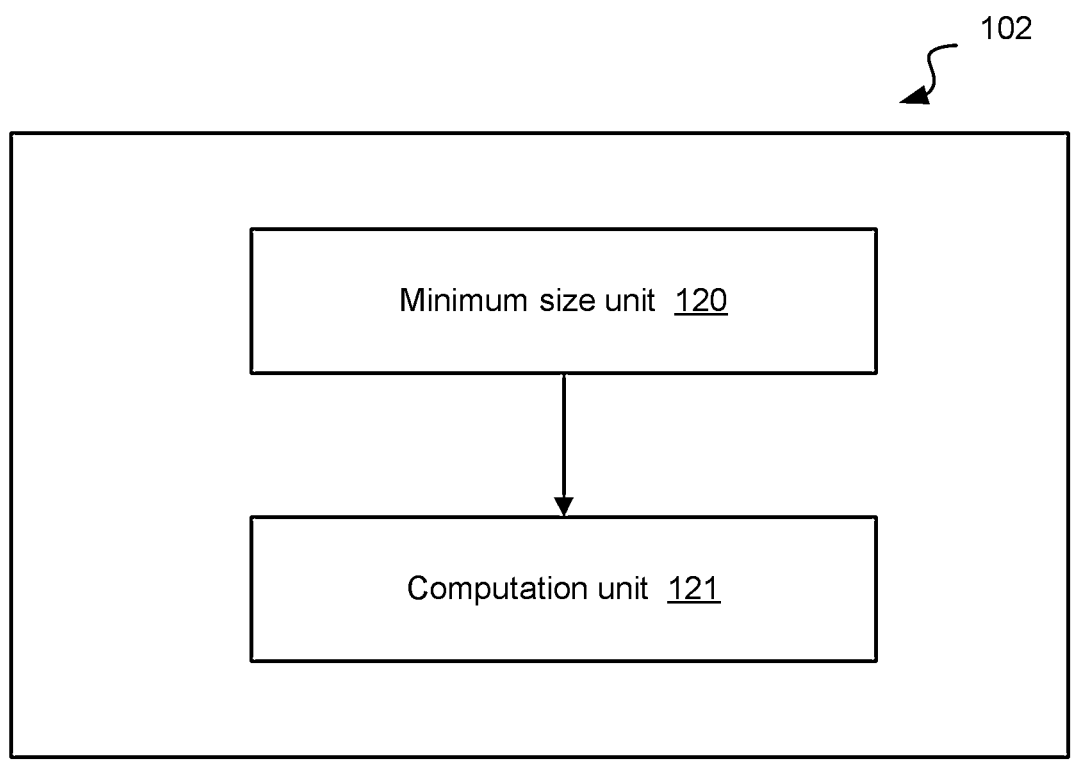
FIG. 1(b) illustrates the number of levels unit 102 of FIG. 1(a) in more detail.
Figure 1C:
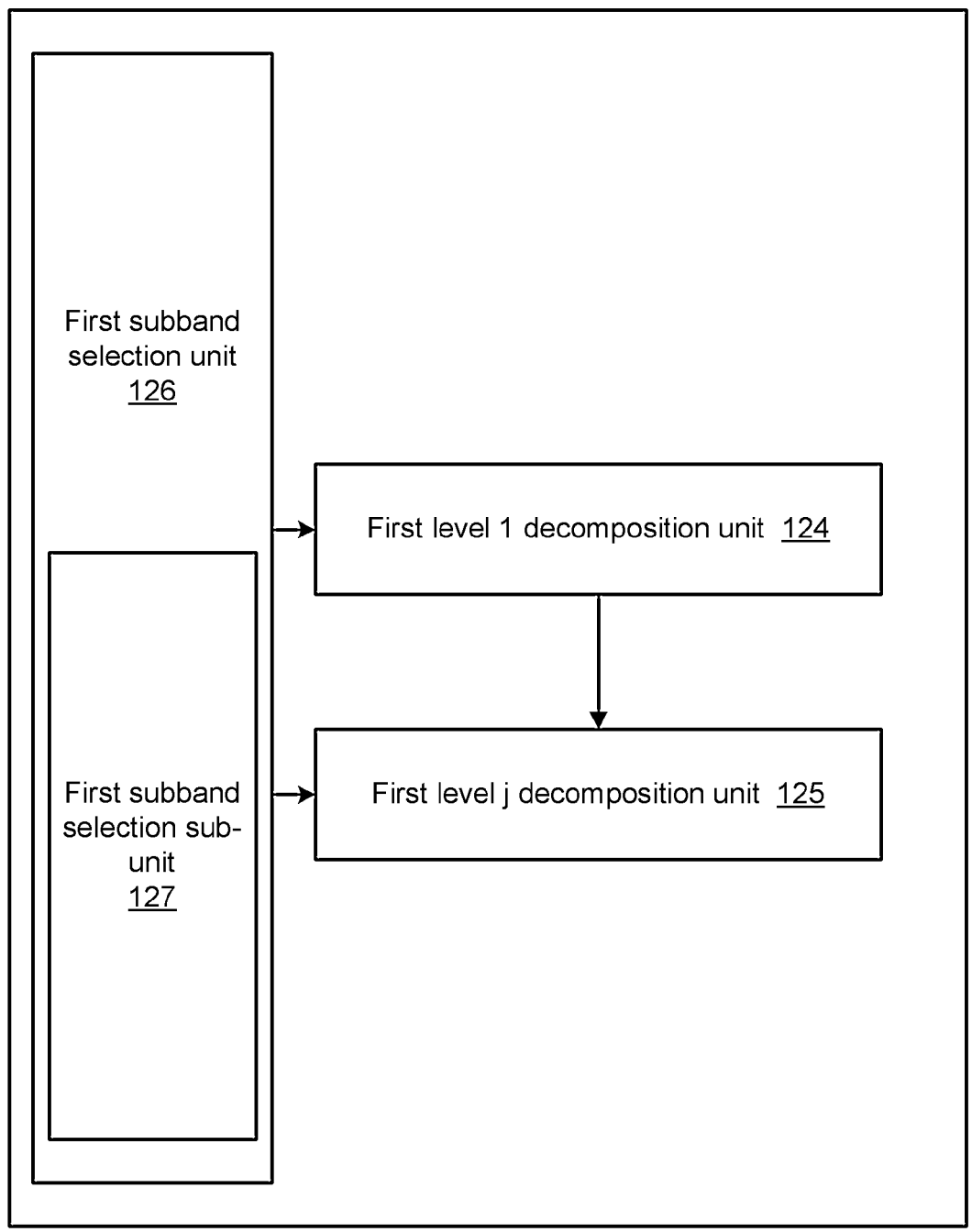
FIG. 1(c) illustrates the first decomposition unit 103 of FIG. 1(a) in more detail.
Figure 1D:
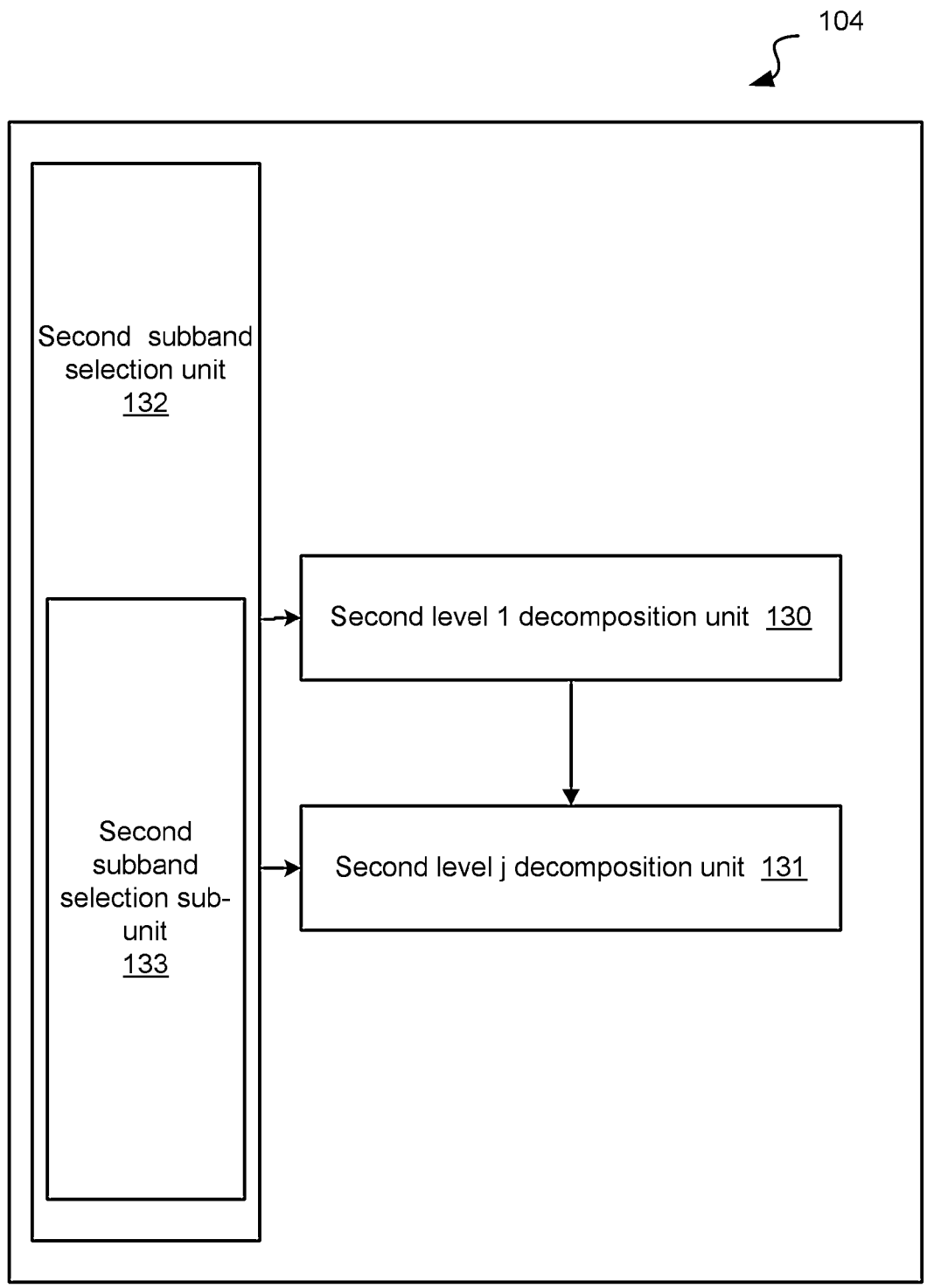
FIG. 1(d) illustrates the second decomposition unit 104 of FIG. 1(a) in more detail.

The structure of the number of levels unit 102 for another embodiment of the invention is presented in FIG. 1(b). It comprises a minimum size unit 120 determining, a ratio between viewing distance and a height of a device on which the image Y is displayed and a computation unit 121 for using this ratio and determining the value of N. In an alternate embodiment, the first decomposition unit 103 comprises (see FIG. 1(c)) a first level 1 decomposition unit 124 and a first level j decomposition unit 125 and a first subband selection unit 126 determining the selected intermediate subbands based on accuracy. The first subband selection unit 126 is used for determining the intermediate subbands to be used by the first level 1 decomposition unit 124 and the first level j decomposition unit 125. The first subband selection unit 126 further comprises a first subband selection sub-unit 127 determining the selected intermediate subbands based on a number of the intermediate subbands required for achieving the accuracy. As discussed in a later section of this application, another selection process is used for selecting which of the subbands produced by the N level multiresolution decomposition are to be used during subband aggregation. The output of the first level 1 decomposition unit 124 that applies the multiresolution decomposition to the Image X producing intermediate subbands at the level 1 for processing at level 2 is fed to the input of the first level j decomposition unit 125 that applies the multiresolution decomposition to only selected intermediate subbands produced by the multiresolution decomposition performed at the level j–1, with j ranging from 2 to N. Similarly the second decomposition unit 104 in turn comprises (see FIG. 1(d)) a second level 1 decomposition unit 130 and a second level j decomposition unit 131 and a second subband selection unit 132 for determining the selected intermediate subbands based on accuracy. The second subband selection unit 132 is used for determining the intermediate subbands to be used by the second level 1 decomposition unit 130 and the second level j decomposition unit 131. The second subband selection unit 132 further comprises a second subband selection sub-unit 133 determining the selected intermediate subbands based on a number of the intermediate subbands required for achieving the accuracy. The output of the second level 1 decomposition unit 130 that applies the multiresolution decomposition to the Image Y producing intermediate subbands at the level 1 for processing at level 2 is fed to the input of the second level j decomposition unit 131, applying the multiresolution decomposition to only selected intermediate subbands produced by the multiresolution decomposition performed at the level j–1, with j ranging from 2 to N.

Figure 1E:
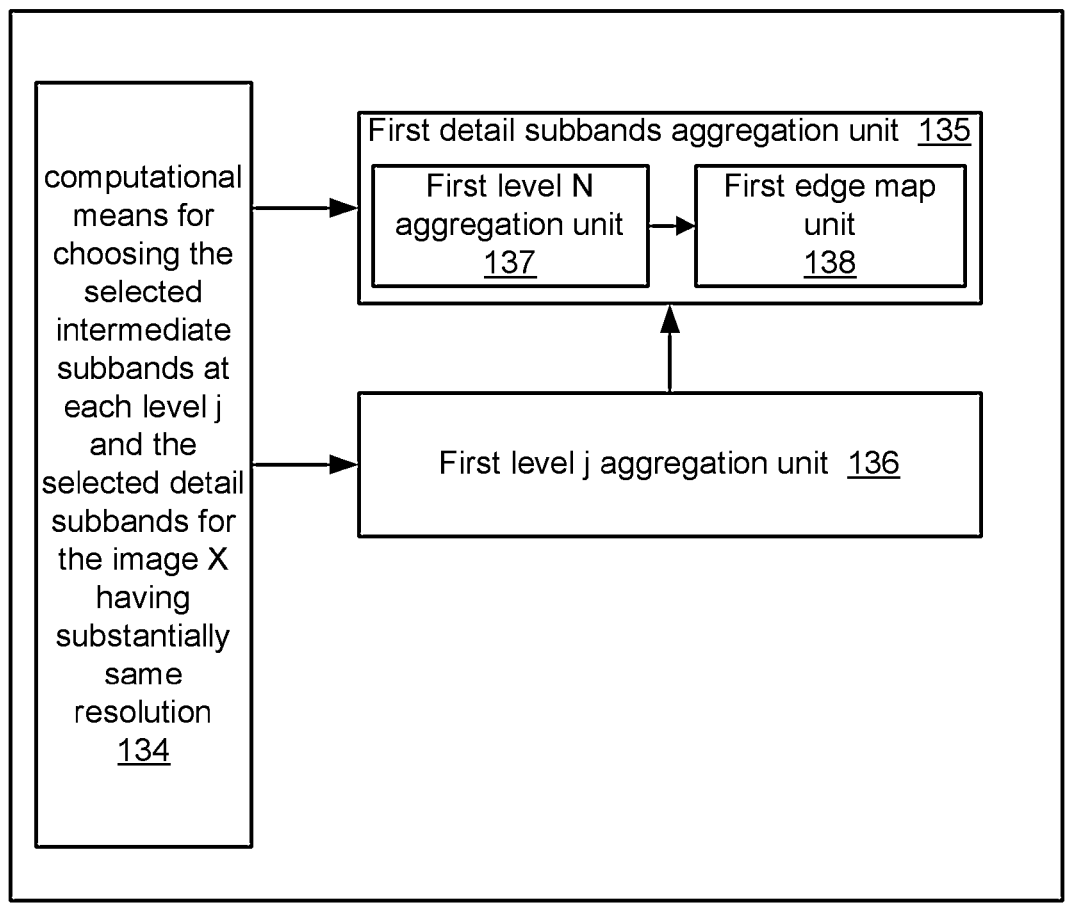
FIG. 1(e) illustrates the first aggregation unit 113 of FIG. 1(a) in more detail.

The components of the first aggregation unit 113 are presented in FIG. 1(e). The first aggregation unit 113 comprises a first detail subbands aggregation unit 135, a first level j aggregation unit 136 and computational means for choosing the selected intermediate subbands at each level j and the selected detail subbands for the image X having substantially the same resolution 134. The first level j aggregation unit 136 determines an edge map at the level j for the image X as a function of the square of selected intermediate subbands produced at said each level j (j=1 to N−1). Please note that only some of the intermediate subbands produced at the level j, for example subbands having substantially the same resolution, are chosen for aggregation leading to the edge map at the level j. The output of the first level j aggregation unit 136 is processed by the first detail subbands aggregation unit 135 that aggregates one or more of selected detail subbands of the image X produced at level N with one or more of the selected intermediate subbands produced at each level j. The computational means for choosing the selected intermediate subbands at each level j and the selected detail subbands for the image X having substantially same resolution 134 are used by the first detail subbands aggregation unit 135 and the first level j aggregation unit 136 for selecting the intermediate subbands at each level j and the detail subbands for the image X having substantially the same resolution for aggregating. Please note that j is merely an index variable and can assume any integer value between 1 and N−1. The first detail subbands aggregation unit 135 in turn comprises a first level N aggregation unit 137 and a first edge map unit 138. The first level N aggregation unit 137 determines an edge map at the level N for the image X as a function of the square of the selected detailed subbands of the image X produced at the level N whereas the first edge map unit 138 determines the edge map of the image X as a weighted sum of the edge maps at the level j and the edge map at the level N that is received from the first level N aggregation unit 137.

Figure 1F:
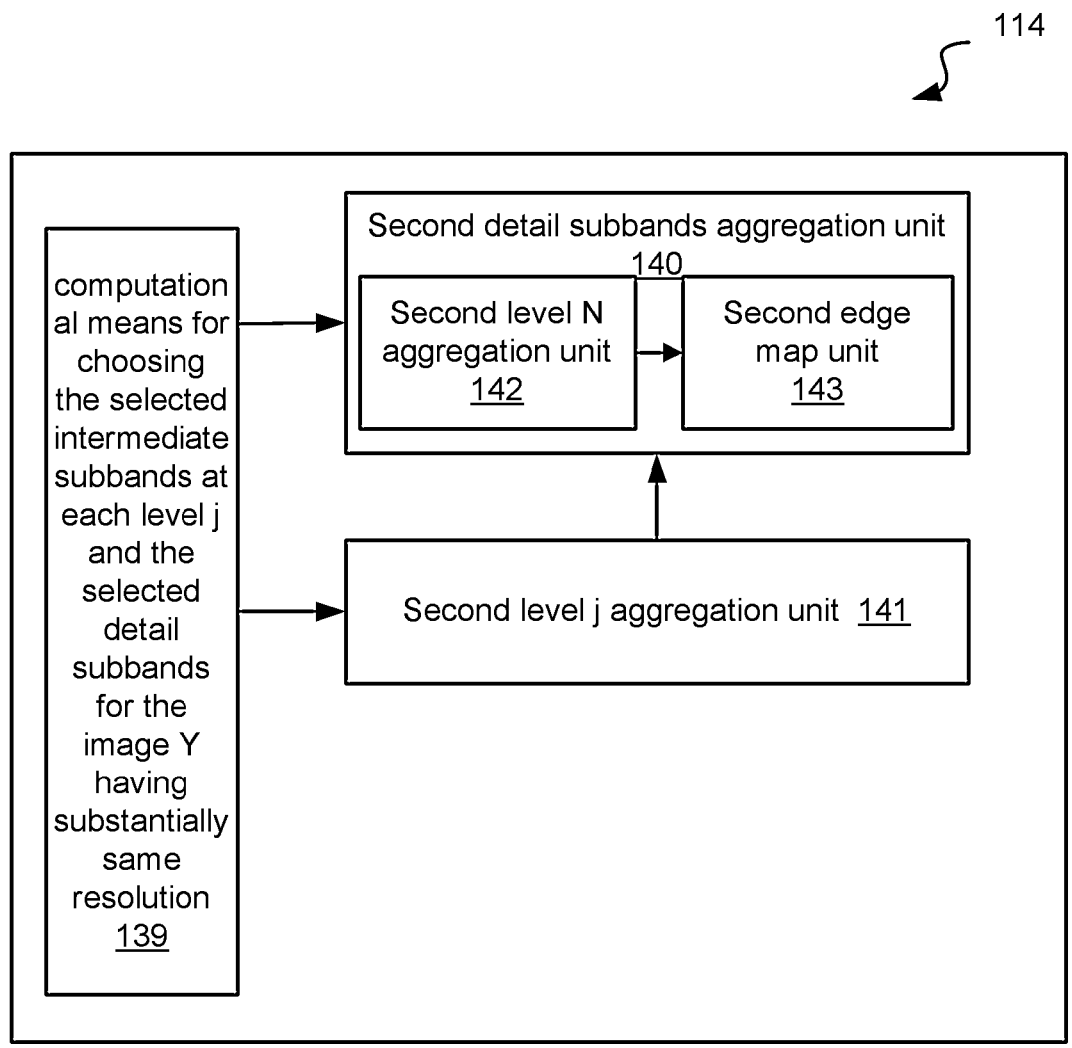
FIG. 1(f) illustrates the second aggregation unit 114 of FIG. 1(a) in more detail.

The components of the second aggregation unit 114 are presented in FIG. 1(f). The second aggregation unit 114 comprises a second detail subbands aggregation unit 140, a second level j aggregation unit 141 and computational means for choosing the selected intermediate subbands at each level j and the selected detail subbands for the image Y having substantially same resolution 139. The second level j aggregation unit 141 determines an edge map at each level j (j=1 to N−1) for the image Y as a function of the square of the selected intermediate subbands produced at said each level j. The output of the second level j aggregation unit 141 is processed by the second detail subbands aggregation unit 140 that aggregates one or more of selected detail subbands of the image Y produced at level N with one or more of the selected intermediate subbands produced at each level j. The computational means for choosing the selected intermediate subbands at each level j and the selected detail subbands for the image Y having substantially same resolution 139 are used by the second detail subbands aggregation unit 140 and the second level j aggregation unit 141 for selecting the intermediate subbands at each level j and the detail subbands for the image Y having substantially the same resolution for aggregating. Once again, please note that j is merely an index variable and can assume any integer value between 1 and N−1. The second detail subbands aggregation unit 140 in turn comprises a second level N aggregation unit 142 and a second edge map unit 143. The second level N aggregation unit 142 that determines an edge map at the level N for the image Y as a function of the square of the selected detailed subbands of the image Y produced at the level N whereas the second edge map unit 143 determines the edge map of the image Y as a weighted sum of the edge maps at the level j and the edge map at the level N that is received from the second level N aggregation unit 142.

Figure 1G:
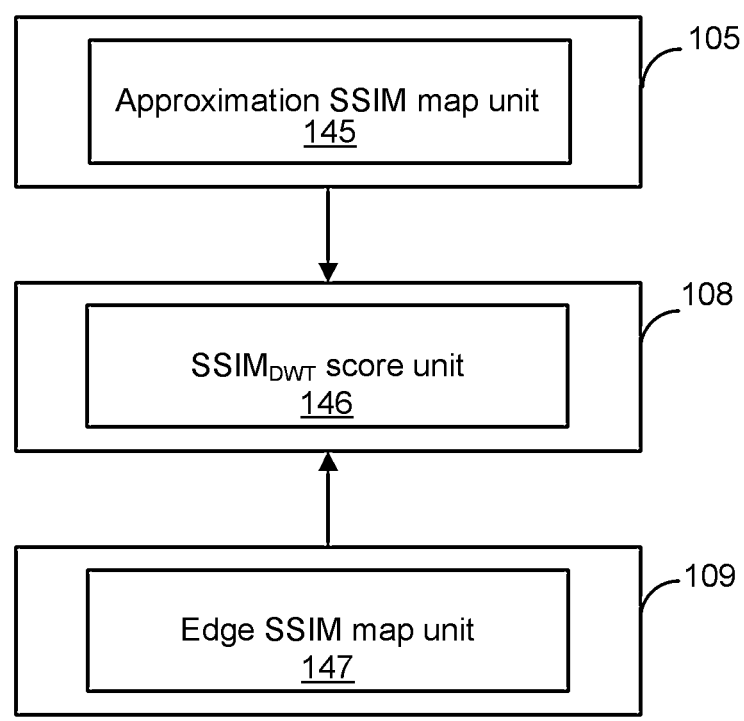
FIG. 1(g) illustrates the approximation quality measure unit 105, the quality measure unit 108 and the edge quality measure unit 109 of FIG. 1(a) in more detail for an alternate embodiment based on the SSIM IQM.

The general framework provided by the system 100 is used in alternate embodiments each of which uses a specific IQM in determining the measure of quality. The system of the embodiment based on the SSIM IQM is presented in FIG. 1(g). The approximation quality measure unit 105 in this embodiment comprises an approximation SSIM unit 145, the quality measure unit 108 comprises a $SSIM_{DWT}$ score unit 146 and the edge quality measure unit 109 comprises an edge SSIM map unit 147. The approximate SSIM map unit 145 applies a SSIM IQM to the approximation subband of the image X and the approximation subband of the image Y to produce an approximation SSIM map whereas the edge SSIM map unit 147 applies the SSIM IQM between the edge map of the image X and the edge map of the image Y to produce an edge SSIM map. The outputs of the approximation SSIM map unit 145 and the edge SSIM map unit 147 are processed by the $SSIM_{DWT}$ score unit 146 to determine a $SSIM_{DWT}$ score as the measure of quality.

Figure 1H:
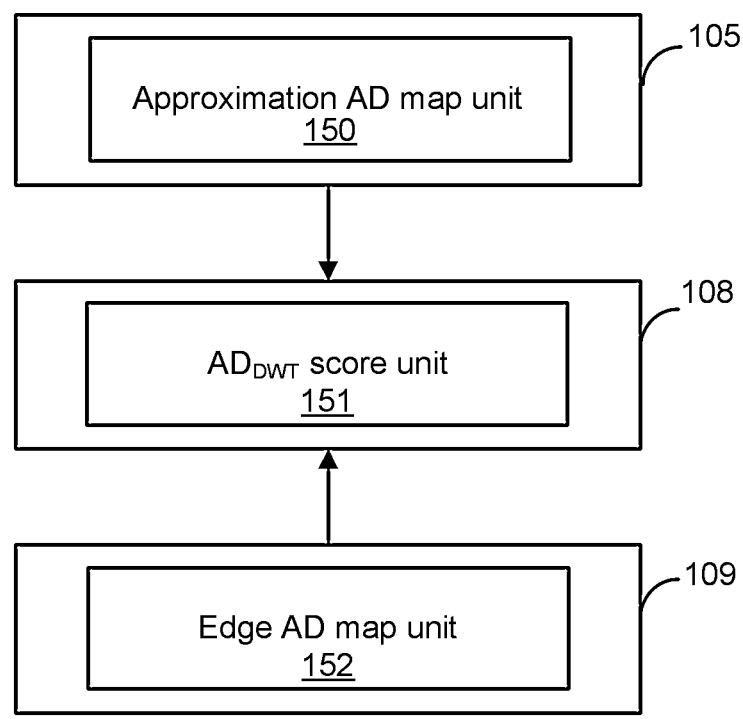
FIG. 1(h) illustrates the approximation quality measure unit 105, the quality measure unit 108 and the edge quality measure unit 109 of FIG. 1(a) in more detail for an alternate embodiment based on the AD IQM.

The system of the embodiment based on the AD IQM is presented in FIG. 1(h). The approximation quality measure unit 105 in this embodiment comprises an approximation AD map unit 150, the quality measure unit 108 comprises an $AD_{DWT}$ score unit 151 and the edge quality measure unit 109 comprises an edge AD map unit 152. The approximate AD map unit 150 applies an AD IQM to the approximation subband of the image X and the approximation subband of the image Y to produce an approximation AD map whereas the edge AD map unit 152 applies the AD IQM between the edge map of the image X and the edge map of the image Y to produce an edge AD map. The outputs of the approximation AD map unit 150 and the edge AD map unit 152 are processed by the $AD_{DWT}$ score unit 151 to determine an $AD_{DWT}$ score as the measure of quality.

Figure 1I:
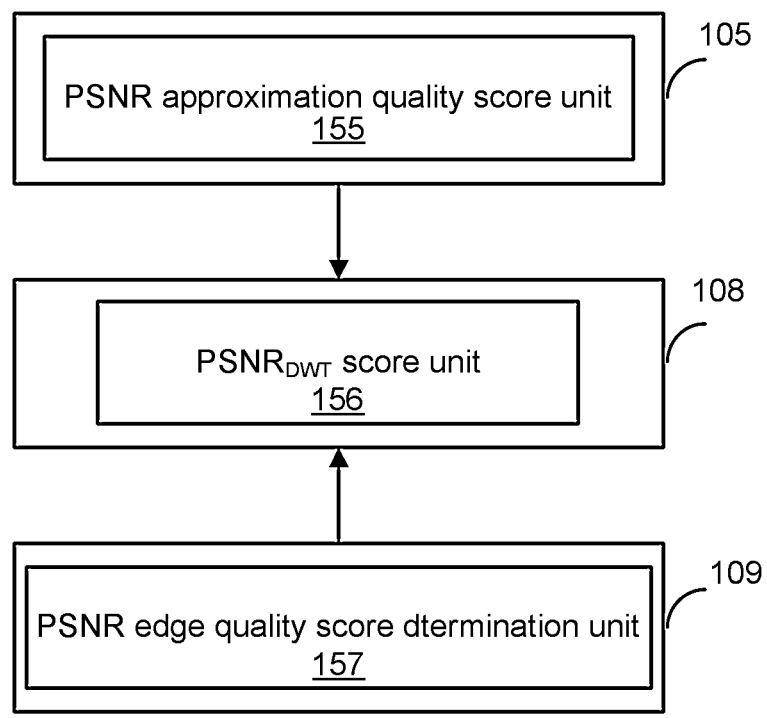
FIG. 1(i) illustrates the approximation quality measure unit 105, the quality measure unit 108 and the edge quality measure unit 109 of FIG. 1(a) in more detail for an alternate embodiment based on the PSNR IQM.

The system of the embodiment based on the PSNR IQM is presented in FIG. 1(i). The approximation quality measure unit 105 in this embodiment comprises a PSNR approximation quality score unit 155, the quality measure unit 108 comprises a $PSNR_{DWT}$ score unit 156 and the edge quality measure unit 109 comprises a PSNR edge quality score determination unit 157. The PSNR approximation quality score unit 155 applies the PSNR IQM to the approximation subband of the image X and the approximation subband of the image Y to produce a PSNR approximation quality score whereas the PSNR edge quality score determination unit 157 applies the PSNR IQM between the edge map of the image X and the edge map of the image Y to produce a PSNR edge quality score. The outputs of the PSNR approximation quality score unit 155 and the PSNR edge quality score determination unit 157 are processed by the $PSNR_{DWT}$ score unit 156 to determine a $PSNR_{DWT}$ score as the measure of quality.

Figure 1J:
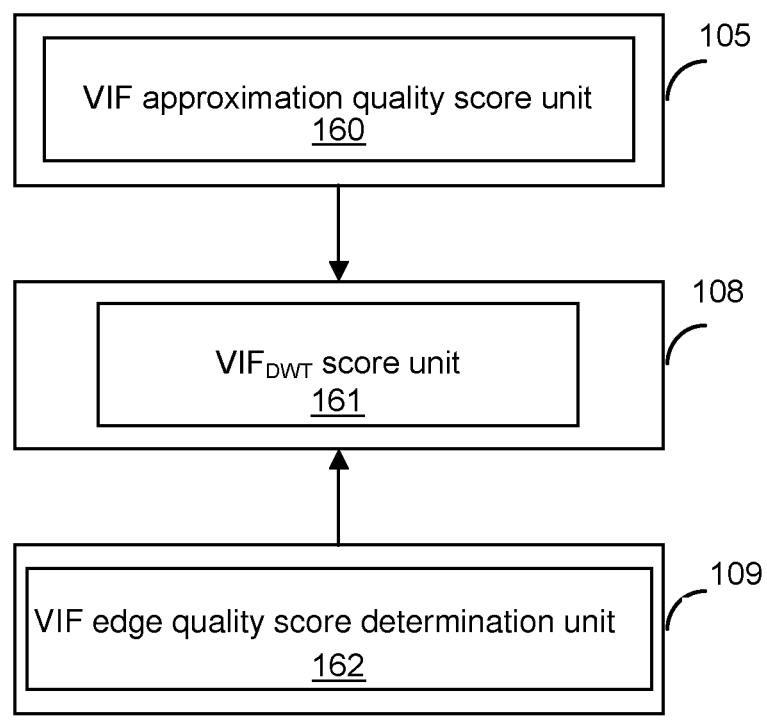
FIG. 1(j) illustrates the approximation quality measure unit 105, the quality measure unit 108 and the edge quality measure unit 109 of FIG. 1(a) in more detail for an alternate embodiment based n the VIF IQM.

The system of the embodiment based on the VIF IQM is presented in FIG. 1(j). The approximation quality measure unit 105 in this embodiment comprises a VIF approximation quality score unit 160, the quality measure unit 108 comprises a $VIF_{DwT}$ score unit 161 and the edge quality measure unit 109 comprises a VIF edge quality score determination unit 162. The VIF approximation quality score unit 160 applies the VIF IQM to the approximation subband of the image X and the approximation subband of the image Y to produce a VIF approximation quality score whereas the VIF edge quality score determination unit 162 applies the VIF IQM between the edge map of the image X and the edge map of the image Y to produce a VIF edge quality score. The outputs of the VIF approximation quality score unit 160 and the VIF edge quality score determination unit 162 are processed by the $VIF_{DWT}$ score unit 161 to determine a $VIF_{DWT}$ score as the measure of quality.

All the components of the system 100 that include units and sub-units 100, 102, 103, 104, 105, 106, 107, 108, 109, 113, 114, 115, 116, 117, 118, 120, 121, 124, 125, 126, 127, 130, 131, 132, 133, 135, 136, 137, 138, 140, 141, 142, 143, 145, 146, 147, 150, 151, 152, 155, 156, 157, 160, 161 and 162 include a firmware or, alternatively, computer readable instructions stored in a computer readable storage medium for execution by a processor. All the computational means including 110, 111, 112, 134 and 139 comprise computer readable code performing methods, procedures, functions or subroutines which are stored in a computer readable storage medium to be executed by a CPU.

Figure 1K:
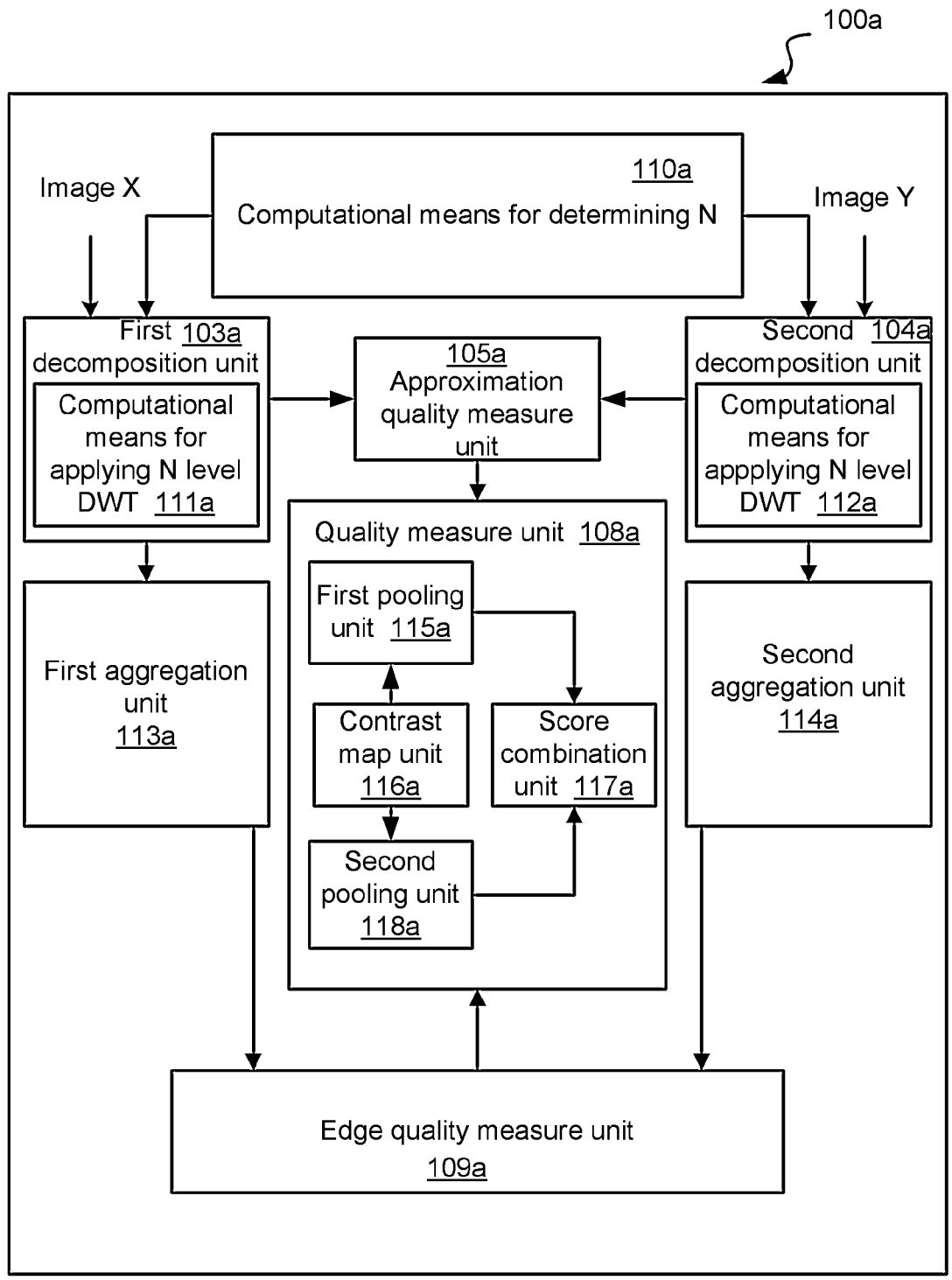
FIG. 1(k) presents system 100a, an alternate embodiment of the invention.

An alternate embodiment for the general framework presented in FIG. 1(k) is discussed next. System 100a determining a measure of quality for images comprises computational means for determining N 110a, a first decomposition unit 103a, a second decomposition unit 104a, an approximation quality measure unit 105a, a first aggregation unit 113a, a second aggregation unit 114a, a quality measure unit 108a and an edge quality measure unit 109a. The units 103a, 104a, 105a, 108a, 109a, 115a, 116a, 117a and 118a are the same as the units 103, 104, 105, 108, 109, 115, 116, 117 and 118 of system 100 and are not discussed any further. The computational means 110a, 111a, 112a, 134a and 139a are the same as the computational means 110, 111, 112, 134 and 139 of system 100 presented earlier.

Figure 1L:
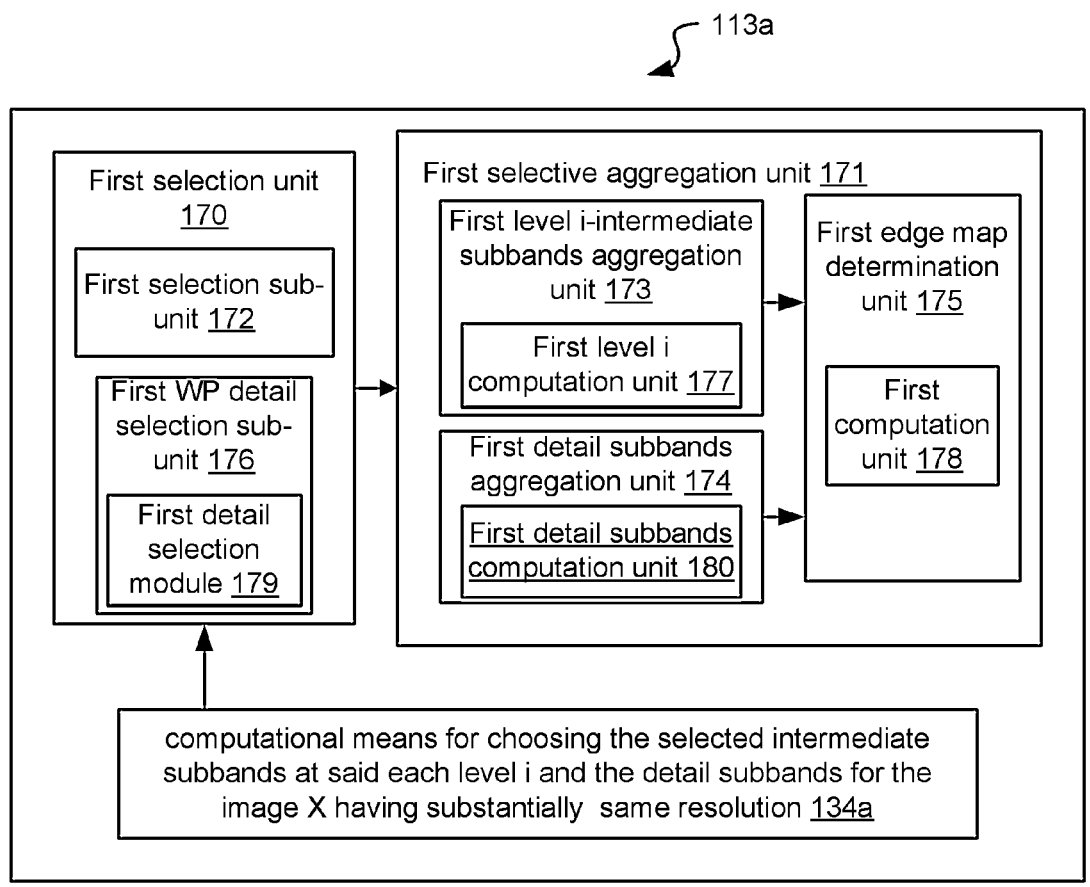
FIG. 1(l) illustrates the first aggregation unit 113a of FIG. 1(k) in more detail.

As shown in FIG. 1(l), the first aggregation unit 113a processing image X comprises a first selection unit 170 the output of which is connected to the input of the first selective aggregation unit 171. The first selection unit 170 selects the intermediate subbands at each level i, with i ranging from 1 to N−1, and the detail subbands for the image X based on an accuracy to be achieved in determining the measure of quality. The first selective aggregation unit 171 aggregates only the selected intermediate subbands and the selected detail subbands for the image X. The first aggregation unit 113a further comprises computational means for choosing the selected intermediate subbands at each level i and the selected detail subbands for the image X having substantially same resolution 134a. 134a is similar to 134 discussed earlier and is used for selecting the intermediate subbands and the detail subbands that have substantially the same resolution for aggregating. The first selection unit 170 further comprises a first selection sub-unit 172 that selects the intermediate subbands at each level i and the detail subbands for the image X based on a number of the intermediate and the detailed subbands required for achieving the accuracy. In another alternate embodiment, the first selection unit comprises a first wavelet packet (WP) detail selection sub-unit 176 that selects one or more of the level i-WP approximation subbands and one or more of the detail subbands for the image X. The first WP detail subbands selection sub-unit 176 in turn comprises a first detail selection module 179 for including one or more of the level i-detail subbands for the image X in the selecting.

The first level i-intermediate subbands aggregation unit 173 comprises a first level i computation unit 177 for squaring each selected intermediate subband for the image X for each level i (i=1 to N−1); multiplying a result of the squaring performed with a predetermined weight for said each selected intermediate subband for the image X; summing a product resulting from the multiplying performed in the step; and applying a square root function to a result of the summing performed producing the edge map at the level i for the image X. The first detail subbands aggregation unit 174 comprises a first detail subbands computation unit 180 for squaring each said selected detail subband for the image X; multiplying a result of the squaring performed in the step with a predetermined weight for said each selected detail subband for the image X; summing a product resulting from the multiplying performed in the step; and applying a square root function to the result of the summing performed in the step producing the edge map at the level N for the image X. The first edge map determination unit 175 comprises a first computation unit 178 for: multiplying the edge map at each level i for the image X with a predetermined weight for the level i; multiplying the edge map at the level N for the image X with a predetermined weight at the level N; and summing products resulting from the multiplying.

Figure 1M:
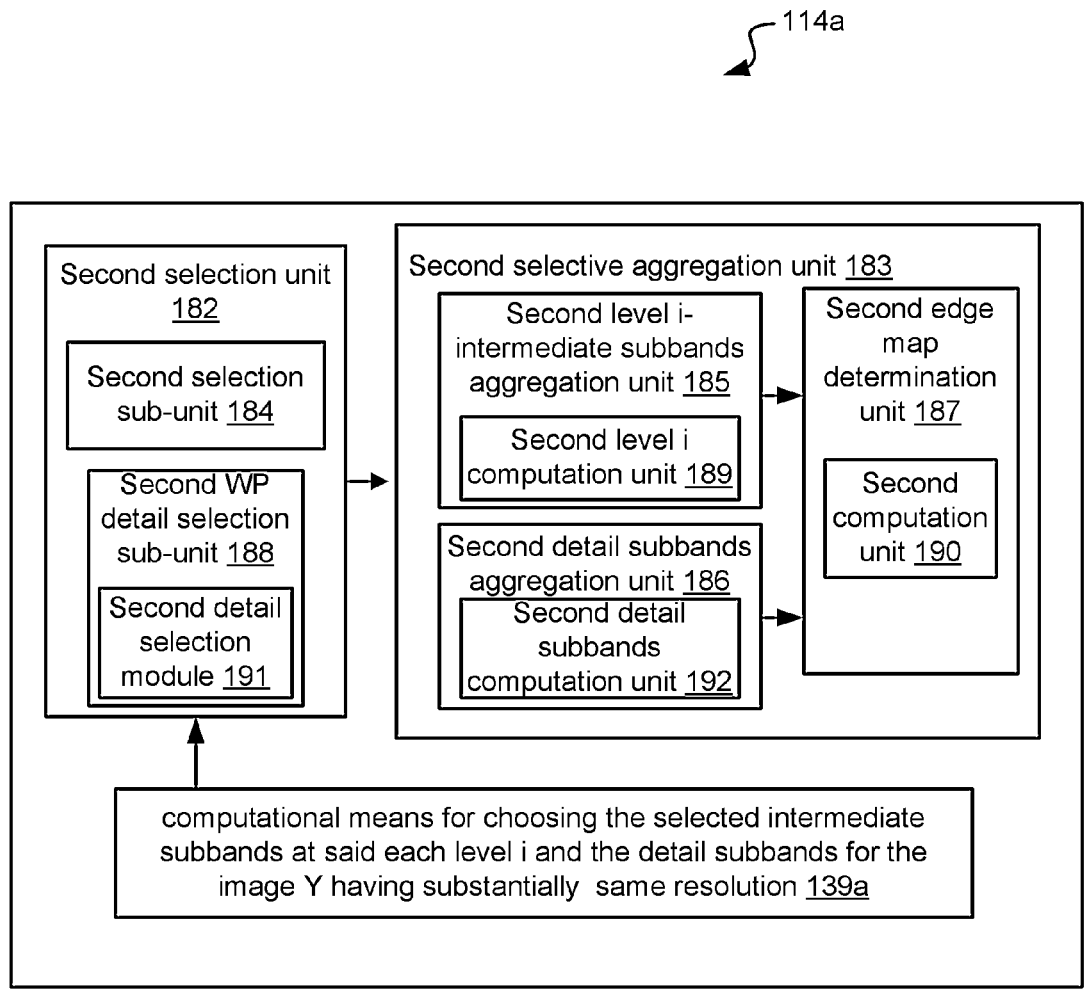
FIG. 1(m) illustrates the second aggregation unit 114a of FIG. 1(k) in more detail.

As shown in FIG. 1(m) the second aggregation unit 114a processing image Y comprises a second selection unit 182 the output of which is connected to the input of the second selective aggregation unit 183. The second selection unit 182 selects the intermediate subbands at each level i, with i ranging from 1 to N−1, and the detail subbands for the image Y based on an accuracy to be achieved in determining the measure of quality. The second selective aggregation unit 183 aggregates only the selected intermediate subbands and the selected detail subbands for the image Y. The second aggregation unit 114a further comprises computational means for choosing the selected intermediate subbands at each level i and the selected detail subbands for the image Y having substantially same resolution 139a. 139a is similar to 139 discussed earlier and is used for selecting the intermediate subbands and the detail subbands that have substantially the same resolution for aggregating. The second selection unit 182 further comprises a second selection sub-unit 184 that selects the intermediate subbands at each level i and the detail subbands for the image Y based on a number of the intermediate and the detailed subbands required for achieving the accuracy. In yet another alternate embodiment, the second selection unit 182 comprises a second WP detail selection sub-unit 188 that selects one or more of the level i-WP approximation subbands and one or more of the detail subbands for the image Y. The second WP detail subbands selection sub-unit 188 in turn comprises a second detail selection module 191 for including one or more of the level i-detail subbands for the image Y in the selecting.

The second level i-intermediate subbands aggregation unit 185 comprises a second level i computation unit 189 for squaring each selected intermediate subband for the image Y for said each level i; multiplying a result of the squaring performed in the step with a predetermined weight for said each selected intermediate subband for the image Y; summing a product resulting from the multiplying performed; and applying a square root function to a result of the summing performed producing the edge map at the level i for the image Y. The second detail subbands aggregation unit 186 comprises a second detail subbands computation unit 192 for squaring each said selected detail subband for the image Y; multiplying a result of the squaring performed with a predetermined weight for said each selected detail subband for the image Y; summing a product resulting from the multiplying performed; and applying a square root function to a result of the summing performed producing the edge map at the level N for the image Y. The second edge map determination unit 187 comprises a second computation unit 190 for: multiplying the edge map at each level i for the image Y with a predetermined weight for the level i; multiplying the edge map at the level N for the image Y with a predetermined weight at the level N; and summing products resulting from the multiplying.

Figure 1N:
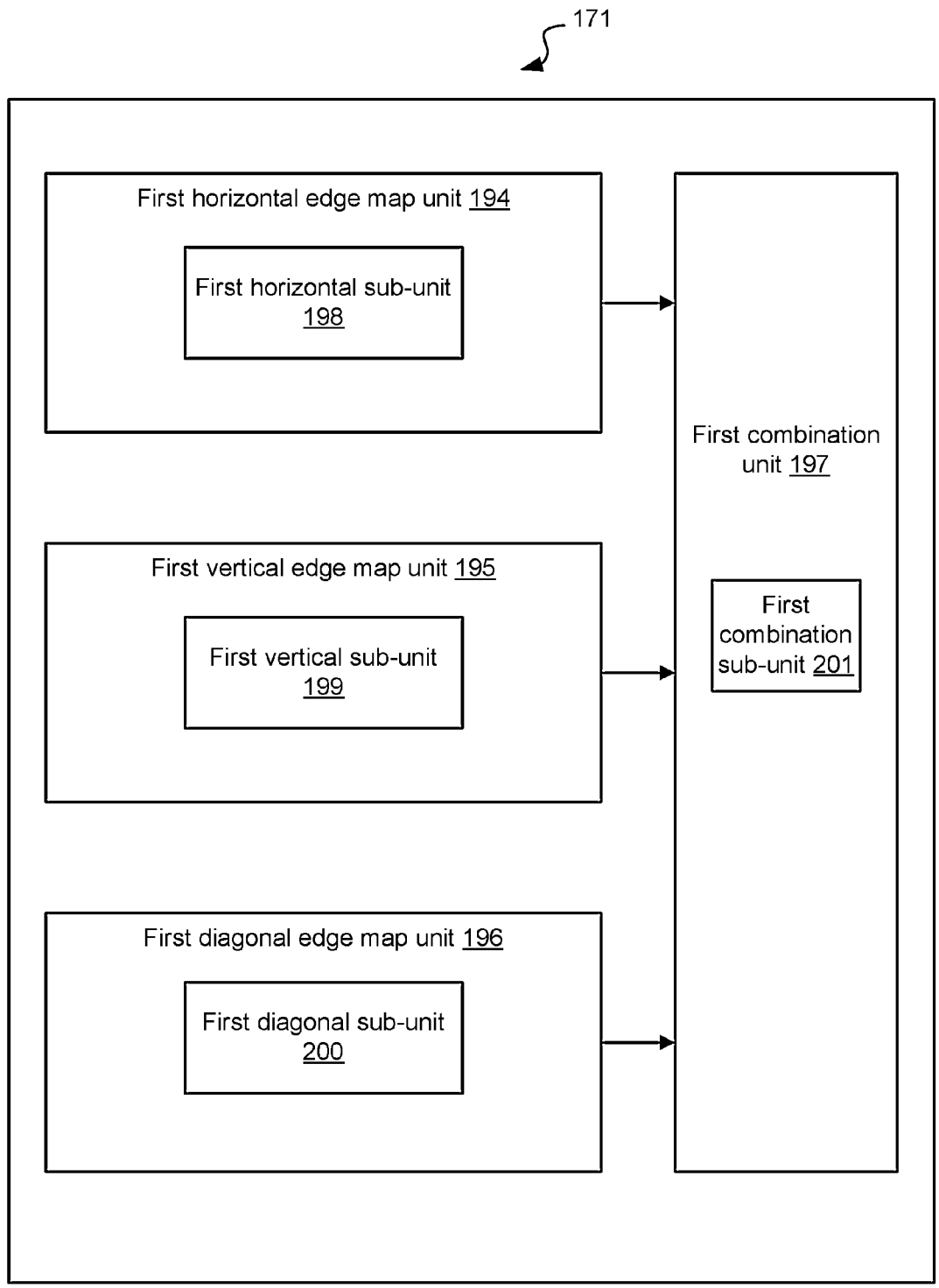
FIG. 1(n) illustrates the first selective aggregation unit 171 of FIG. 1(l) for an alternate embodiment in more detail.

The structure of the first selective aggregation unit 171 is presented in FIG. 1(n). The first selective aggregation unit comprises a first horizontal edge map unit 194, a first vertical edge map unit 195, and a first diagonal edge map unit 196 and a first combination unit 197. The intermediate subbands produced at the level i of decomposition include wavelet packet (WP) approximation and wavelet packet detail subbands. Each of these units, 194, 195 and 196 processes a particular type of WP approximation subband and WP detail subband. These subbands are discussed in more detail in a later part of this document. The first horizontal edge map unit 194 aggregates the level i-horizontal WP approximation subbands for the image X at each level i (i=1 to N−1) and the horizontal subband for the image X producing a horizontal edge map for the image X. The first vertical edge map unit 195 aggregates the level i-vertical WP approximation subbands for the image X at each level i and the vertical subband for the image X producing a vertical edge map for the image X. The first diagonal edge map unit 196 aggregates the level i-diagonal WP approximation subbands for the image X at each level i and the diagonal subband for the image X producing a diagonal edge map for the image X. The horizontal, vertical and the diagonal edge maps of the image X are aggregated by the first combination unit 197.

The level i-WP detail subbands for the image X further comprise for each respective image, a level i-WP horizontal subband, a level i-WP vertical subband and a level i-WP diagonal subband. The first horizontal edge map unit 194 comprises a first horizontal sub-unit 198 that includes the level i-WP horizontal subband for the image X in the aggregating. The first vertical edge map unit 195 comprises a first vertical sub-unit 199 that includes the level i-WP vertical subband for the image X in the aggregating. The first diagonal edge map unit 196 comprises a first diagonal sub-unit 200 that includes the level i-WP diagonal subband for the image X in the aggregating. The first combination unit 197 in turn comprises a first combination sub-unit 201 applying a square root function to the horizontal edge map, the vertical edge map and the diagonal edge map for the image X and summing results of applying the square root function.

Figure 1O:
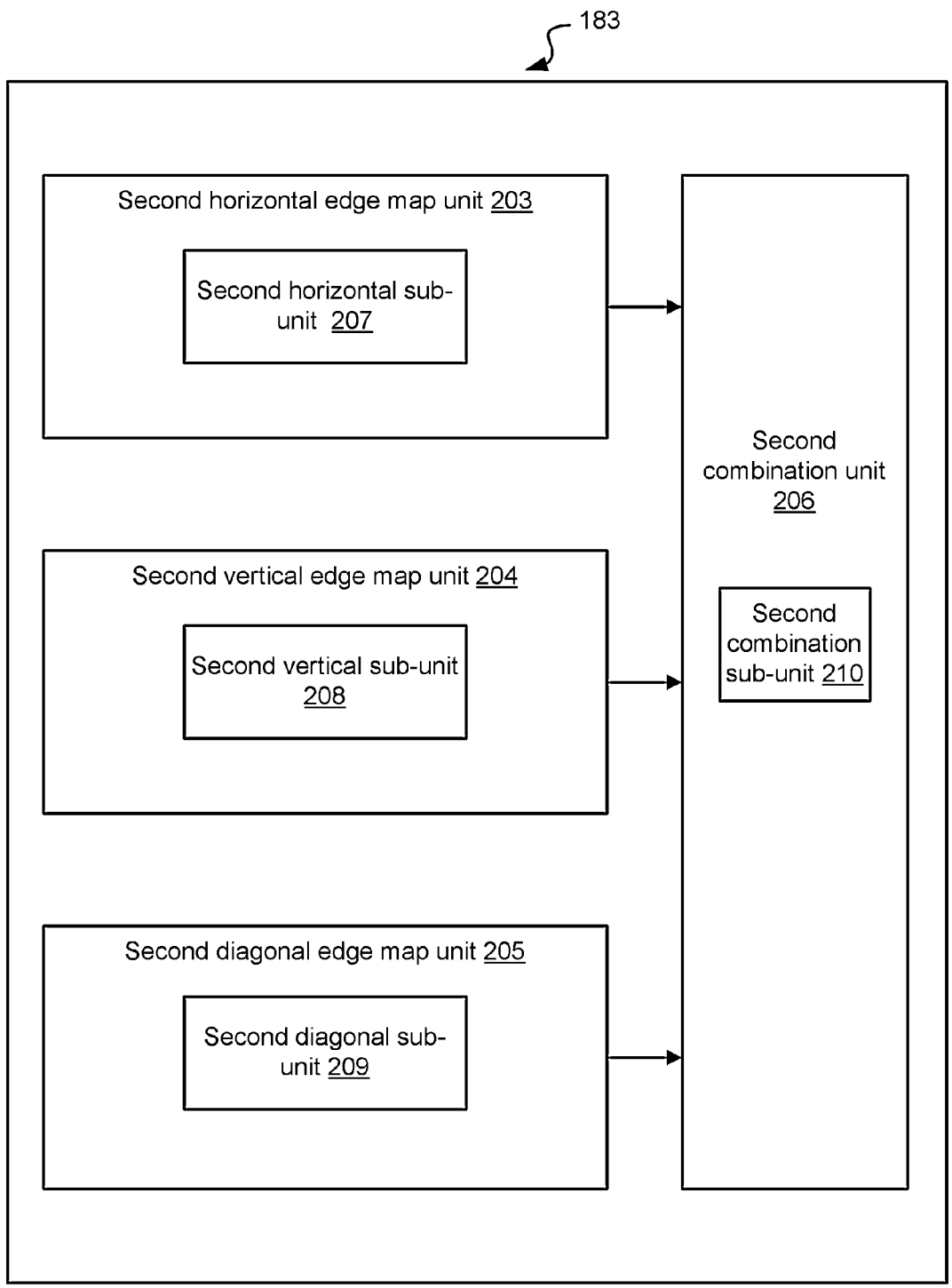
FIG. 1(o) illustrates the second selective aggregation unit 183 of FIG. 1(m) for an alternate embodiment in more detail.

The structure of the second selective aggregation unit 183 is presented in FIG. 1(o). The second selective aggregation unit comprises a second horizontal edge map unit 203, a second vertical edge map unit 204, a second diagonal edge map unit 205 and a second combination unit 206. The second horizontal edge map unit 203 aggregates the level i-horizontal WP approximation subbands for the image Y at each level i (i=1 to N−1) and the horizontal subband for the image Y producing a horizontal edge map for the image Y. The second vertical edge map unit 204 aggregates the level i-vertical WP approximation subbands for the image Y at each level i and the vertical subband for the image Y producing a vertical edge map for the image Y. The second diagonal edge map unit 205 aggregates the level i-diagonal WP approximation subbands for the image Y at each level i and the diagonal subband for the image Y producing a diagonal edge map for the image Y. The horizontal, vertical and the diagonal edge maps of the image Y are aggregated by the second combination unit 206.

As in the case of image X, the level i-WP detail subbands for the image Y further comprise for each respective image, a level i-WP horizontal subband, a level i-WP vertical subband and a level i-WP diagonal subband. The second horizontal edge map unit 203 comprises a second horizontal sub-unit 207 that includes the level i-WP horizontal subband for the image Y in the aggregating. The second vertical edge map unit 204 comprises a second vertical sub-unit 208 that includes the level i-WP vertical subband for the image Y in the aggregating. The second diagonal edge map, unit 205 comprises a second diagonal sub-unit 209 that includes the level i-WP diagonal subband for the image Y in the aggregating. The second combination unit 206 in turn comprises a second combination sub-unit 210 applying a square root function to the horizontal edge map, the vertical edge map and the diagonal edge map for the image Y and summing results of applying the square root function.

Figures 1P, 1Q:
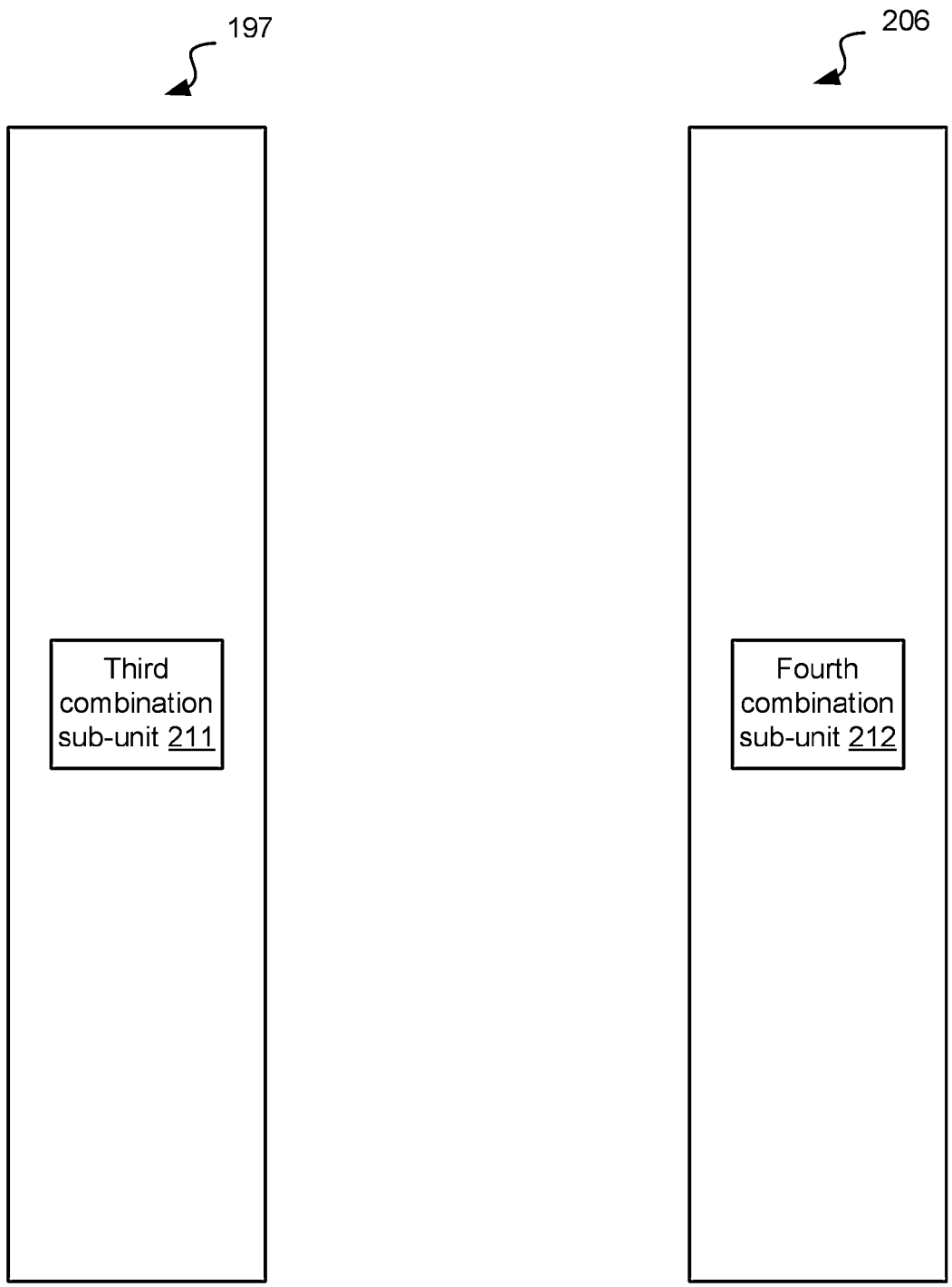
FIG. 1(p) illustrates the second combination unit 197 of FIG. 1(n) in more detail.
FIG. 1(q) illustrates the first combination unit 206 of FIG. 1(o) in more detail.

In an alternate embodiment a different set of mathematical operations is performed during the aggregation performed by the first combination unit 197 and the second combination unit. This embodiment first combination unit comprises a third combination sub-unit 211 (see FIG. 1(p)) and the second combination unit 206 comprises a fourth combination sub-unit 212 (see FIG. 1(q)). The third combination sub-unit 211 is used for summing the horizontal edge map, the vertical edge map and the diagonal edge map for the image X and applying a square root function to result of the summing performed. The fourth combination sub-unit 212 is used for summing the horizontal edge map, the vertical edge map and the diagonal edge map for the image Y and applying a square root function to result of the summing performed.

Figure 1R:
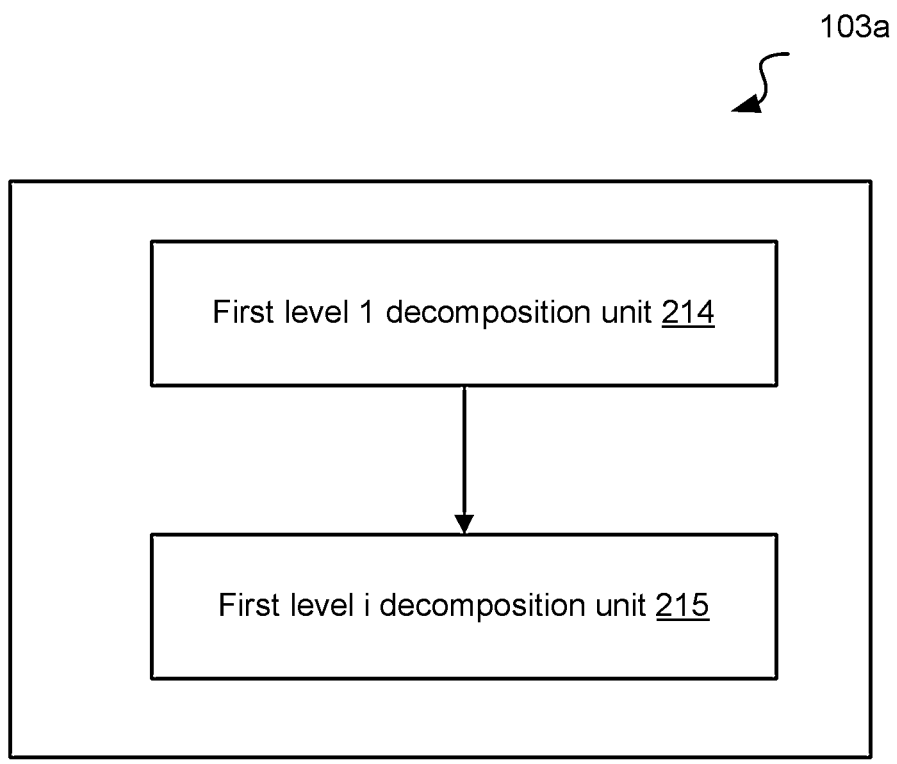
FIG. 1(r) illustrates the first decomposition unit 103a of FIG. 1(k) in more detail.

The first decomposition unit 103a shown in FIG. 1(r) comprises a first level 1 decomposition unit 214 the output of which is used by a first level i decomposition unit 215. The first level 1 decomposition unit 214 applies the multiresolution decomposition to the image X producing intermediate subbands at the level 1 for processing at level 2 whereas the first level i decomposition unit 215 applies the multiresolution decomposition to the selected intermediate subbands produced by the multiresolution decomposition performed at the level i−1, with i ranging from 2 to N.

Figure 1S:
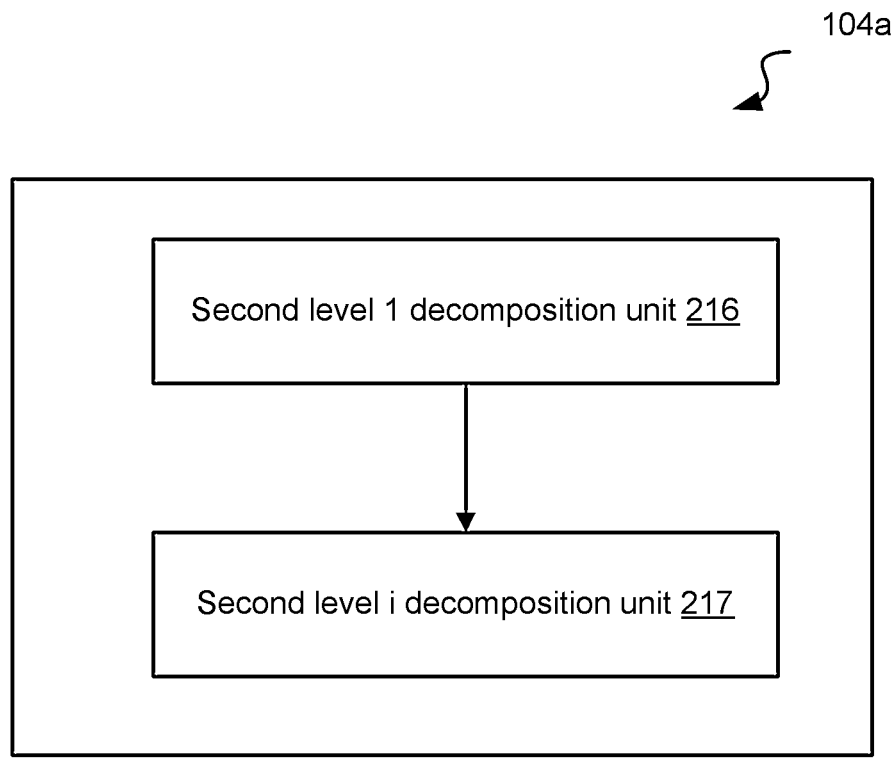
FIG. 1(s) illustrates the second decomposition unit 104a of FIG. 1(k) in more detail.

The second decomposition unit 104a shown in FIG. 1(s) comprises a second level 1 decomposition unit 216 the output of which is used by a second level i decomposition unit 217. The second level 1 decomposition unit 216 applies the multiresolution decomposition to the image Y producing intermediate subbands at the level 1 for processing at level 2 whereas the second level i decomposition unit 217 applies the multiresolution decomposition to the selected intermediate subbands produced by the multiresolution decomposition performed at the level i−1, with i ranging from 2 to N.

As in the case of the general framework for the system 100, the general framework of the system 100a can be used in conjunction with various IQMs each of which leads to a specific embodiment.

All the components of the system 100a that include units and sub-units and modules labeled with reference numerals 103a, 104a, 105a, 108a, 109a, 113a, 114a, 115a, 116a, 117a, 118a, 170,171, 172, 173, 174, 175, 176, 177, 178, 179, 180, 182, 183, 184, 185, 186, 187, 188, 189, 190, 191, 192, 194, 195, 196, 197, 198, 199, 200, 201, 203, 204, 205, 206, 207, 208, 209, 210, 211, 212, 214, 215, 216 and 217 include a firmware or, alternatively, computer readable instructions stored in a computer readable storage medium for execution by a processor. All the computational means labeled with reference numerals 110a, 111a,112a, 134a and 139a comprise computer readable storage medium having computer readable code for execution by a CPU, performing methods, procedures, functions or subroutines as described in this application.

Figure 2A:
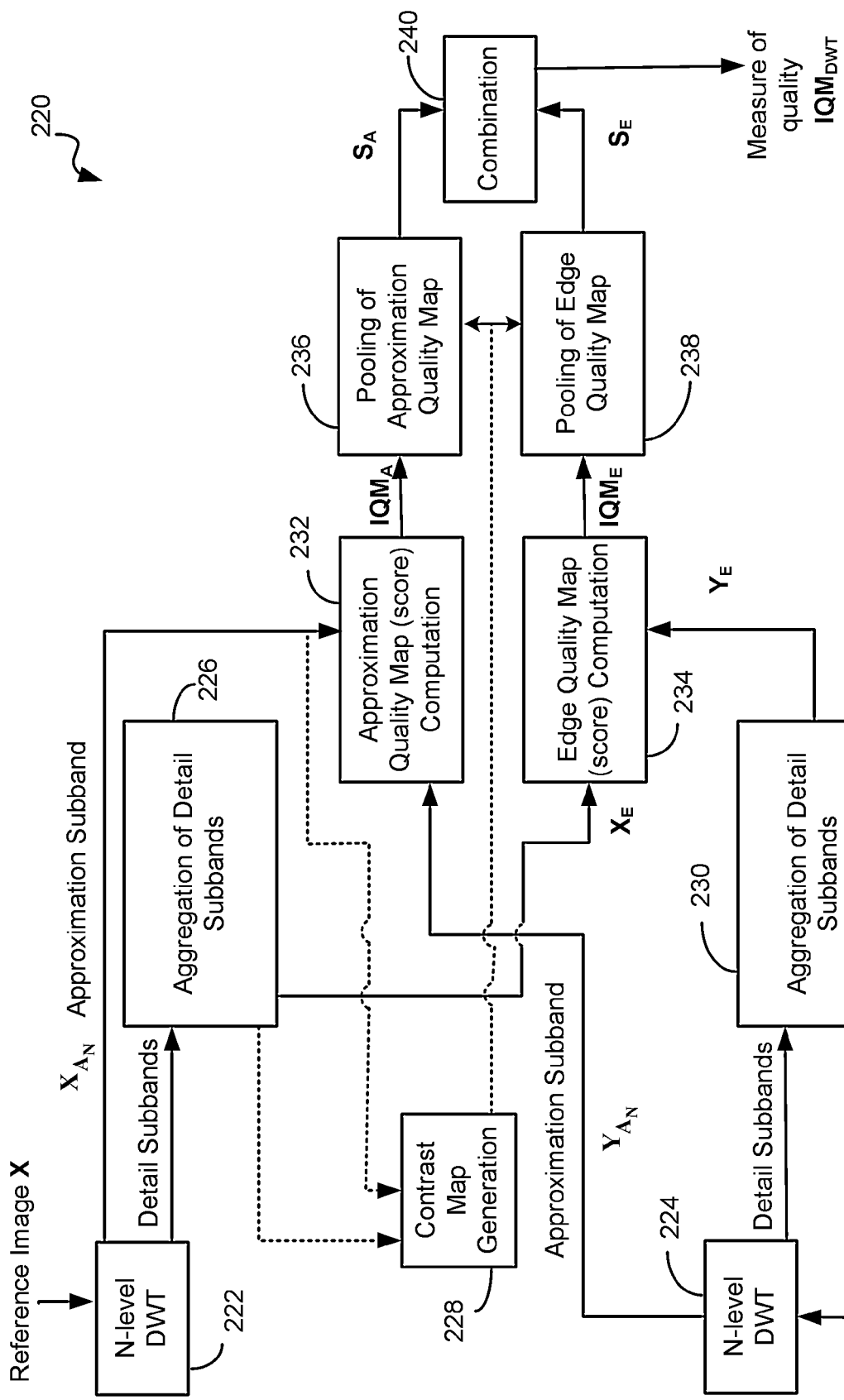
FIG. 2 (a) presents a block diagram providing a high level description of the method used by the embodiments of the invention for computing the measure of quality.

A high level description of the technique used by the framework to determine the measure of quality is captured in diagram 220 displayed in FIG. 2(a). The procedure starts with performing a N level DWT on the reference image (box 222) and the distorted image (box 224). The multiresolution decomposition achieved through the application of the DWT produces approximation subbands and detail subbands for both the images. The approximation subbands of both the images are processed to compute an approximation quality measure (box 232). Please note that depending on the IQM used this quality measure can be a quality map or a quality score. The detail subbands of both the original and the distorted image are aggregated (box 226 and box 230). These aggregates are then processed to compute an edge quality measure, map or score (box 234). The map or index determined depends on the IQM used in the generation of the measure of quality and is discussed in detail in a later section. For certain IQMs (described in a later section) a contrast map needs to be generated (box 228). Generating a contrast map, includes assigning corresponding values to the pixels of the approximation subband and the edge map of the image according to their respective importance to human visual system. The contrast map is used in pooling of the approximation quality map (box 236) and the pooling of the edge quality map (box 238). The results of the two pooling operations are then combined to produce the measure of quality for the distorted image (box 240). With IQMs, for which the contrast map is not used, the approximation quality measure, and the edge quality measure, from box 232 and box 234 respectively, are combined by box 240 to produce the measure of quality.

Figure 2B:
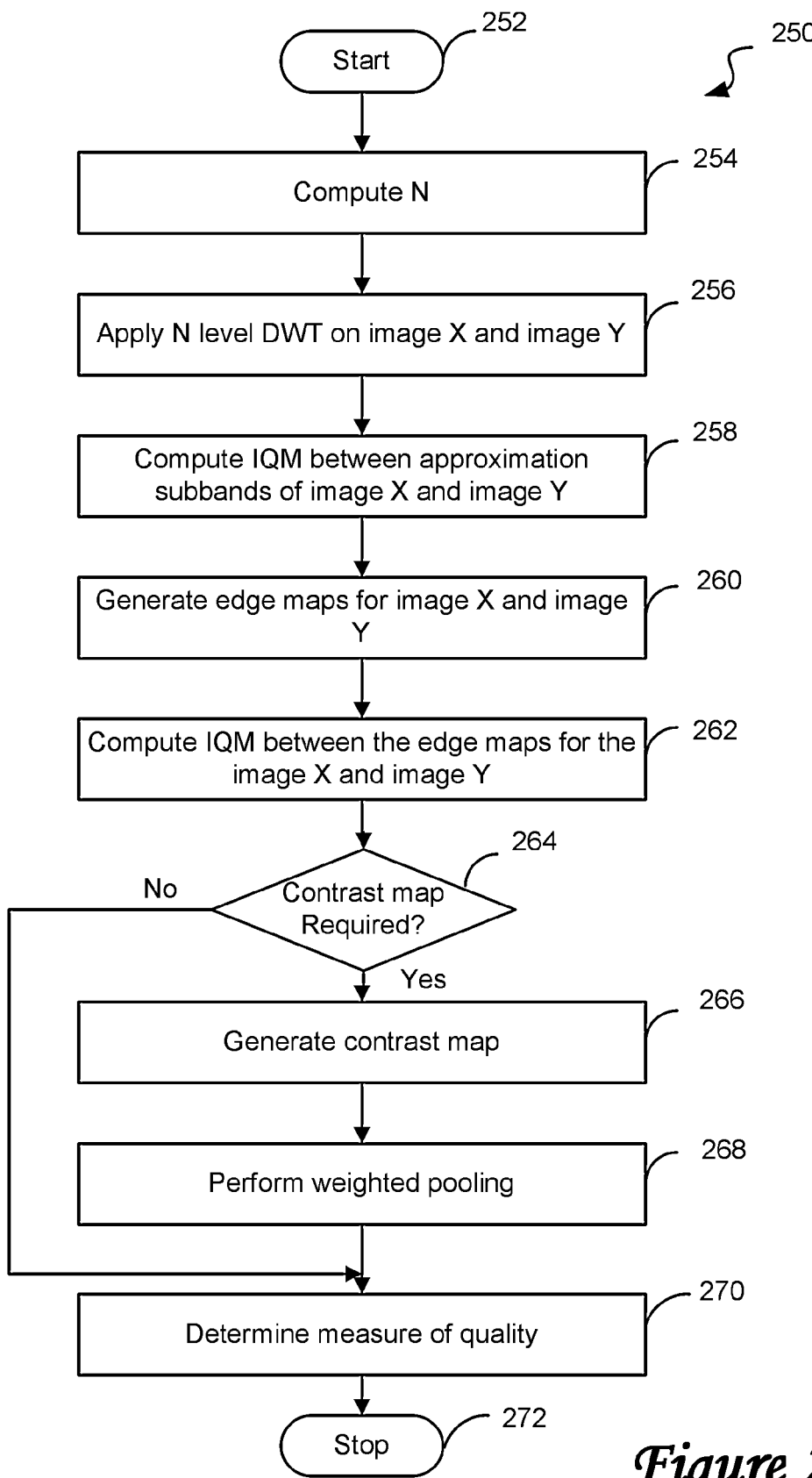

Two selection processes are used in the invention. The first is used at level i of decomposition (i=1 . . . N−1) for selecting the intermediate subbands produced by the multiresolution decomposition performed at the level i−1 of the image X or Y on which the multiresolution decomposition will be applied at the level i. The second is for selecting the intermediate subbands at each level i, and the detail subbands for the image X or Y that are to be aggregated. The selections are performed in a way that strikes an effective tradeoff between accuracy and computational overhead. The selection processes can be based on a number of the subbands required for achieving the accuracy. The method of the embodiment based on the technique deployed in the framework is explained with the help of FIG. 2(b). Upon start (box 252), the procedure 250 computes N, the number of levels for the DWT (box 254). N can be computed by using one or more of a resolution (or size) of the image Y, a viewing distance for the image Y, and an image quality metric (IQM) applied to the image Y. The procedure 250 determines this number of levels of decomposition N as a function of a minimum size of the approximation subband, S, which produces a substantially peak response for human visual system. Thus, the value of N is determined in such a way that it leads to a resolution for the approximation subband at which the corresponding maximum frequency is close to the peak sensitivity of the human visual system (i.e. the maximum value of the spatial frequency response of the human visual system).

As discussed by Y. Wang, J. Ostermann and Y.-Q. Zhang in "Video Processing Communications", Prentice Hall, 2001, the spatial frequency response is typically a curve of the human contrast sensitivity as a function of the spatial frequency represented in cycles per degree (CPD). This peak is between 2 and 4. The values of N used are tailored to the specific IQM used as discussed in later sections of this application. For certain IQMs N is a fixed value, but for error-based IQMs, such as PSNR or absolute difference (AD), the required number of decomposition levels, N, is formulated as follows. As described by M. R. Bolin, and G. W. Meyer, "A visual difference metric for realistic image synthesis", in Proc. SPIE Human Vision, Electron. Imag., vol. 3644, San Jose, 1999, pp. 106-120, when an image is viewed at the distance d of a display of height h, we have:

$$f_\theta = \frac{\pi}{180} \frac{d}{h} f_s \text{ (cycles/degree)} \quad (1a)$$

Where $f_\theta$ is the angular frequency which has a unit of cycle/degree (cpd), and $f_s$ denotes the spatial frequency. For an image of height H, the Nyquist theorem results in eq. (1b).

$$(f_s)_{max} = \frac{H}{2} \text{ (cycles/picture-height)} \quad (1b)$$

It is known that the HVS has a peak response for frequencies at about 2-4 cpd. So $f_\theta$ is fixed at 3. If the image is assessed at viewing distance of d=kh, using eq. (1a) and eq. (1b) yields eq. (1c).

$$H \geq \frac{360 f_\theta}{\pi(d/h)} = \frac{360 \times 3}{3.14 \times k} \approx \frac{344}{k} \quad (1c)$$

So, the effective size of an image for human eye assessment should be around (344/k). This implies that the minimum size of approximation subband after N-level decomposition should be approximately equal to (344/k). Thus, for an image of size H×W, N is approximately calculated as follows (considering that N must be non negative):

$$\frac{\min(H, W)}{2^N} \approx \frac{344}{k} \Rightarrow N = \text{round}\left(\log_2\left(\frac{\min(H, W)}{(344/k)}\right)\right) \quad (1d)$$

$$N \geq 0 \Rightarrow N = \max\left(0, \text{round}\left(\log_2\left(\frac{\min(H, W)}{\left(\frac{344}{k}\right)}\right)\right)\right) \quad (1e)$$

After determining N, a N level DWT using the Haar filter, for example, is performed on both the reference (image X) and distorted (image Y) images (box 256). With N level decomposition, the approximation subbands $X_{A_N}$ and $Y_{A_N}$ as well as a number of detail subbands, are obtained. For simplicity we refer to $X_{A_N}$ and $Y_{A_N}$ as $X_A$ and $Y_A$ respectively. Note that the method of the embodiments of the invention can readily use various other various wavelet filters. The Haar filter was chosen for its simplicity and good performance. Its simplicity imposes negligible computational burden on the algorithm. Based on simulations performed by the applicants, the Haar wavelet also provides more accurate measures of quality in comparison to other wavelet bases. The reason is that symmetric Haar filters have a generalized linear phase, so the perceptual image structures can be preserved. Also, Haar filters avoid over-filtering the image due to their short filter length.

In the next step, the procedure 250 computes the approximation quality measure, $IQM_A$, by applying an IQM between the approximation subbands of image X, $X_A$ and the approximation subband of image Y, $Y_A$, (box 258). The edge maps for image X and image Y are generated next (box 260). Please note that the edge maps only reflect the edge structures of images. An estimate of the image edges is formed for each image using an aggregate of the detail subbands. Various methods of performing aggregation of the detail subbands are used in multiple embodiments of the invention. One such method that performs a level by level aggregation is presented next. Alternate methods of subband aggregation such as cross-layer aggregation the edge maps of image X and image Y are deployed in alternate embodiments of this invention and are discussed in a later section of this invention.

With a level by level aggregation, aggregation is performed at each level i (i=1 to N). When a N level DWT is applied to the images, the edge map (edge estimate of the image) of image X is defined as:

$$X_E(m, n) = \sum_{L=1}^{N} X_{E,L}(m, n)$$

where $X_E$ is the edge map of X, and $X_{E,L}$ is the edge map at the decomposition level L, as defined in eq. (2). In eq. (2), $X_{H_L}$, $X_{V_L}$, and $X_{D_L}$ denote the horizontal, vertical, and diagonal detail subbands obtained at the decomposition level L for image X. An approximation subband contains main content of an image while the detail subbands contain edges of the image X. $X_{H_L,A_{N-L}}$, $X_{V_L,A_{N-L}}$, and $X_{D_L,A_{N-L}}$ are wavelet packet approximation subbands, obtained by applying an (N-L)-level DWT on $X_{H_L}$, $X_{V_L}$, and $X_{D_L}$ respectively. These are included in the intermediate subbands and are referred to as level L-WP approximation subbands. The parameters $\mu$, $\lambda$, and $\psi$ are weights associated with the various subbands used in eq. (2). As the HVS is more sensitive to the horizontal and vertical subbands and less sensitive to the diagonal one, greater weight is given to the horizontal and vertical subbands and a smaller weight to the diagonal subband. $\mu=\lambda=4.5\psi$ is used in the embodiment of this invention. This results in $\mu=\lambda=0.45$ and $\psi=0.10$ that satisfy eq. (3). The embodiments of the invention are flexible to accommodate various other values of these weights.

$$X_{E,L}(m, n) = \quad (2)$$

$$\begin{cases} \sqrt{\mu \cdot (X_{H_L}(m, n))^2 + \lambda(X_{V_L}(m, n))^2 + \psi(X_{D_L}(m, n))^2}, \text{ if } L = N \\ \sqrt{\mu \cdot (X_{H_L,A_{N-L}}(m, n))^2 + \lambda(X_{V_L,A_{N-L}}(m, n))^2 + \psi(X_{D_L,A_{N-L}}(m, n))^2}, \\ \text{if } L < N \end{cases}$$

$$\mu + \lambda + \psi = 1 \quad (3)$$

The edge map of Y is defined in a similar way as X. As an example, table 300 in FIG. 3(a1) displays the subbands of image X for N=2. Only selected subbands are used in generating the edge map. The subbands involved in computing the edge map are enclosed in double boxes in this figure. As discussed earlier, the edge map is intended to be an estimate of image edges. Thus, rather than considering all of them, the most informative subbands are used in forming the edge maps and computational overhead is reduced. According to simulations performed by the applicants, using all image subbands in computing the edge maps does not have a significant impact on increasing the accuracy of the measure of quality. As another example, table 302 in FIG. 3(a2) displays the subbands of image X for N=3. Only selected subbands are used in generating the edge map. The subbands involved in computing the edge map are enclosed in solid double boxes in this figure. When extended to N equal to or greater than 2 the technique used for selecting the subbands shown in FIG.

Figures 3(a1), 3(a2):
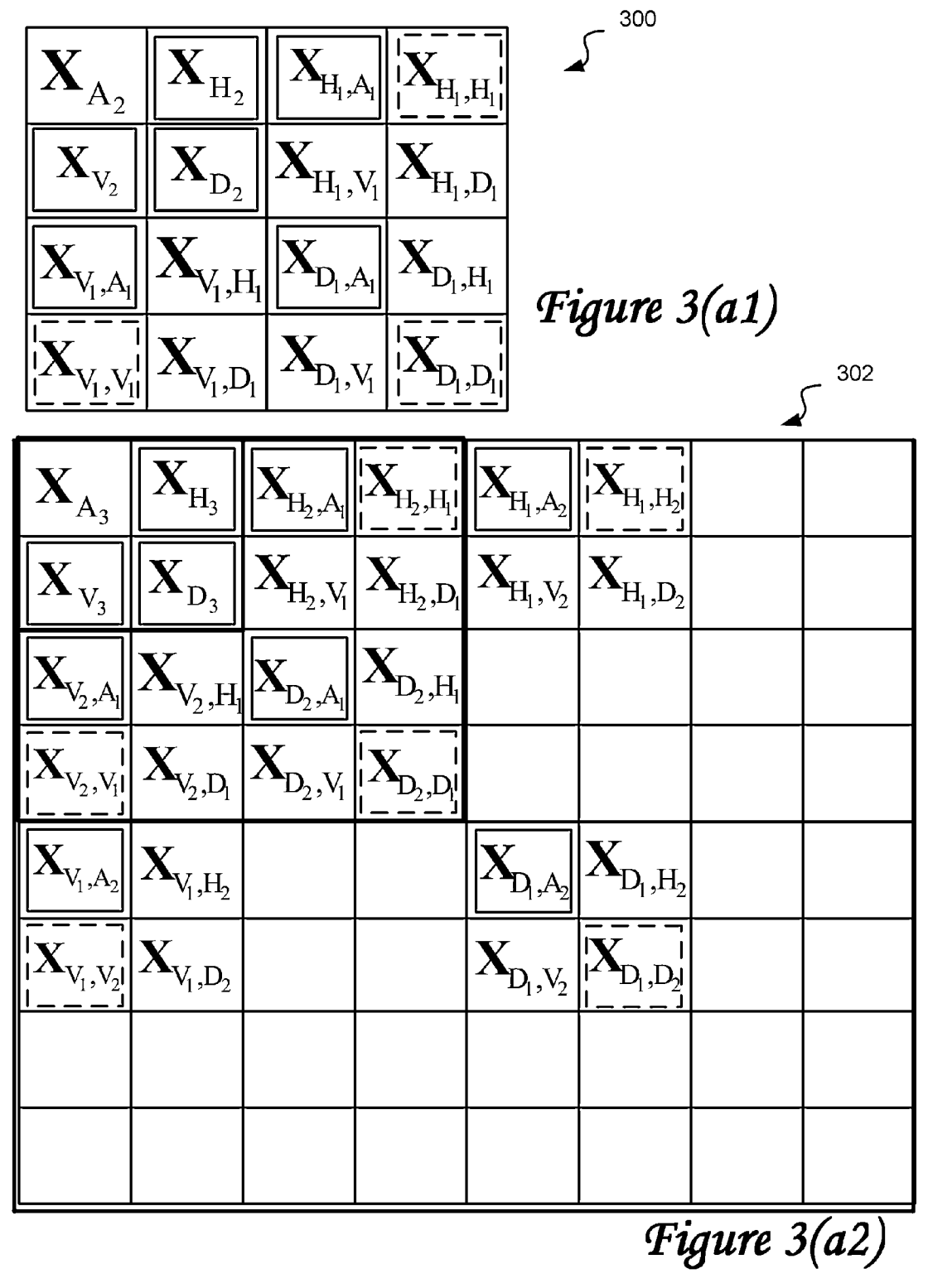

3(a1) and FIG. 3(a2) will lead to the selection of only 3N subbands. If all the generated subbands are used the generation of the edge map one would have to use $4^N-1$ subbands. When N is greater than or equal to 2, $4^N-1$ is much greater than 3N. Thus, the technique used by the embodiments of the invention lead to a great reduction in computational complexity. After generating the edge maps for the image X and the image Y, the IQM is applied between the edge maps $X_E$ and $Y_E$ (box 262). The resulting quality measure is called the edge quality measure, $IQM_E$. The term map or score to be used depending on the specific IQM used, as discussed in the following sections of this application. The procedure 250 then checks whether or not a contrast map needs to be generated (box 264). If so, the procedure exits 'YES' from box 264, and generates the contrast map (box 266). Such a contrast map is required in case of a number of IQMs. Certain IQMs including Absolute Difference (AD) and Structural Similarity Matrix (SSIM) generate intermediary quality maps that should be pooled to reach respective quality scores. In this step, the procedure 250 forms a contrast map for pooling the approximation and the edge quality maps. It is well known that the HVS is more sensitive to areas near the edges and is discussed by Z. Wang, and A. C. Bovik, in "Modern Image Quality Assessment", USA: Morgan & Claypool, 2006. Therefore, the pixels in the quality map near the edges are given more importance. In addition, as discussed by Z. Wang, and X. Shang, in "Spatial Pooling Strategies for Perceptual Image Quality Assessment", *Proc. IEEE Int. Conf. Image Process.*, Atlanta, October 2006, pp. 2945-2948, high-energy (or high-variance) image regions are likely to contain more information to attract the HVS. Thus, the pixels of the quality map within high-energy regions must also receive higher weights (more importance). Based on these facts, the edge map is combined with the computed variance to form a function called the contrast map. The contrast map is computed within a local Gaussian square window, which moves (pixel-by-pixel) over the entire edge maps $X_E$ and $Y_E$. As discussed by Z. Wang, A. Bovik, H. Sheikh, and E. Simoncelli, in "Image quality assessment: From error visibility to structural similarity", *IEEE Transactions on Image Processing*, vol. 13, no. 4, pp. 600-612, April 2004, a Gaussian sliding window $W=\{w_k | k=1, 2, K, K\}$ with a standard deviation of 1.5 samples, normalized to unit sum is used. The number of coefficients K is set to 16, that is, a window of size 4×4 is used. This window size is not too large and can provide accurate local statistics. The contrast map is defined as follows:

$$\text{Contrast}(x_E, x_{A_N}) = \left(\mu_{x_E}^2 \sigma_{x_{A_N}}^2\right)^{0.15} \quad (4)$$

$$\sigma_{x_{A_N}}^2 = \sum_{k=1}^{K} w_k \left(x_{A_N,k} - \mu_{x_{A_N}}\right)^2 \quad (5)$$

$$\mu_{x_E} = \sum_{k=1}^{K} w_k x_{E,k}, \quad \mu_{x_{A_N}} = \sum_{k=1}^{K} w_k x_{A_N,k} \quad (6)$$

where $x_E$ and $x_{A_N}$ denote image patches of $X_E$ and $X_{A_N}$ within the sliding window. Please note that the contrast map exploits the original image statistics to form the weighted function for quality map pooling. Picture 330 displayed in FIG. 3(*c*) demonstrates a resized contrast map, obtained by eq. (4), for a typical image shown in picture 320 presented in FIG. 3(*b*). As can be seen from FIG. 3(*b*) and FIG. 3(*c*), the contrast map clearly shows the edges and important image structures to the HVS. Brighter (higher) sample values in the contrast map indicate image structures which are more important to the HVS and play an important role in judging image quality. In the next step, the procedure uses the contrast map defined in (4) to perform weighted pooling of the approximation quality map $IQM_A$, and the edge quality map $IQM_E$ (box 268):

$$S_A = \frac{\sum_{j=1}^{M} \text{Contrast}(x_{E,j}, x_{A_N,j}) \cdot IQM_A(x_{A_N,j}, y_{A_N,j})}{\sum_{j=1}^{M} \text{Contrast}(x_{E,j}, x_{A_N,j})} \quad (7)$$

$$S_E = \frac{\sum_{j=1}^{M} \text{Contrast}(x_{E,j}, x_{A_N,j}) \cdot IQM_E(x_{E,j}, y_{E,j})}{\sum_{j=1}^{M} \text{Contrast}(x_{E,j}, x_{A_N,j})} \quad (8)$$

where $x_{E,j}$ and $X_{A_N,j}$ in the contrast map denote image patches in the j-th local window; $x_{A_N,j}$, $y_{A_N,j}$, $x_{E,j}$, and $y_{E,j}$ terms in the quality map are image patches (or pixels) in the j-th local window position; M is the number of pixels in the quality maps; $S_A$ and $S_E$ represent the approximation and edge quality scores respectively achieved after the weighted pooling operation.

The measure of quality for the image Y is determined next (box 270). In this step, the approximation and edge quality scores are combined linearly, as defined in eq. (9), to obtain the overall quality score $IQM_{DWT}$ between images X and Y.

$$IQM_{DWT}(X, Y) = \beta \cdot S_A + (1 - \beta) \cdot S_E \quad (9)$$

$$0 < \beta \leq 1$$

where $IQM_{DWT}$ gives the measure of quality for the image Y with respect to image X, and is a constant. As the approximation subband contains main image contents, should be close to 1 to give the approximation quality score ($S_A$) a higher importance. After generating the measure of quality the procedure 250 exits (box 272). If a particular embodiment of the invention uses an IQM that does not require a contrast map, the procedure 250 exits 'No' from box 264, skips boxes 266 and 268, combines the approximation quality measure and the edge quality measure to determine the measure of quality (box 270) and exits (box 272).

As mentioned earlier the alternate embodiments of the invention use other methods of performing aggregation and are discussed next.

Alternate Embodiments Deploying Alternate Methods of Generating Edge Maps

The methods used in performing aggregation of the detail subbands of the reference image X and the distorted image Y that are used in the generation of the edge maps for the image X and the image Y are explained with the help, of FIG. 3(*d*) and FIG. 3(*e*). Before explaining the steps of the method performing the aggregation a discussion of the underlying concepts is presented.

An estimate of the image edges is formed for each image X and Y using an aggregate of the detail subbands. If the N-level DWT is applied to the images, the edge map of image X is defined as in eq. (6).

$$X_E(m, n) = \sum_{L=1}^{N} \omega_L X_{E,L}(m, n) \quad (6a)$$

With normally $\omega_L \leq \omega_{L+1}$ for all L
where $X_E$ is the edge map of X, and $X_{E,L}$ is the edge map at level L for image X, computed as defined in eq. (2). The weights $\omega_L$ are used to associate various degrees of importance to the multiresolution decomposition performed at the different levels 1 to N. A set of predetermined weights are used for any level i (i=1 to N). Note that the value of L used in the equation is equal to i indicating the level.

There are other ways of aggregating the intermediate subbands produced at the levels 1 to N−1 and the detail subbands produced at the level N of the multiresolution decomposition. The aggregation may be performed level by level, or alternatively, a cross-level aggregation may be also performed. However, only subbands of the substantially same resolution are to be combined during the aggregation process. The level by level aggregation that was described earlier is generalized and presented for contrasting with the cross-layer aggregation. With the layer by layer method, aggregation of selected intermediate subbands is performed at each level i (i=1 to N−1) producing an edge map at level i whereas aggregation of selected detail subbands is performed at level N producing an edge map at the level N. Thus, eq. (2) can be generalized as:

$$X_{E,L}(m, n) = \begin{cases} \sqrt{\mu_L \cdot (X_{H_L}(m, n))^2 + \lambda_L (X_{V_L}(m, n))^2 + \psi_L (X_{D_L}(m, n))^2}, \\ \quad \text{if } L = N \\ \sqrt{\mu_L \cdot (X_{H_L, A_{N-L}}(m, n))^2 + \lambda_L (X_{V_L, A_{N-L}}(m, n))^2 + \psi_L (X_{D_L, A_{N-L}}(m, n))^2}, \\ \quad \text{if } L < N \end{cases} \quad (2a)$$

where it is possible that some $\mu_L$, $\lambda_L$, or $\psi_L$ are set to zero for various values of L.

By setting some of these weights, $\mu_L$, $\lambda_L$ and $\psi_L$ to zero some of the intermediate and some of the detail subbands of image X are eliminated from the aggregation process. Thus, only selected subbands that correspond to non-zero weights are chosen for aggregation. More the number of selected subbands potentially more accurate are the results of the decomposition. However this additional accuracy comes at the cost of increasing the computational overhead. The method of the embodiments of this invention strikes an effective tradeoff between accuracy and computational complexity and determines the selected intermediate subbands based on an accuracy to be achieved in determining the measure of quality. The number of the intermediate subbands used determines the computational overhead and can be chosen for achieving a given accuracy. A similar process is used in aggregating the detail subbands of image Y.

Figure 3B:
FIG. 3(b) presents an example original image.
Figure 3B:
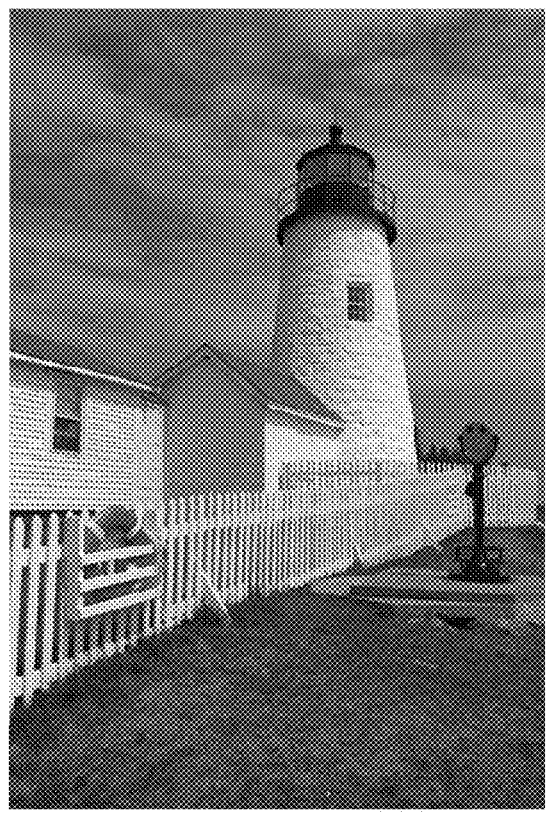
Figure 3C:
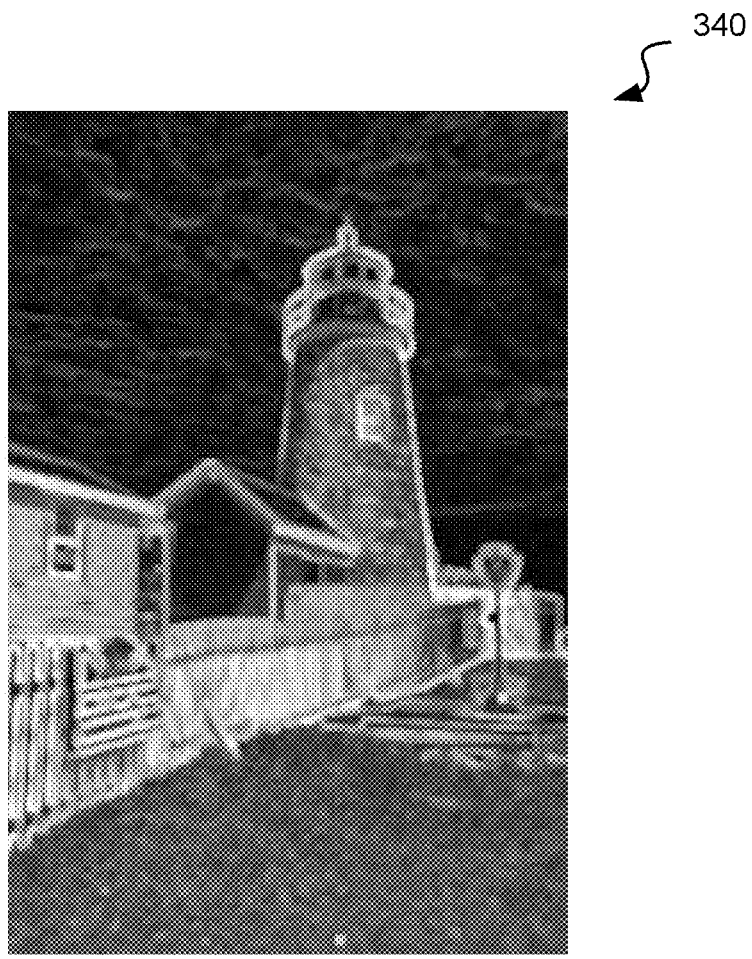
FIG. 3(c) presents a contrast map for the image in FIG. 3(b) computed by using sample values scaled between [0, 255] for easy observation.
Figure 3D:
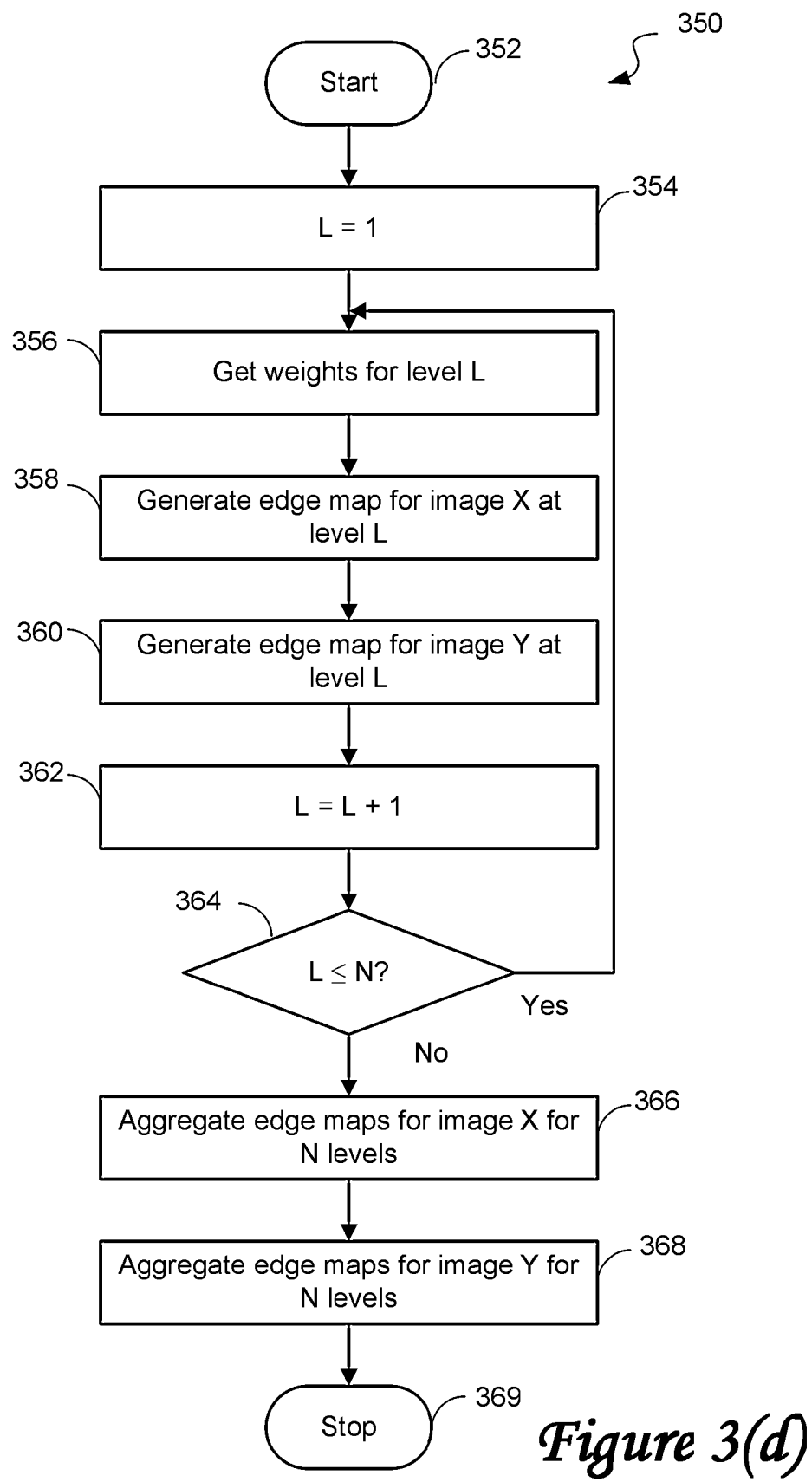
FIG. 3(d) presents a flowchart illustrating the steps of the method performing a level by level aggregation.
Figure 3E:
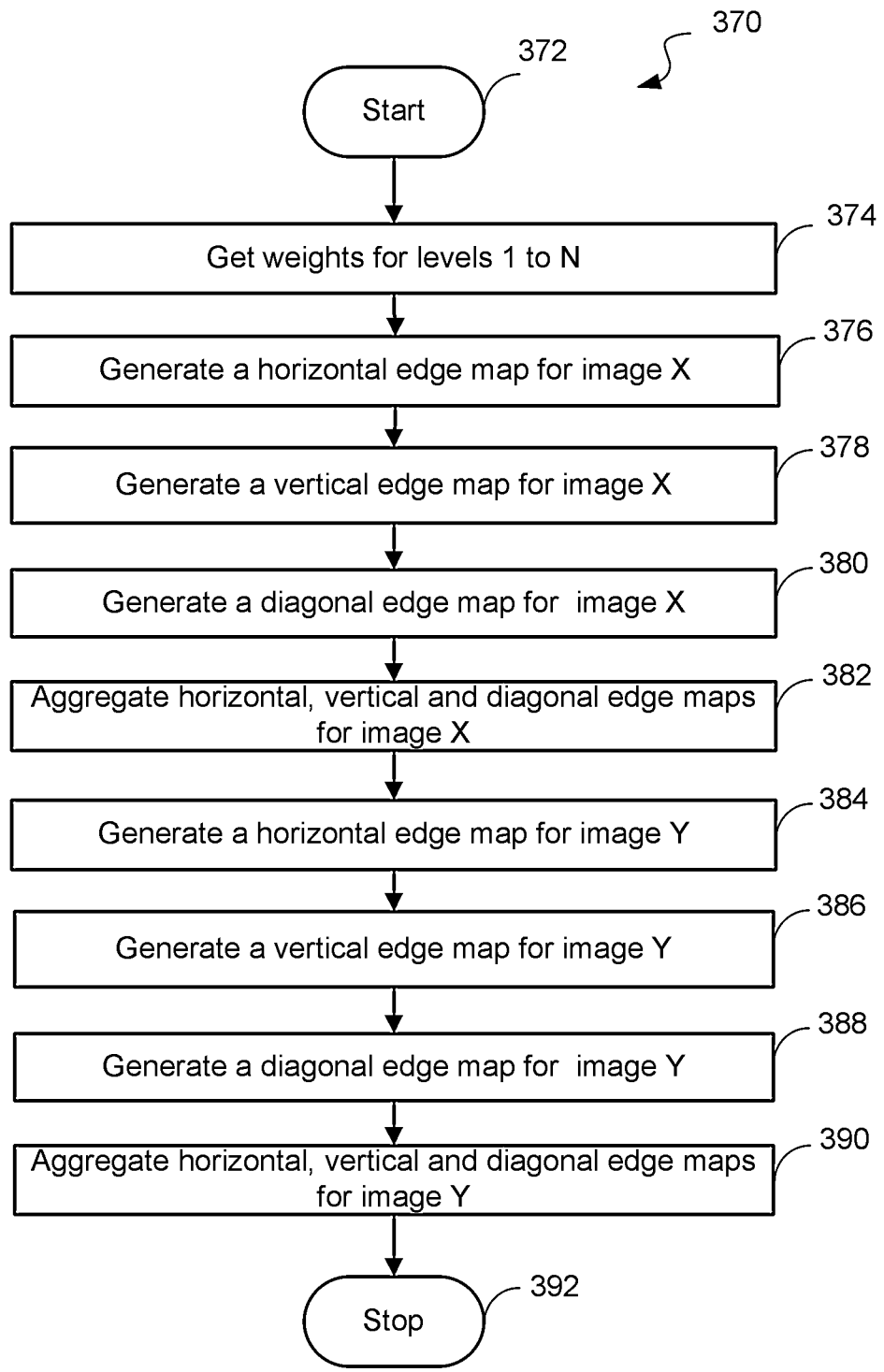
FIG. 3(e) presents a flowchart illustrating the steps of the method performing a cross-layer aggregation.

The steps of the method performing a level by level aggregation of the intermediate and the detail subbands that was described in the previous paragraph are explained with the help of FIG. 3(d). The method comprises aggregating one or more selected detail subbands of the image X produced at level N producing an edge map at level N for the image X and aggregating one or more of the selected intermediate subbands produced at said each level i (i=1 to N−1) producing an edge map at level i for the image X. The aggregation process terminates after aggregating the edge maps at all the levels i with edge map at the level N. The edge map at the level i and the edge map at level N can be determined by applying eq. 2(a) whereas the edge map of the image X can be determined as a weighted sum of the edge maps at the level j and the edge map at the level N for the image X by using eq. 6(a). A similar process is followed for aggregating the intermediate subbands and the detail subbands of the image Y. Upon start (box 352), procedure 350 sets the value of L to 1 (box 354). A number of steps are then performed iteratively for level 1 to N. The value of L displays the current level of decomposition in this iterative process. A set of predetermined weights $\omega_L$, $\mu_L$, $\lambda_L$, $\psi_L$, are obtained (box 356). The edge map for the image X at level L and for image Y at level L are then generated (box 358 and box 360). The value of L is incremented by 1 (box 362) and the procedure 350 checks whether or not L is less than or equal to N (box 364). If so, the procedure 350 exits 'Yes' from box 364 and loops back to the input of box 356 to perform the processing for the next level. Otherwise, the procedure 350 exits 'No' from box 364 and aggregates the edge maps for image X for the N levels (box 366) and for the image Y for the N levels (box 368). After the aggregation is performed the procedure 350 exits (box 369).

Embodiments of the invention performing cross-layer aggregation are presented next. In contrast to the level by level method, the cross-layer method performs aggregation across multiple levels. Using this approach, generating a horizontal edge map, a vertical edge map and a diagonal edge map of image X and image Y is performed as an intermediate step in the three following embodiments described in the next paragraph. Generation of such edge maps for image X is discussed next. A similar set of equations describe the generation of such edge maps for image Y. The intermediate subbands produced at each level i (i=1 to N−1) for the image X include level i-detail subbands, and level i-wavelet packet (WP) subbands. The level-i detail subbands include level i-horizontal, level i-vertical, and level i-diagonal subbands. The level i-wavelet packet subbands in turn include level i-wavelet packet approximation subbands and level i-wavelet packet detail subbands. The level i-wavelet packet approximation subbands comprise a level i-horizontal WP approximation subband, a level i-vertical WP approximation subband and a level i-diagonal WP approximation subband.

The cross layer aggregation involving the detail subbands and the wavelet packet approximation subbands is captured in the following set of equations (10). Note that the summations in these equations are performed from L=1 to N−1. Each value of L corresponds to a particular level i in the N level decomposition process. The terms corresponding to L=1 in eq. 10 corresponds to the first level (i=1) of decomposition, for L=2 to the second level of decomposition (i=2) and so on. Thus, the term level L will be used in place of level i in the following discussion. Let:

$$X_H(m, n) = \sum_{L=1}^{N-1} \mu_L (X_{H_L, A_{N-L}}(m, n))^2 + \mu_N (X_{H_N}(m, n))^2 \quad (10a)$$

$$X_V(m, n) = \sum_{L=1}^{N-1} \mu_L (X_{V_L, A_{N-L}}(m, n))^2 + \lambda_N (X_{V_N}(m, n))^2 \quad (10b)$$

-continued $$X_D(m, n) = \sum_{L=1}^{N-1} \psi_L(X_{D_L,A_{N-L}}(m, n))^2 + \psi_N(X_{D_N}(m, n))^2 \quad (10c)$$

Then we can aggregate them also as one of the three following options:

Option 1:

$$X_E(m,n) = \sqrt{X_H(m,n)} + \sqrt{X_V(m,n)} + \sqrt{X_D(m,n)}$$

Option 2:

$$X_E(m,n) = \sqrt{X_H(m,n) + X_V(m,n) + X_D(m,n)}$$

Option 3:

$$X_E(m,n) = X_H(m,n) + X_V(m,n) + X_D(m,n)$$

Normally, $\mu_L \leq \mu_{L+1}$, $\lambda_L \leq \lambda_{L+1}$, $\psi_L \leq \psi_{L+1}$ Note also that it is possible to set $\mu_k = 0$, $\lambda_l = 0$, $\psi_m = 0$ for none, one or several values of k, l, m respectively.

$X_H$, $X_V$, and $X_D$ on the left hand sides of equation 10a, 10b and 10c are the horizontal, vertical and diagonal edge maps for the image X respectively. The terms on the right hand side of each of these equations include the level L-WP packet approximation subbands and the detail subbands for the image X. The first term on the right hand side of equation 10a is a weighted sum of the squares of all the level L-horizontal WP approximation subbands for the image X, with L ranging from 1 to N-1. The second term is a weighted square of the horizontal subband for the image X obtained after the last level of decomposition. The first term on the right hand side of equation 10b is a weighted sum of the squares of all the level L-vertical WP approximation subbands for the image X, with L ranging from 1 to N-1. The second term is a weighted square of the vertical subband for the image X obtained after the last level of decomposition. The first term on the right hand side of equation 10c is a weighted sum of the squares of all the level L-diagonal WP approximation subbands for the image X, with L ranging from 1 to N-1. The second term is a weighted sum of the squares of the diagonal subband for the image X obtained after the last level of decomposition. The subbands involved in computing the various edge maps are enclosed in solid double boxes in table 300 and table 302 of FIG. 3(*a*1) and FIG. 3(*a*2). The predetermined weights $\psi_L$, $\mu_L$, $\lambda_L$ are used to associate varying degrees of importance with each of the subbands.

After obtaining the horizontal, vertical and diagonal edge maps, there are three options (Option 1-Option 3) for aggregating (combining) these edge maps. Three different embodiments of the invention are provided, with each using a particular option.

The steps of the method used to perform the aggregation based on eq. 10 and Option 1-Option 3 are explained with the help of flowchart 370 presented in FIG. 3(*e*). Upon start (box 372), the procedure 370 gets the weights $\psi_L$, $\psi_L$, $\lambda_L$ associated with each level L=1 to N (box 374). The horizontal edge map for image X, $X_H$ is generated next (box 376). This is followed by the generation of the vertical edge map for the image X, $X_V$ (box 378) and of the diagonal edge map for the image X, $X_D$ (box 380). Eq 10(a), eq. 10(b) and eq. 10(*c*) are used for the generation of each of these edge maps. The aggregation of the three edge maps for the image X is then performed (box 382) and the edge map for the image X, $X_E$, is produced. This is followed by the generation of the horizontal edge map for the image Y, $Y_H$, (box 384), the vertical edge map for the image Y, $Y_V$ (box 386) and the diagonal edge map for the image Y, $Y_D$ (box 388). The procedure 370 then aggregates the three edge maps for the image Y (box 390) producing the edge map for the image Y, $Y_E$, and exits (box 392). Note that each of the three embodiments perform the aggregation in box 390 in a different way by using one of the three options, Option 1-Option 3.

As shown in the eq.10 only the wavelet packet approximation subbands are chosen from the intermediate subbands to perform the aggregation. Although using only the wavelet packet approximation subbands contribute to reducing computational complexity, one does not need to limit the aggregation process to include only the wavelet packet approximation subbands $X_{H_L,A_{N-L}}$, $X_{V_L,A_{N-L}}$, and $X_{D_L,A_{N-L}}$. The wavelet packet detail subbands, comprising level i-WP horizontal, a level i-WP vertical and level i-WP diagonal subbands can be included in the aggregation process as well. Additional embodiments of the invention including such wavelet packet detail subbands are used if one needs to include more details in the horizontal, vertical and diagonal directions.

For these embodiments the aggregation process takes the following form captured in eq. 11. Let:

$$X'_H(m, n) = \sum_{L=1}^{N-1} \mu_L(X_{H_L,A_{N-L}}(m, n))^2 + \quad (11a)$$

$$\mu_N(X_{H_N}(m, n))^2 + \sum_{L=1}^{N-1} \mu'_L(X_{H_L,H_{N-L}}(m, n))^2$$

$$X'_V(m, n) = \sum_{L=1}^{N-1} \lambda_L(X_{V_L,A_{N-L}}(m, n))^2 + \quad (11b)$$

$$\lambda_N(X_{V_N}(m, n))^2 + \sum_{L=1}^{N-1} \lambda'_L(X_{V_L,V_{N-L}}(m, n))^2$$

$$X'_D(m, n) = \sum_{L=1}^{N-1} \psi_L(X_{D_L,A_{N-L}}(m, n))^2 + \quad (11c)$$

$$\psi_N(X_{D_N}(m, n))^2 + \sum_{L=1}^{N-1} \psi'_L(X_{D_L,D_{N-L}}(m, n))^2$$

Then we can aggregate them also as one of the three following options:

Option 1a:

$$X_E(m,n) = \sqrt{X'_H(m,n)} + \sqrt{X'_V(m,n)} + \sqrt{X'_D(m,n)}$$

Option 2a:

$$X_E(m,n) = \sqrt{X'_H(m,n) + X'_V(m,n) + X'_D(m,n)}$$

Option 3a:

$$X_E(m,n) = X'_H(m,n) + X'_V(m,n) + X'_D(m,n)$$

Normally, $\mu_L \leq \mu_{L+1}$, $\lambda_L \leq \lambda_{L+1}$, $\psi_L \leq \psi_{L+1}$, $\mu'_L \leq \mu'_{L+1}$, $\lambda'_L \leq \lambda'_{L+1}$, $\psi'_L \leq \psi'_{L+1}$ Note also that it is possible to set $\mu_k = 0$, $\lambda_l = 0$, $\psi_m = 0$, $\mu'_{k'} = 0$, $\lambda'_{l'} = 0$, $\psi'_{m'} = 0$ for none, one or several values of k, l, m, k', l', m' respectively.

A method similar to the one described in FIG. 3(*e*) is used. The difference is that eq. 11a, eq. 11b and eq. 11c are used in the computation of the horizontal, vertical and diagonal edge maps of the image X and the image Y. Contributions of the level L-WP horizontal subbands for the image X, with L ranging from 1 to N−1 are captured by the last term on the right hand side of eq. 11a. Similarly, the last term on the right hand side of eq. 11b captures the contributions of the level L-WP vertical subbands and the last term on the right hand side of eq. 11c captures the contributions of the level L-WP diagonal subbands of the image X. The level L-WP horizontal, vertical and diagonal subbands, with L ranging from 1 to N−1, used in computing the various edge maps are enclosed in boxes with dotted lines in table 300 and table 302 of FIG. 3(a1) and FIG. 3(a2). Once again, a different embodiment is available for performing the aggregation of the horizontal, vertical and diagonal edge maps by using one of the three options, Option 1a-Option 3a.

As mentioned earlier, various IQMs are used in conjunction with the framework described earlier lead to multiple embodiments, one for each IQM. These IQMs include SSIM, VIF, PSNR and AD. Each of these embodiments is discussed next.

Embodiment Based on the SSIM IQM

Figure 4:
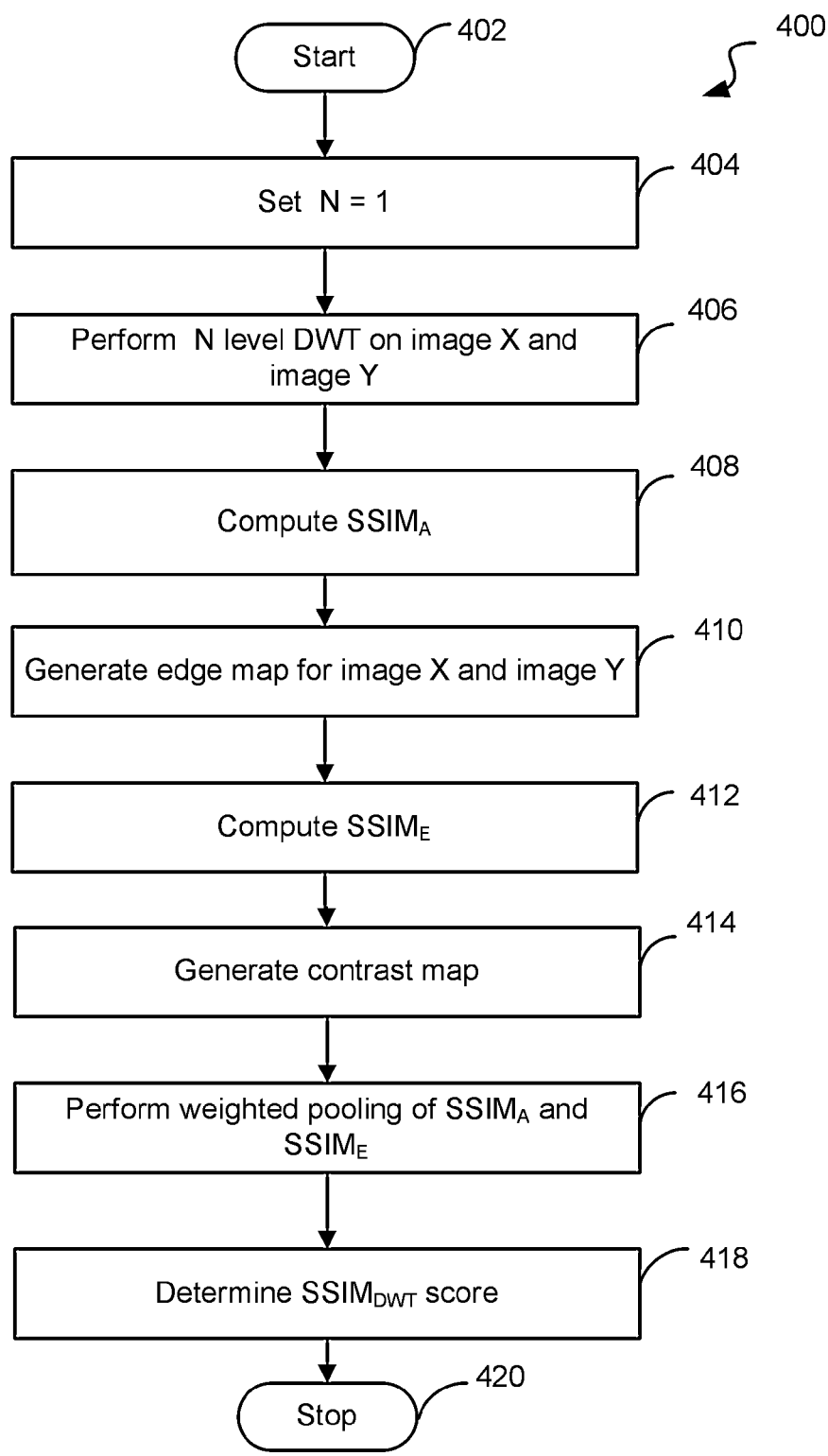
FIG. 4 presents a flow chart for illustrating steps of the method used by an alternate embodiment using a SSIM-based computation of the measure of quality.
Figure 5A:
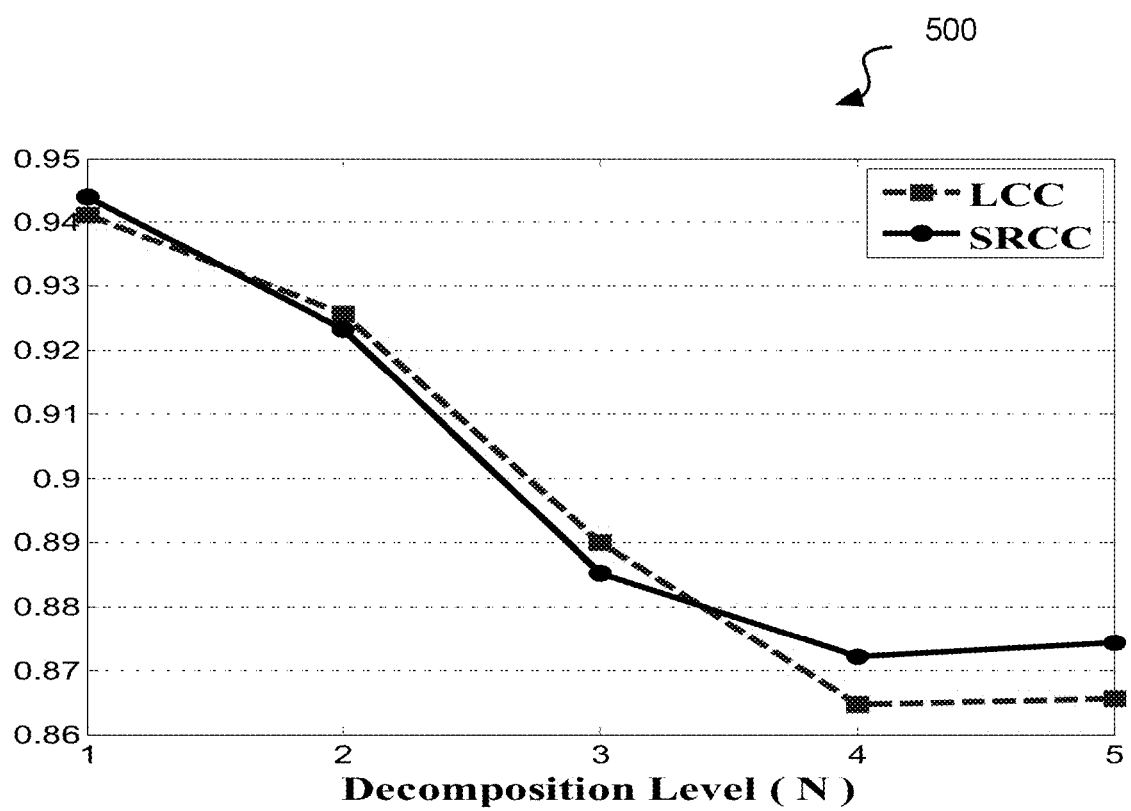
FIG. 5(a) displays LCC and SRCC between the DMOS and $SSIM_A$ prediction values for various decomposition levels.
Figure 5:
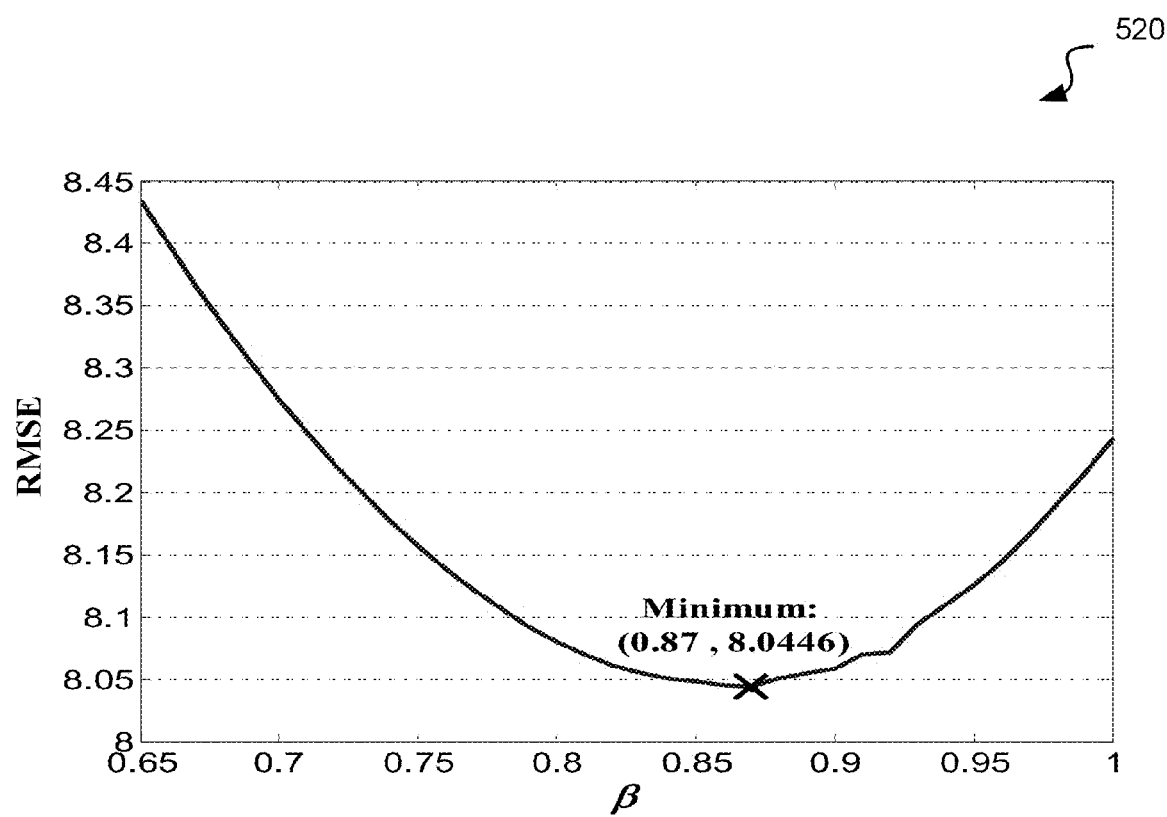
FIG. 5 (b) displays RMSE between the DMOS and $SSIM_{DWT}$ prediction values for various β values.

This embodiment uses the SSIM IQM. The steps of the SSIM-based method for this embodiment of the invention are described with the help of FIG. 4. Upon start (box 402), the procedure 400 sets N, the number of levels for the DWT to 1 (box 404). Since the image approximation subband plays the major role in the embodiments of the invention, N is to be chosen in such a way that it maximizes the accuracy of the approximation quality score $SSIM_A$ the computation of which is described in the next paragraph. The plots in graph 500 presented in FIG. 5(a) show the linear correlation coefficient (LCC) and Spearman's rank correlation coefficient (SRCC) between $SSIM_A$ and the differential mean opinion score (DMOS) values for different values of N. In performing this test, all 779 distorted images of the LIVE Image Quality Assessment Database Release 2 described by H. R. Sheikh, Z. Wang, L. Cormack, and A. G. Bovik in "LIVE Image Quality Assessment Database Release 2", available at: http://live.ece.utexas.edu/research/quality were included in computing the LCC and the SRCC. As can be seen from FIG. 5(a), $SSIM_A$ attains its best performance for N=1. The reason is that for more than one level of decomposition, the approximation subband becomes very small, and a number of important image structures are lost in the approximation subband.

A single level (N=1) DWT using the Haar filter is performed on both the reference (image X) and distorted (image Y) images (box 406). The method can be adapted to handle other types of wavelet filters as well. In the next step, the procedure 400 computes $SSIM_A$, the SSIM between the approximation subbands of image X and image Y (box 408). For each image patch $x_A$ and $y_A$ within the first level approximation subbands of X and Y, $SSIM_A$ is computed by using eq. (12):

$$SSIM_A(x_A, y_A) = SSIM(x_A, y_A) \quad (12)$$

The SSIM map is calculated according to the method described by Z. Wang, A. Bovik, H. Sheikh, and E. Simoncelli, in Image quality assessment: From error visibility to structural similarity, *IEEE Transactions on Image Processing*, vol. 13, no. 4, pp. 600-612, April 2004.

All the parameters are kept the same as those proposed in this paper, except the window size. A sliding 4×4 Gaussian window is used by procedure 400.

Procedure 400 then generates the edge maps for image X and image Y (box 410). The edge map is produced for each image by using eq.13 and eq. 14.

$$X_E(m, n) = \frac{1}{\sqrt{0.45 \cdot (X_{H_1}(m, n))^2 + 0.45 \cdot (X_{V_1}(m, n))^2 + 0.1 \cdot (X_{D_1}(m, n))^2}} \quad (13)$$

$$Y_E(m, n) = \frac{1}{\sqrt{0.45 \cdot (Y_{H_1}(m, n))^2 + 0.45 \cdot (Y_{V_1}(m, n))^2 + 0.1 \cdot (Y_{D_1}(m, n))^2}} \quad (14)$$

where (m,n) shows the sample position within the wavelet subbands. Please note that eq. 12 and eq. 13 are based on eq. 2 and eq. (3) described earlier. The weights used are: μ=0.45, λ=0.45 and ψ=0.1. In the next step, $SSIM_E$, the edge SSIM map between two images is calculated (box 412) using the following equation:

$$SSIM_E(x_E, y_E) = \frac{2\sigma_{x_E,y_E} + c}{\sigma_{x_E}^2 + \sigma_{y_E}^2 + c} \quad (15)$$

$$c = (kL)^2, k = 1 \quad (16)$$

where $\sigma_{x_E,y_E}$ is the covariance between image patches $x_E$ and $y_E$ (of $X_E$ and $Y_E$); parameters $\sigma_{x_E}^2$ and $\sigma_{y_E}^2$ are variances of $x_E$ and $y_E$ respectively; k is a small constant; and L is a dynamic range of pixels (255 for gray-scale images). The correlation coefficient and variances are computed in the same manner as presented by Z. Wang, A. Bovik, H. Sheikh, and E. Simoncelli, in "Image quality assessment: From error visibility to structural similarity", *IEEE Transactions on Image Processing*, vol. 13, no. 4, pp. 600-612, April 2004. In fact, as the edge map only forms image-edge structures and contains no luminance information, the luminance comparison part of the SSIM map described in this paper is omitted for determining the edge SSIM map. The contrast map is generated next (box 414) by using eq. (4). The contrast map is used for weighted pooling of $SSIM_A$ and $SSIM_E$ (box 416) by using equations (7) and (8). Note that $IQM_A$ used with eq. (7) and $IQM_E$ used with eq. (8) are $SSIM_A$ (computed by eq. 12) and $SSIM_E$ (computed by eq. (15)) respectively. A $SSIM_{DWT}$ score is determined as the measure of quality (box 418) by using eq. (9):

$$SSIM_{DWT}(X,Y) = \beta \cdot S_A + (1-\beta) \cdot S_E \quad (17)$$

When the root mean square (RMSE) between the $SSIM_{DWT}$ and DMOS values are computed for different β values in eq. (17), it reaches its global minimum for β=0.87. This value of β meets the intuitive expectation that β should be close to 1. FIG. 5(b) shows graph 520, which presents the plot of RMSE for different values of β. Please note that LCC has low sensitivity to small variations in β. That is, the proposed β=0.87 does not significantly affect the accuracy of the $SSIM_{DWT}$ for measuring quality of images in a different image database.

After generating the measure of quality the procedure 400 exits (box 420).

Embodiment Based on the VIF IQM

The VIF index is observed to be one of the most accurate image quality metrics in the performance evaluation of prominent image quality assessment algorithms described by H. R. Sheikh, M. F. Sabir, and A. C. Bovik, in "A statistical evaluation of recent full reference image quality assessment algorithms", *IEEE Transactions on Image Processing*, vol. 15, no. 11, pp. 3440-3451, November 2006. In spite of its high level of accuracy, this IQM has not been given as much consideration as the SSIM IQM in a variety of applications.

This is probably because of its high computational complexity (6.5 times the computation time of the SSIM index according to H. R. Sheikh, and A. C. Bovik, in "Image information and visual quality", *IEEE Transactions on Image Processing*, vol. 15, no. 2, pp. 430-444, February 2006). Most of the complexity in the VIF IQM comes from over-complete steerable pyramid decomposition, in which the neighboring coefficients from the same subband are linearly correlated. Consequently, the vector Gaussian scale mixture GSM is applied for accurate quality prediction.

This section, explains the steps of the method for calculating VIF in the discrete wavelet domain by exploiting the proposed framework. The proposed approach is more accurate than the original VIF index-based approach, and yet is less complex in comparison to the VIF IQM. It applies real Cartesian-separable wavelets and uses a scalar GSM instead of vector GSM in modeling the images for VIF computation. A short explanation is provided next.

Figure 6A:
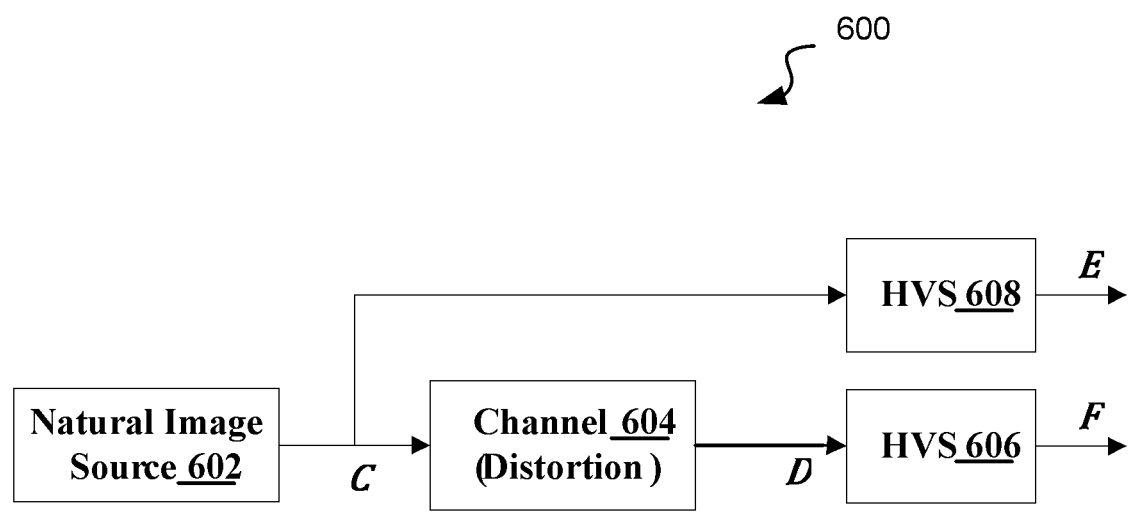
FIG. 6(a) presents the block diagram for a prior art method based on a VIF index.

Scalar GSM-Based VIF:

Scalar GSM has been described and applied in the computation of IFC and discussed by H. R. Sheikh, A. C. Bovik, and G. de Veciana, in "An information fidelity criterion for image quality assessment using natural scene statistics", *IEEE Transactions on Image Processing*, vol. 14, no. 12, pp. 2117-2128, December 2005. That procedure is repeated here for VIF index calculation using scalar GSM. In FIG. 6(a), box 602 represents the GSM model of the undistorted original image (signal) and box 604 considers image distortions as a channel distortion and adds distortion to the original signal from box 602 to model the distorted image signal. Boxes 606 and 608 show the function of HVS as additive white Gaussian noise and their outputs are the perceived distorted and original signals, respectively. Considering FIG. 6(a), let $C^M = (C_1, C_2, \ldots, C_M)$ denote M elements from C, and let $D^M = (D_1, D_2, \ldots, D_m)$ be the corresponding M elements from D. C. and D denote the random fields (RFs) from the reference and distorted signals respectively. As in described by H. R. Sheikh, A. C. Bovik, and G. de Veciana, in "An information fidelity criterion for image quality assessment using natural scene statistics", *IEEE Transactions on Image Processing*, vol. 14, no. 12, pp. 2117-2128, December 2005, the models correspond to one subband. C is a product of two stationary random fields (RFs) that are independent of each other:

$$C = \{C_i : i \in I\} = S \cdot U = \{S_i \cdot U_i : i \in I\} \quad (18)$$

where i denotes the set of spatial indices for the RF, S is an RF of positive scalars, and U is a Gaussian scalar RF with mean zero and variance $\sigma_U^2$. The distortion model is a signal attenuation and additive Gaussian noise, defined as follows:

$$D = \{D_i : i \in I\} = GC + V = \{g_i C_i + V_i : i \in I\} \quad (19)$$

where G is a deterministic scalar attenuation field, and V is a stationary additive zero-mean Gaussian noise RF with variance $\sigma_V^2$. The perceived signals in FIG. 6(a) described by H. R. Sheikh, and A. C. Bovik, in "Image information and visual quality", *IEEE Transactions on Image Processing*, vol. 15, no. 2, pp. 430-444, February 2006, are defined as:

$$E = C + N, \; F = D + N' \quad (20)$$

where N and N' represent stationary white Gaussian noise RFs with variance $\sigma_N^2$. If the steps outlined by in this paper for VIF index are used in the calculation considering scalar GSM one obtains:

$$I(C^M; E^M \mid S^M = s^M) = I(C^M; E^M \mid s^M) = \frac{1}{2} \sum_{i=1}^{M} \log_2 \left( \frac{s_i^2 \sigma_U^2 + \sigma_N^2}{\sigma_N^2} \right) \quad (21)$$

In the GSM model, the reference image coefficients are assumed to have zero mean. So, for the scalar GSM model, estimates of can be obtained by localized sample variance estimation. As discussed by H. R. Sheikh, A. C. Bovik, and G. de Veciana, in "An information fidelity criterion for image quality assessment using natural scene statistics", *IEEE Transactions on Image Processing*, vol. 14, no. 12, pp. 2117-2128, December 2005, the variance $\sigma_U^2$ can be assumed to be unity without loss of generality. Thus, eq. (21) is simplified to eq. (22).

$$I(C^M; E^M \mid s^M) = \frac{1}{2} \sum_{i=1}^{M} \log_2 \left( 1 + \frac{\sigma_{C_i}^2}{\sigma_N^2} \right) \quad (22)$$

Similarly, eq. (23) is obtained:

$$I(C^M; F^M \mid s^M) = \frac{1}{2} \sum_{i=1}^{M} \log_2 \left( 1 + \frac{g_i^2 \sigma_{C_i}^2}{\sigma_V^2 + \sigma_N^2} \right) \quad (23)$$

The final VIF index is obtained from eq. (23), by using the method described by H. R. Sheikh, and A. C. Bovik, in "Image information and visual quality", *IEEE Transactions on Image Processing*, vol. 15, no. 2, pp. 430-444, February 2006, but considering only a single subband:

$$VIF = \frac{I(C^M; F^M \mid s^M)}{I(C^M; E^M \mid s^M)} \quad (24)$$

Figure 6B:
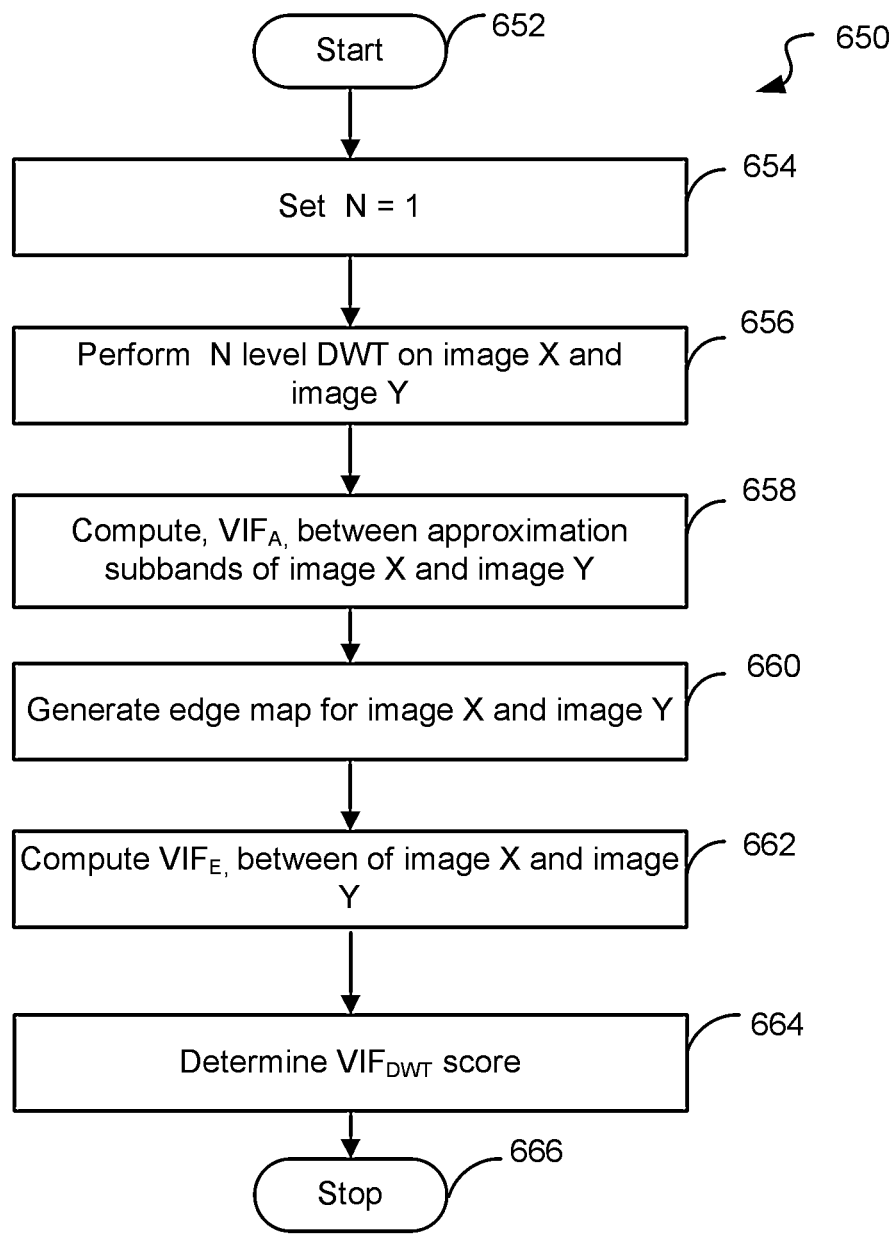
FIG. 6 (b) presents a flow chart for illustrating steps of the method used by an alternate embodiment using a VIF-based computation of the measure of quality.
Figure 7A:
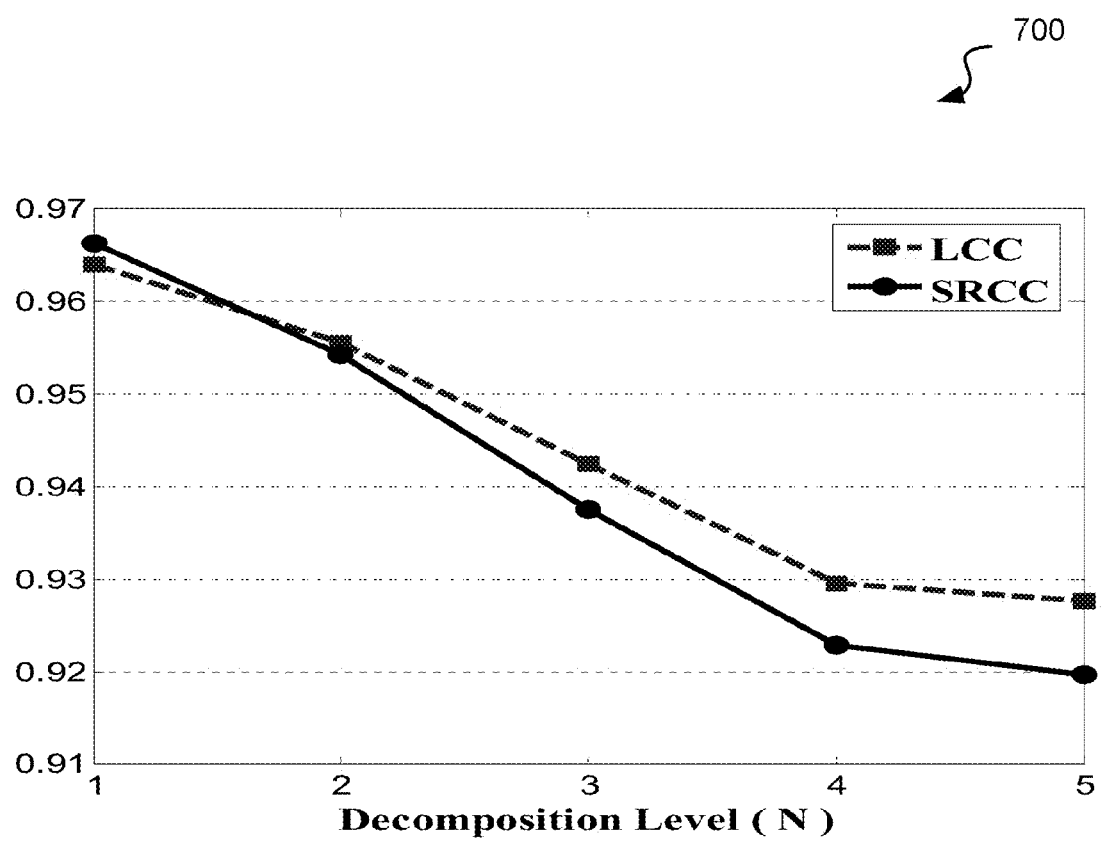
FIG. 7(a) presents LCC and SRCC between the DMOS and $VIF_A$ prediction values for various decomposition levels.

The steps of the VIF-based method for this embodiment of the invention is described with the help of flowchart 650 FIG. 6(b). Upon start (box 652), the procedure 650 sets the value of N=1 (box 654). As explained before in the case of the embodiment based on the SSIM IQM, the right number of decomposition levels for calculating the VIF-based measure of quality needs to be determined first. Experiments are performed in a way similar to the experiments described earlier for scalar VIF. FIG. 7(a) shows graph 700 presenting the LCC and SRCC between $VIF_A$ (the computation of which is described in the next paragraph) and the DMOS values for various decomposition levels N. It can be seen that the $VIF_A$ prediction accuracy decreases as the number of decomposition levels increases. Therefore, $VIF_A$ performance is best at N=1. This is because the resolution of approximation subband is reduced by multilevel decomposition, and consequently the image information, on which VIF is based, will be lost in that subband for higher values of N.

A N level DWT is performed on image X and image Y next (box 656). Procedure 650 then computes the VIF approximation quality score, $VIF_A$, between the approximation subbands of X and Y, i.e. $X_A$ and $Y_A$. For simplicity, $X_A$ and $Y_A$ are used here instead of $X_{A_1}$ and $Y_{A_1}$:

$$VIF_A = \frac{\sum_{i=1}^{M} \log_2\left(1 + \frac{g_i^2 \sigma_{x_{A,i}}^2}{\sigma_{V_i}^2 + \sigma_N^2}\right)}{\sum_{i=1}^{M} \log_2\left(1 + \frac{\sigma_{x_{A,i}}^2}{\sigma_N^2}\right)} \quad (25)$$

where M is the number of samples in the approximation subband, $x_{A,i}$ is the ith image patch within the approximation subband $X_A$, and $\sigma_{x_{A,i}}^2$ is the variance of. The noise variance $\sigma_N^2$ is set to 5 in this embodiment of the invention. The parameters $g_i$ and $\sigma_{V_i}^2$ are estimated as described by H. R. Sheikh, A. C. Bovik, and G. de Veciana, in "An information fidelity criterion for image quality assessment using natural scene statistics", *IEEE Transactions on Image Processing*, vol. 14, no. 12, pp. 2117-2128, December 2005, resulting in eq. (26) and eq. (27).

$$g_i = \frac{\sigma_{x_{A,i}, y_{A,i}}}{\sigma_{x_{A,i}}^2 + \varepsilon} \quad (26)$$

where $\sigma_{x_{A,i}, y_{A,i}}$ is the covariance between image patches $x_{A,i}$ and $y_{A,i}$, and $\varepsilon$ is a very small constant to avoid instability when $\sigma_{x_{A,i}}^2$ is zero and $\varepsilon = 10^{-20}$.

$$\sigma_{V_i}^2 = \sigma_{y_{A,i}}^2 - g_i \cdot \sigma_{x_{A,i}, y_{A,i}} \quad (27)$$

All the statistics (the variance and covariance of image patches) are computed within a local Gaussian square window, which moves pixel-by-pixel over the entire approximation subbands $X_A$ and $Y_A$. The Gaussian sliding window used in this case is exactly the same as that defined earlier. Because of the smaller resolution of the subbands in the wavelet domain, one can even extract reasonably accurate local statistics with a small 3×3 sliding window. But to reach the best performance and extracting accurate local statistics, a larger window of size 9×9 is exploited here. Simulation results described in a later section show that the measure of quality based on VIF can provide accurate scores with the set up described here.

In the next step, the procedure 650 generates the edge maps $X_E$ and $Y_E$ using eq. (2) and eq. (3) (box 660). The VIF edge quality score, $VIF_E$, between the edge maps of the image X and the image Y that reflects the similarity between the edge maps is computed next (box 662). Finally, the measure of quality is computed by using eq. (9) (box 664):

$$VIF_{DWT}(X,Y) = \beta \cdot VIF_A + (1-\beta) \cdot VIF_E \quad 0 < \beta \leq 1 \quad (28)$$

where $VIF_{DWT}$ score is the measure of quality for image Y in the range [0,1]. After computing the measure of quality, the procedure 650 exits (box 666).

Figure 7B:
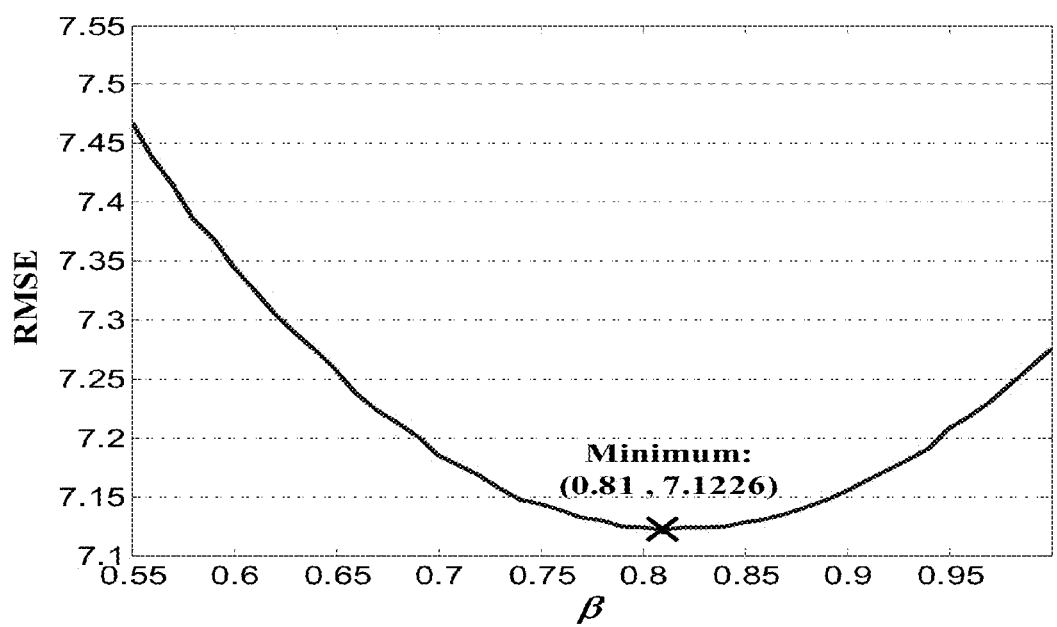
FIG. 7(b) displays RMSE between the DMOS and $VIF_{DWT}$ prediction values for various 0 values.

FIG. 7(b) presents graph 720 that shows the RMSE between the $VIF_{DWT}$ and DMOS values for different values of $\beta$. It is observed that RMSE reaches its global minimum at $\beta = 0.81$. This value of $\beta$ is close to the one obtained for $SSIM_{DWT}$. It is notable that LCC does not have high sensitivity to small variations in $\beta$. Thus, the obtained value for $\beta$ is still valid if $VIF_{DWT}$ is applied on images in a different image database.

Embodiment Based on the PSNR IQM

This embodiment uses the PSNR IQM for determining the measure of quality for the distorted image. The conventional PSNR and its equivalent, mean square error (MSE), are defined in eq. (29) and eq. (30).

$$PSNR(X,Y) = 10 \cdot \log_{10}\left(\frac{X_{max}^2}{MSE(X,Y)}\right) \quad (29)$$

$$MSE(X,Y) = \frac{1}{N_P} \cdot \sum_{m,n}(X(m,n) - Y(m,n))^2 \quad (30)$$

where X and Y denote the reference and distorted images respectively. $X_{max}$ is the maximum possible pixel value of the reference image X. The minimum pixel value is assumed to be zero. $N_P$ is the number of pixels in each of the images. Although the conventional PSNR is still popular because of its ability to easily compute quality in decibels (dB), it cannot adequately reflect the human perception of image fidelity. Other error-based techniques, such as WSNR and NQM discussed by N. Damera-Venkata, T. D. Kite, W. S. Geisler, B. L. Evans, and A. C. Bovik, in "Image quality assessment based on a degradation model" in *IEEE Transactions on Image Processing*, vol. 9, no. 4, pp. 636-650, April 2000 and VSNR discussed by D. M. Chandler, and S. S. Hemami, in "A wavelet-based visual signal-to-noise ratio for natural images", *IEEE Transactions on Image Processing*, vol. 16, no. 9, pp. 2284-2298, September 2007, are less simple to use, as they follow sophisticated procedures to compute the human visual system (HVS) parameters. This section explains how to calculate a PSNR-based measure of quality accurately in the discrete wavelet domain by using the framework provided by the embodiment of the invention described earlier.

Figure 8:
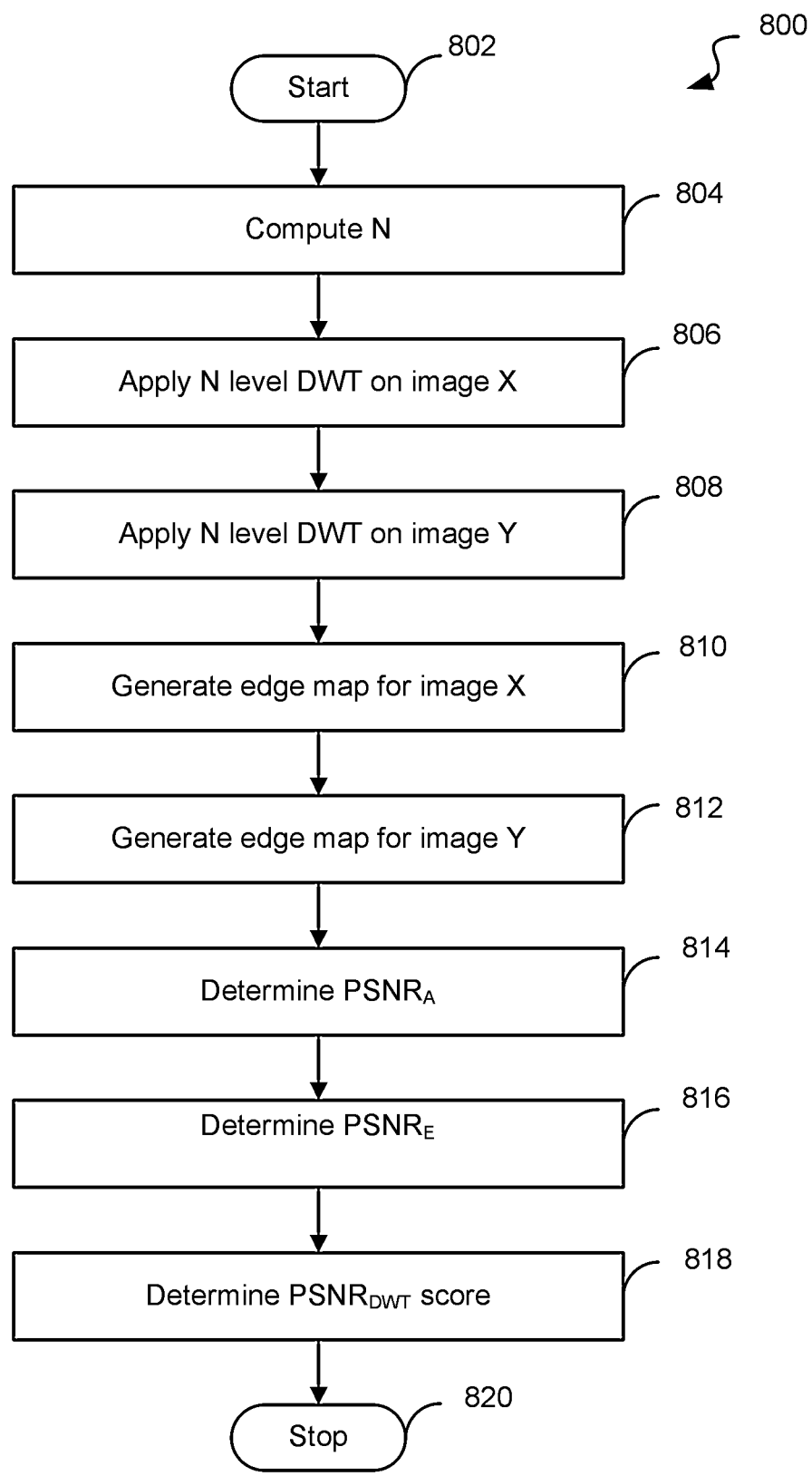
FIG. 8 presents a flow chart for illustrating steps of the method used by an alternate embodiment using a PSNR-based computation of the measure of quality.
Figure 9A:
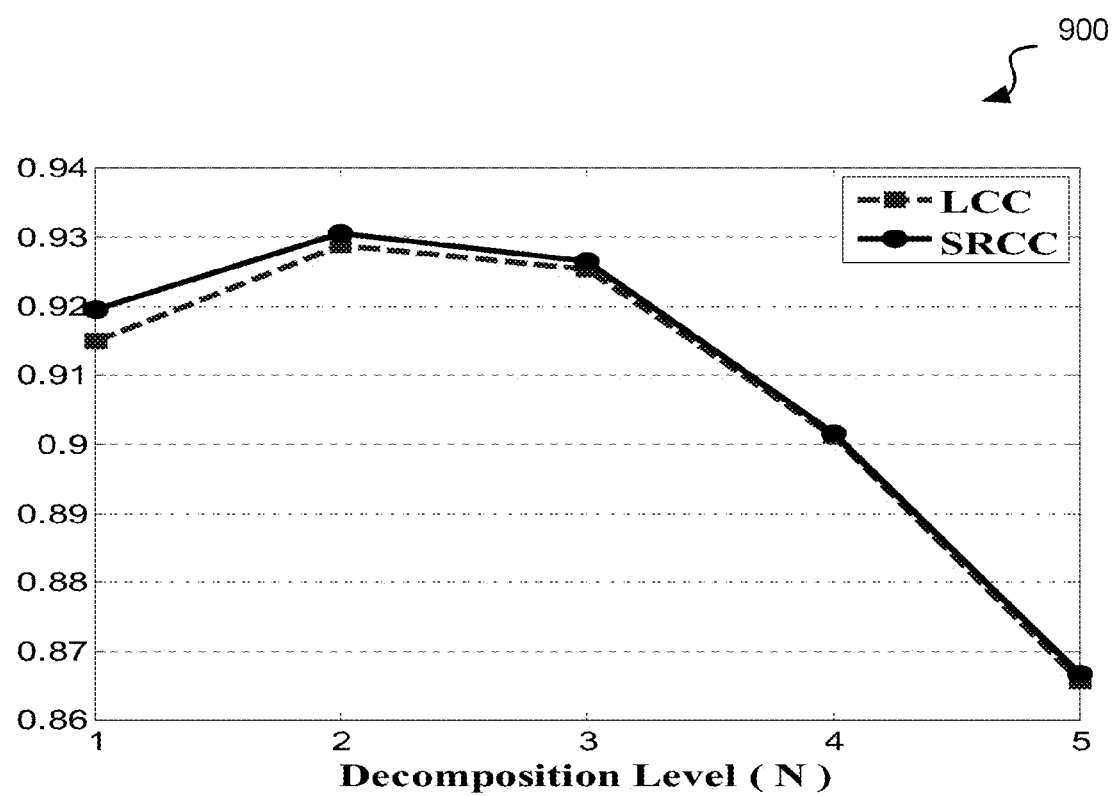
FIG. 9(a) displays LCC and SRCC between the DMOS and $PSNR_A$ quality prediction values for various decomposition levels.

The steps of the PSNR-based method for this embodiment of the invention are described with the help of FIG. 8. Upon start (box 802), the procedure 800 computes N, the number of levels for the DWT (box 804). The plots in graph 900 displayed in FIG. 9(a) show the LCC and SRCC between $PSNR_A$ and the DMOS values for different decomposition levels. The test is done in a way similar to that described in the previous sections. It can be seen that $PSNR_A$ attains its best and near best performance for N=2 and N=3. Based on individual types of distortion, which are available in the corresponding image database, one can determine which value of N (2 or 3) provides more accurate measures of quality. Table I denoted by reference numeral 960 and shown in FIG. 9(c) lists the SRCC values for five different types of distortion. It is observed that the performance of $PSNR_A$ (the computation of which is described later in this section) is superior with N=2 when all data (distorted images) is considered. Thus, N=2 is the appropriate decomposition level.

Although N=2 works fine for the entire image database used in the testing, a N that can be adapted to various other images needs be used in this embodiment. The number of levels of decomposition N is determined as a function of a minimum size of the approximation subband, S, which produces a substantially peak response for human visual system. Thus eq. 1(e) is used for determining N.

After the value of N is computed a N level DWT is applied to image X (box 806) and to image Y (box 808). A N level discrete wavelet transform (DWT) on both the reference and distorted images is applied by using based on the Haar filter. The method can handle other wavelet filters as well. With N level decomposition, the approximation subbands $X_{A_N}$ and $Y_{A_N}$ as well as a number of detail subbands, are obtained. As discussed earlier, the Haar filter is chosen for its modest computational simplicity and good performance. This simplicity imposes negligible computational burden on the over all method of the embodiments of the invention. As indicated by the simulation results, the Haar wavelet also provides more accurate quality scores than other wavelet bases.

In the next step, the procedure 800 generates the edge maps for the image X (box 810) and for the image Y (box 812) next. Then, the procedure 800 computes the PSNR approximation quality score $PSNR_A$ by applying the PSNR IQM between the approximation subbands of the image X and the image Y (box 814). The PSNR edge quality score $PSNR_E$ is computed next by applying the PSNR IQM between the edge maps of the image X and the image Y (box 816). $PSNR_A$ and $PSNR_E$ are computed by using eq. (30) and eq. (31).

$$PSNR_A = PSNR(X_{A_N}, Y_{A_N}) \quad (30)$$

$$PSNR_E = PSNR(X_E, Y_E) \quad (31)$$

In the next step, the procedure 800 determines a $PSNR_{DWT}$ score as the measure of quality (box 818) and exits (box 820). $PSNR_{DWT}$ is determined by combining the PSNR approximation quality score and the PSNR edge quality score according to eq. (9):

$$PSNR_{DWT}(X, Y) = \beta \cdot PSNR_A + (1-\beta) \cdot PSNR_E \quad (32)$$

$$0 < \beta \leq 1$$

Figure 9B:
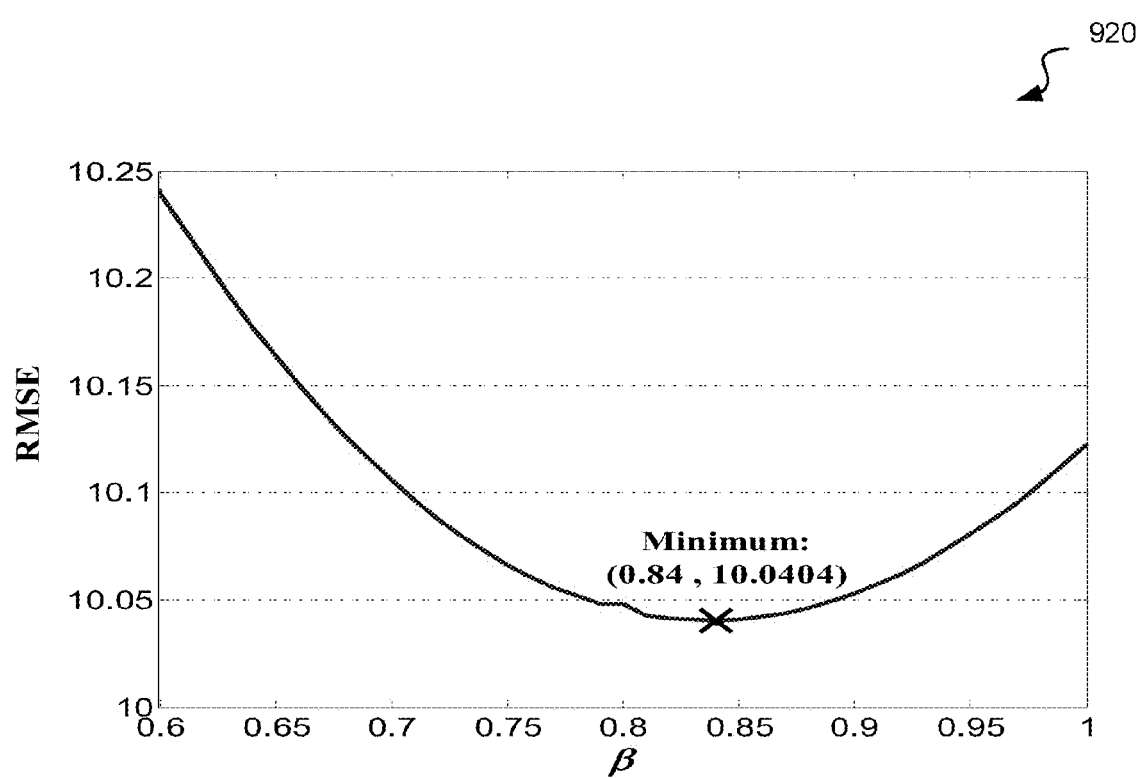
FIG. 9(b) displays RMSE between the DMOS and $PSNR_{DWT}$ prediction values for various β values.

Please note that $PSNR_{DWT}$ gives the measure of quality for various images in an image database. To find the optimum value of the constant β, an experiment similar to those described in the previous subsections focusing on $SSIM_{DWT}$ and $VIF_{DWT}$ is performed. FIG. 9(*b*) presents graph 920 that shows the RMSE between the $PSNR_{DWT}$ and DMOS values for different values of β used in eq. (32). It is observed that RMSE is globally minimum at β=0.84. This value of β is quite close to those values determined earlier for other metrics. Verification of this value of β performing well on the other test databases is discussed in a later section of this document.

Embodiment Based on the AD IQM

Figure 10:
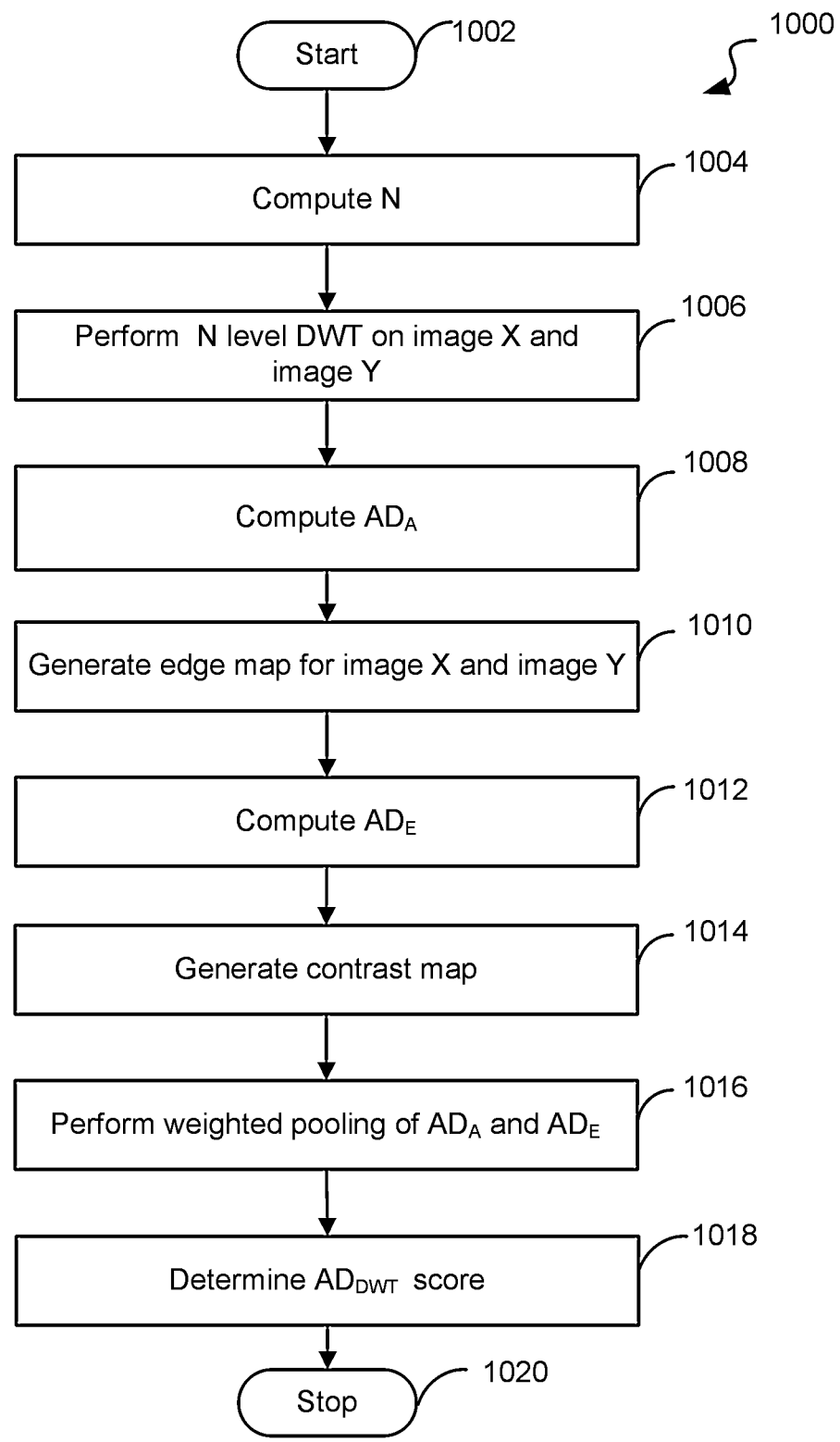
FIG. 10 presents a flow chart for illustrating steps of the method used in an alternate embodiment using an AD-based computation of the measure of quality.
Figure 11:
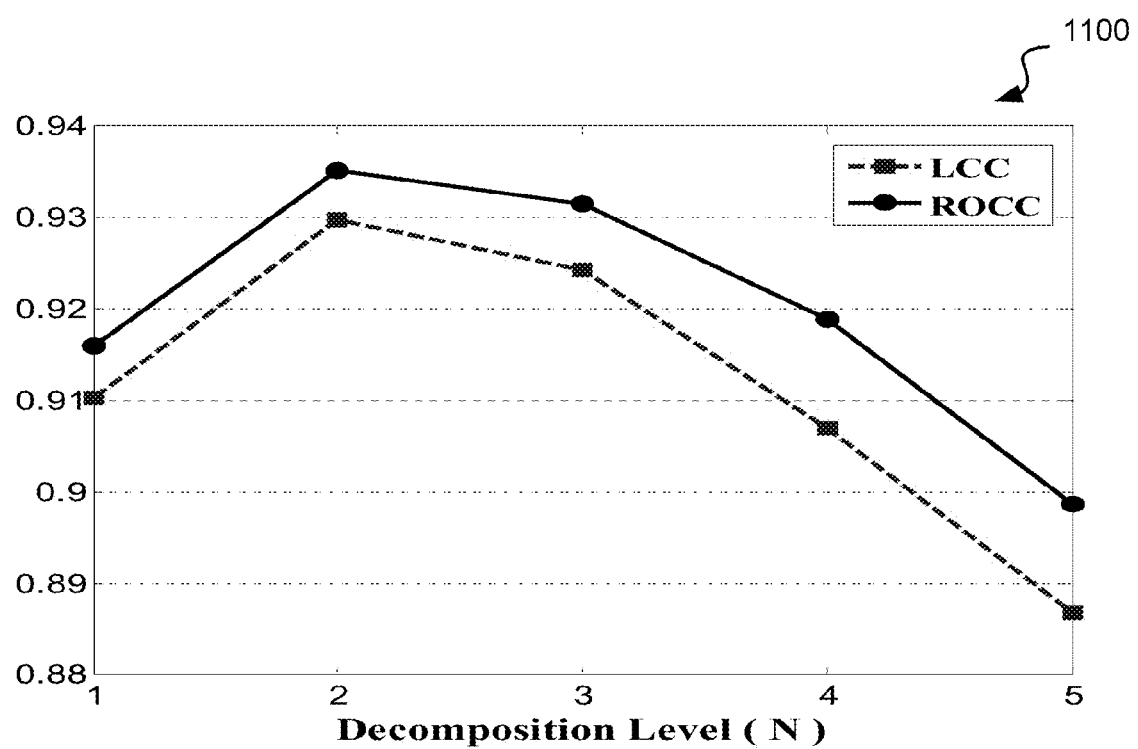
FIG. 11 displays LCC and SRCC between the DMOS and mean $AD_A$ prediction values for various decomposition levels.

This embodiment uses the AD IQM. The steps of the AD-based method for this embodiment of the invention are described with the help of FIG. 10. Upon start (box 1002), the procedure 1000 determines N (box 1004). A test was performed on the image database mentioned earlier. FIG. 11 presents graph 1100 showing the LCC and SRCC between an approximation AD map, $AD_A$, (the generation of which is described in the next paragraph) and the DMOS values for different decomposition levels that are obtained. Similar to the $PSNR_A$, the $AD_A$ performance is best at N=2. The general value of N can be calculated by eq. (1e).

A N level DWT is performed on image X and image Y next (box 1006). In the following step, the procedure 1000 applies the AD IQM between the approximation subbands of X and Y to produce the approximation AD map, $AD_A$, (box 1008).

$$AD_A(m,n) = |X_{A_N}(m,n) - Y_{A_N}(m,n)| \quad (33)$$

where (m,n) shows a sample position in the approximation subband.

The edge maps are then generated for the image X and the image Y (box 1010). Next, the procedure 1000 applies the AD IQM between the edge maps $X_E$ and $Y_E$ to produce the edge AD map, $AD_E$, (box 1012).

$$AD_E(m,n) = |X_E(m,n) - Y_E(m,n)| \quad (34)$$

After generating the edge AD map, the procedure 1000 generates the contrast map (box 1014). The contrast map is obtained by using eq. (4), and then $AD_A$ and $AD_E$ are pooled using the contrast map to determine approximation quality score and the edge quality score $S_A$ and $S_E$ respectively (box 1016).

$$S_A = \frac{\sum_{j=1}^{M} Contrast(m,n) \cdot AD_A(m,n)}{\sum_{j=1}^{M} Contrast(m,n)} \quad (35)$$

$$S_E = \frac{\sum_{j=1}^{M} Contrast(m,n) \cdot AD_E(m,n)}{\sum_{j=1}^{M} Contrast(m,n)} \quad (36)$$

The method uses the $S_A$ and the $S_E$ to determine an $AD_{DWT}$ score as the measure of quality (box 1018) by using eq. (37).

$$AD_{DWT}(X,Y) = \beta \cdot S_A + (1-\beta) \cdot S_E \quad (37)$$

$$0 < \beta \leq 1$$

As discussed in the previous section β is set to 0.84. After determining the measure of quality, the procedure 1000 exits (box 1020).

Simulation Results

The performance of the methods of embodiments of this invention that determines the measure of quality for a distorted image are evaluated by using the images in the LIVE Image Quality Assessment Database, Release 2 described by H. R. Sheikh, Z. Wang, L. Cormack, and A. C. Bovik, in "LIVE Image Quality Assessment Database Release 2," available at http://live.ece.utexas.edu/research/quality. This database includes 779 distorted images derived from 29 original colour images using five types of distortion: JPEG compression, JPEG2000 compression, Gaussian white noise (GWN), Gaussian blurring (GBlur), and the Rayleigh fast fading (FF) channel model. The realigned subjective quality data for the database are used in all experiments.

The three different IQM-based measures of quality, each computed by an embodiment described earlier are applied to the images in the database to measure the performance of the objective models. A number of metrics are used in this performance evaluation. The first metric is the Pearson correlation coefficient (LCC) between the Difference Mean Opinion Score (DMOS) and the objective model outputs after nonlinear regression. The correlation coefficient gives an evaluation of prediction accuracy. The five-parameter logistical function defined by H. R. Sheikh, M. F. Sabir, and A. C. Bovik, in "A statistical evaluation of recent full reference image quality assessment algorithms", *IEEE Transactions on Image Processing*, vol. 15, no. 11, pp. 3440-3451, November 2006 for nonlinear regression is used. The second metric is the root mean square error (RMSE) between the DMOS and the objective model outputs after nonlinear regression. The RMSE is considered as a measure of prediction consistency. The third metric is the Spearman rank correlation coefficient (SRCC), which provides a measure of prediction monotonicity.

In order to put the performance evaluation of the embodiments of this invention into the proper context, the methods of the embodiments are compared to other image quality metrics available in the prior art, including the conventional PSNR, the spatial domain mean SSIM discussed by Z. Wang, A. Bovik, H. Sheikh, and E. Simoncelli, "Image quality assessment: From error visibility to structural similarity", *IEEE Trans. Image Process.*, vol. 13, no. 4, pp. 600-612, April 2004, an autoscale version of SSIM performing downsampling on images discussed by Z. Wang in Z. Wang's SSIM Research Homepage at http://www.ece.uwaterloo.ca/~z70wang/research/ssim/, and a WSNR discussed by N. Damera-Venkata, T. D. Kite, W. S. Geisler, B. L. Evans, and A. C. Bovik, in "Image quality assessment based on a degradation model" in *IEEE Transactions on Image Processing*, vol. 9, no. 4, pp. 636-650, April 2000., in which the images are filtered by the CSF specified by J. L. Mannos, and D. J. Sakrison, in "The effects of a visual fidelity criterion on the encoding of images", *IEEE Trans. Inf. Theory, vol. IT*-20, no. 4, pp. 525-536, July 1974 and by H. R. Sheikh, Z. Wang, L. Cormack, and A. C. Bovik, in "*LIVE Image Quality Assessment Database Release* 2," available at: http://live.ece.utexas.edu/research/quality and in Z. Wang's SSIM Research Homepage cited above.

Figure 12:
FIG. 12 presents LCC between different metrics and DMOS values of the LIVE database.

Table II 1200 in FIG. 12 lists LCC between different metrics and DMOS values of the LIVE database and Table III 1220 in FIG. 13 and Table IV 1240 in FIG. 14 show RMSE and SRCC between the metrics and DMOS values respectively. It is observed that the SRCC of mean SSIMA from 0.9441 increases to 0.9573 for SA, which signifies a 1.32% of improvement. The performance of $SSIM_{DWT}$ is the best among all structural metrics. For SNR-based metrics, the SRCC of $PSNR_A$ is 0.9307 which is higher than conventional PSNR (0.8756) and even WSNR (0.9240), while its complexity is lower than the conventional PSNR.

The embodiments of the invention provide a number of advantages including the following. An important contribution of the invention is that a contrast map in the wavelet domain is introduced for pooling quality maps. The new approach of the current invention does not require heavy experimentation to determine parameters, and it is adaptive to different wavelet filters based on a contrast map defined for pooling a SSIM quality map for example. Various changes and modifications of the embodiments shown in the drawings and described in the specification may be made within the scope of the following claims without departing from the scope of the invention in its broader aspect. For example, instead of a Haar transform, other wavelet transforms such as Newland transform, or a wavelet transform using a Daubechies filter can be used in the multi-resolution decomposition of the reference and distorted images. Various steps of methods including method 250 of FIG. 2(*b*) may be performed in parallel by using a multi-core CPU or a multiprocessor system. For example, the decomposition of the images X and Y during the multiresolution decomposition can be performed in parallel. Such parallel computations can reduce the computation time for calculating the measure of quality.

Although the embodiments of the invention have been described in detail, it will be apparent to one skilled in the art that variations and modifications to the embodiment may be made within the scope of the following claims.

What is claimed is:

1. A method for determining a measure of quality for a distorted image Y, characterizing a similarity between the image Y and an undistorted reference image X, having the same number of rows and columns of pixels as the image Y, the method comprising:
   (a1) applying an N level multiresolution decomposition, comprising levels 1, 2, ... i, i+1, ... N, to the image X, to produce:
      for each level i, with i ranging from 1 to N−1, intermediate subbands of image X for processing at level i+1; and
      for the level N, an approximation subband containing main content of the image X and detail subbands containing edges of the image X;
   (b1) applying said N level multiresolution decomposition, comprising levels 1, 2, ... i, i+1, ... N, to the image Y, to produce:
      for each level i, with i ranging from 1 to N−1, intermediate subbands of image Y for processing at level i+1; and
      for the level, N, an approximation subband containing main content of the image Y and detail subbands containing edges of the image Y;
   (c1) applying an image quality metric (IQM) to the approximation subband of the image X and the approximation subband of the image Y to produce an approximation quality measure characterizing similarity between the main content of the image X and the main content of the image Y;
   (d1) aggregating the intermediate subbands at the level i for the image X, with i ranging from levels 1 to N−1, and the detail subbands of the image X to produce an edge map of the image X characterizing the edges of the image X;
   (e1) aggregating the intermediate subbands at the level i for the image Y, with i ranging from 1 to N−1, and the detail subbands of the image Y to produce an edge map of the image Y characterizing the edges of image Y;
   (f1) applying the IQM between the edge map of the image X and the edge map of the image Y to produce an edge quality measure characterizing similarity between the edges of the image X and the edges of the image Y; and
   (g1) processing the approximation quality measure and the edge quality measure to determine the measure of quality.

2. The method of claim 1, wherein:
   (a2) the step (d1) further comprises:
      (a2i) selecting the intermediate subbands at each level i, with i ranging from 1 to N−1, and the detail subbands for the image X based on an accuracy to be achieved in determining the measure of quality; and
      (a2ii) aggregating only selected intermediate subbands and selected detail subbands for the image X; and
   (b2) the step (e1) further comprises:
      (b2i) selecting the intermediate subbands at said each level i and the detail subbands for the image Y based on said accuracy to be achieved in determining the measure of quality; and
      (b2ii) aggregating only selected intermediate subbands and selected detail subbands for the image Y.

3. The method of claim 2, wherein the step (a2i) and the step (b2i) further comprise selecting the intermediate subbands at said each level i and the detail subbands for the image X and the image Y based on a number of the intermediate and the detailed subbands required for achieving the accuracy.

4. The method of claim 3, further comprising:
   (a4) at the step (a2ii):
      (a4i) for said each level i, aggregating the selected intermediate subbands for the image X producing an edge map at the level i for the image X;
      (a4ii) aggregating the selected detail subbands for the image X producing an edge map at the level N for the image X; and
      (a4iii) aggregating the edge map at said each level i for the image X with the edge map at the level N for the image X; and
   (b4) at the step (b2ii):
      (b4i) for said each level i, aggregating the selected intermediate subbands for the image Y producing an edge map at the level i for the image Y;

(b4ii) aggregating the selected detail subbands for the image Y producing an edge map at the level N for the image Y; and (b4iii) aggregating the edge map at said each level i for the image Y with the edge map at the level N for the image Y.

5. The method of claim 4, wherein:

(a5) the step (a4iii) further comprises:

(a5i) multiplying the edge map at said each level i for the image X with a predetermined weight for the level i;

(a5ii) multiplying the edge map at the level N for the image X with a predetermined weight at the level N; and (a5iii) summing products resulting from the multiplying in the step (a5i) and a product resulting from the multiplying in the step (a5ii); and (b5) the step (b4iii) further comprises:

(b5i) multiplying the edge map at said each level i for the image Y with the predetermined weight for the level i;

(b5ii) multiplying the edge map at the level N for the image Y with the predetermined weight at the level N; and (b5iii) summing products resulting from the multiplying in the step (b5i) and a product resulting from the multiplying in the step (b5ii).

6. The method of claim 5, wherein:

(a6) the step (a4i) comprises:

(a6i) for said each level i, squaring each selected intermediate subband for the image X;

(a6ii) multiplying a result of the squaring performed in the step (a6i) with a predetermined weight for said each selected intermediate subband for the image X;

(a6iii) summing products resulting from the multiplying performed in the step (a6ii); (a6iv) applying a square root function to a result of the summing performed in the step (a6iii) producing the edge map at the level i for the image X;

(b6) the step (a4ii) comprises:

(b6i) squaring each said selected detail subband for the image X;

(b6ii) multiplying a result of the squaring performed in the step (b6i) with a predetermined weight for said each selected detail subband for the image X;

(b6iii) summing products resulting from the multiplying performed in the step (a6ii);

(b6iv) applying a square root function to a result of the summing performed in the step (a6iii) producing the edge map at the level N for the image X;

(c6) the step (b4i) comprises:

(c6i) for said each level i, squaring each selected intermediate subband for the image Y;

(c6ii) multiplying a result of the squaring performed in the step (c6i) with a predetermined weight for said each selected intermediate subband for the image Y;

(c6iii) summing products resulting from the multiplying performed in the step (c6ii);

(c6iv) applying a square root function to a result of the summing performed in the step (c6iii) producing the edge map at the level i for the image Y; and (d6) the step (b4ii) comprises:

(d6i) squaring each said selected detail subband for the image Y;

(d6ii) multiplying a result of the squaring performed in the step (d6i) with a predetermined weight for said each selected detail subband for the image Y;

(d6iii) summing products resulting from the multiplying performed in the step (d6ii);

(d6iv) applying a square root function to a result of the summing performed in the step (d6iii) producing the edge map at the level N for the image Y.

7. The method of claim 3, wherein the intermediate subbands at said each level i for the image X and the image Y include for each respective image:

level i-detail subbands and level i-wavelet packet (WP) subbands;

the level i-WP subbands comprising level i-WP approximation subbands and level i-WP detail subbands; and the level i-WP approximation subbands further comprising a level i-horizontal WP approximation subband, a level i-vertical WP approximation subband and a level i-diagonal WP approximation subband.

8. The method of claim 7, wherein:

(a8) the step (a2i) further comprises selecting one or more of the level i-WP approximation subbands and one or more of the detail subbands for the image X; and (b8) the step (b2i) further comprises selecting one or more of the level i-WP approximation subbands and one or more of the detail subbands for the image Y.

9. The method of claim 8, wherein:

(a9) the step (a8) further comprises including one or more of the level i-detail subbands for the image X in the selecting; and (b9) the step (b8) further comprises including one or more of the level i-detail subbands for the image Y in the selecting.

10. The method of claim 9, wherein:

(a10) the step (a2ii) further comprises:

(a10i) aggregating the level i-horizontal WP approximation subband for the image X at said each level i and the horizontal subband for the image X producing a horizontal edge map for the image X;

(a10ii) aggregating the level i-vertical WP approximation subband for the image X at said each level i and the vertical subband for the image X producing a vertical edge map for the image X;

(a10iii) aggregating the level i-diagonal WP approximation subband for the image X at said each level i and the diagonal subband for the image X producing a diagonal edge map for the image X; and (a10iv) aggregating the horizontal edge map, the vertical edge map and the diagonal edge map for the image X; and (b10) the step (b2ii) further comprises:

(b10i) aggregating the level i-horizontal WP approximation subband for the image Y at said each level i and the horizontal subband for the image Y producing a horizontal edge map for the image Y;

(b10ii) aggregating the level i-vertical WP approximation subband for the image Y at said each level i and the vertical subband for the image Y producing a vertical edge map for the image Y;

(b10iii) aggregating the level i-diagonal WP approximation subband for the image Y at said each level i and the diagonal subband for the image Y producing a diagonal edge map for the image Y; and (b10iv) aggregating the horizontal edge map, the vertical edge map and the diagonal edge map for the image Y.

11. The method of claim 10, wherein the level i-WP detail subbands for the image X and the image Y further comprise for each respective image, a level i-WP horizontal subband, a level i-WP vertical subband and a level i-WP diagonal subband and:

(a11) the step (a10i) further comprises including the level i-WP horizontal subband for the image X in the aggregating;

(b11) the step (a10ii) further comprises including the level i-WP vertical subband for the image X in the aggregating;

(c11) the step (a10iii) further comprises including the level i-WP diagonal subband for the image X in the aggregating;

(d11) the step (b10i) further comprises including the level i-WP horizontal subband for the image Y in the aggregating;

(e11) the step (b10ii) further comprises including the level i-WP vertical subband for the image Y in the aggregating; and (f11) the step (b10iii) further comprises including the level i-WP diagonal subband for the image Y in the aggregating.

12. The method of claim 10, wherein:

(a12) the step (a10iv) comprises:
  (a12) applying a square root function to the horizontal edge map, the vertical edge map and the diagonal edge map for the image X; and
  (b12) summing results of applying said square root function; and (b12) the step (b10iv) comprises:
  (a12) applying a square root function to the horizontal edge map, the vertical edge map and the diagonal edge map for the image Y; and
  (b12) summing results of applying said square root function.

13. The method of claim 11, wherein:

(a13) the step (a10iv) comprises:
  (a13i) summing the horizontal edge map, the vertical edge map and the diagonal edge map for the image X; and
  (a13ii) applying a square root function to result of the summing performed in the step (a13i); and (b13) the step (b10iv) comprises:
  (b13i) summing the horizontal edge map, the vertical edge map and the diagonal edge map for the image Y; and
  (b13ii) applying a square root function to result of the summing performed in the step (b13i).

14. The method of claim 1, wherein the steps (a1) and (b1) comprise applying an N level discrete wavelet transform (DWT).

15. The method of claim 14, wherein the discrete wavelet transform is a Haar transform.

16. The method of claim 14, wherein the discrete wavelet transform is one of a Newland transform, or wavelet transform using a Daubechies filter.

17. The method of claim 3, comprising one or more of the following:

(a17) at the step (a1):
  (a17i) for the level 1, applying the multiresolution decomposition to the image X producing intermediate subbands at the level 1 for processing at level 2; and
  (a17ii) for the level i, with i ranging from 2 to N, applying the multiresolution decomposition to one or more of the intermediate subbands produced by the multiresolution decomposition performed at the level i−1; and (b17) at the step (b1):
  (b17i) for the level 1, applying the multiresolution decomposition to the Image Y producing intermediate subbands at the level 1 for processing at level 2; and
  (b17ii) for the level i, with i ranging from 2 to N, applying the multiresolution decomposition to one or more of the intermediate subbands produced by the multiresolution decomposition performed at the level i−1.

18. The method of claim 2, wherein the approximation quality measure is an approximation quality map, and the edge quality measure is an edge quality map, and the step (g1) further comprises:

(a18) generating a contrast map, including assigning corresponding values to the pixels of the approximation subband and the edge map of the image X and the image Y according to their respective importance to human visual system;

(b18) performing weighted pooling of the approximation quality map using the contrast map to produce an approximation quality score;

(c18) performing weighted pooling of the edge quality map using the contrast map to produce an edge quality score; and (d18) combining the approximation similarity score from the step (b18) with the edge similarity score from the step (c18) to determine the measure of quality.

19. The method of claim 1, further comprising the step of determining N as a function of a minimum size of an approximation subband, S, which produces a substantially peak response for human visual system.

20. The method of claim 1, wherein:

(a20) the step (c1) comprises applying a structural similarity (SSIM) IQM to the approximation subband of the image X and the approximation subband of the image Y to produce an approximation SSIM map, $SSIM_A$;

(b20) the step (f1) comprises applying the SSIM IQM between the edge map of the image X and the edge map of the image Y to produce an edge SSIM map, $SSIM_E$; and (c20) the step (g1) comprises processing the $SSIM_A$ and the $SSIM_E$ to determine a $SSIM_{DWT}$ score as the measure of quality.

21. The method of claim 1, wherein:

(a21) the step (c1) comprises applying an Absolute Difference (AD) IQM to the approximation subband of the image X and the approximation subband of the image Y to produce an approximation AD map, $AD_A$;

(b21) the step (f1) comprises applying the AD IQM between the edge map of the image X and the edge map of the image Y to produce an edge AD map, $AD_E$; and (c21) the step (g1) comprises processing the $AD_A$ and the $AD_E$ to determine an $AD_{DWT}$ score as the measure of quality.

22. The method of claim 1, wherein:

(a22) the step (c1) comprises applying a peak-signal-to-noise ratio (PSNR) IQM to the approximation subband of the image X and the approximation subband of the image Y to produce a PSNR approximation quality score, $PSNR_A$;

(b22) the step (f1) comprises applying the PSNR IQM between the edge map of the image X and the edge map of the image Y to produce a PSNR edge quality score, $PSNR_E$; and (c22) the step (g1) comprises processing the $PSNR_A$ and the $PSNR_E$ to determine a $PSNR_{DWT}$ score as the measure of quality.

23. The method of claim 1, wherein:
(a23) the step (c1) comprises applying a Visual Information Fidelity (VIF) IQM to the approximation subband of the image X and the approximation subband of the image Y to produce a VIF approximation quality score, $VIF_A$;
(b23) the step (f1) comprises applying the VIF IQM between the edge map of the image X and the edge map of the image Y to produce a VIF edge quality score, $VIF_E$; and
(c23) the step (g1) comprises processing the $VIF_A$ and the $VIF_E$ to determine a $VIF_{DWT}$ score as the measure of quality.

24. The method of claim 2, wherein:
(a24) the step (a2) further comprises choosing the selected intermediate subbands at said each level i and the detail subbands for the image X, having substantially same resolution, for aggregating; and
(b24) the step (b2) further comprises choosing the selected intermediate subbands at said each level i and the detail subbands for the image Y, having substantially same resolution, for aggregating.

25. A system for determining a measure of quality for a distorted image Y, characterizing a similarity between the image Y and an undistorted reference image X, having the same number of rows and columns of pixels as the image Y, the system comprising:
a processor, and a computer readable storage medium having computer readable instructions stored thereon, which, when executed by the processor, form the following:
(a25) a first decomposition unit applying an N level multiresolution decomposition, comprising levels 1, 2, ... i, i+1, ... N, to the image X, to produce:
for each level i, with i ranging from 1 to N−1, intermediate subbands of image X for processing at level i+1; and
for the level N, an approximation subband containing main content of the image X and detail subbands containing edges of the image X;
(b25) a second decomposition unit applying said N level multiresolution decomposition, comprising levels 1, 2, ... i, i+1, ... N, to the image Y, to produce:
for each level i, with i ranging from 1 to N−1, intermediate subbands for image Y; and
for the level, N, an approximation subband containing main content of the image Y and detail subbands containing edges of the image Y;
(c25) an approximation quality measure unit applying an image quality metric (IQM) to the approximation subband of the image X and the approximation subband of the image Y to produce an approximation quality measure characterizing similarity between the main content of the image X and the main content of the image Y;
(d25) a first aggregation unit aggregating the intermediate subbands at the level i for the image X, with i ranging from levels 1 to N−1 and the detail subbands of the image X to produce an edge map of the image X characterizing the edges of the image X;
(e25) a second aggregation unit aggregating the intermediate subbands at the level i for the image Y, with i ranging from 1 to N−1 and the detail subbands of the image Y to produce an edge map of the image Y characterizing the edges of the image Y;
(f25) an edge quality measure unit applying the IQM between the edge map of the image X and the edge map of the image Y to produce an edge quality measure characterizing similarity between the edges of the image X and the edges of the image Y; and
(g25) a quality measure unit processing the approximation quality measure and the edge quality measure to determine the measure of quality.

26. The system of claim 25, wherein:
(a26) the first aggregation unit (d25) further comprises:
(a26i) a first selection unit selecting the intermediate subbands at each level i, with i ranging from 1 to N−1, and the detail subbands for the image X based on an accuracy to be achieved in determining the measure of quality; and
(a26ii) a first selective aggregation unit aggregating only selected intermediate subbands and selected detail subbands for the image X; and
(b26) the second aggregation unit (e1) further comprises:
(b26i) a second selection unit selecting the intermediate subbands at said each level i and the detail subbands for the image Y based on said accuracy to be achieved in determining the measure of quality; and
(b26ii) a second selective aggregation unit aggregating only selected intermediate subbands and selected detail subbands for the image Y.

27. The system of claim 26, wherein:
(a27) the first selection unit (a26i) further comprises a first selection sub-unit selecting the intermediate subbands at said each level i and the detail subbands for the image X based on a number of the intermediate and the detailed subbands required for achieving the accuracy; and
(b27) the second selection unit (b26i) further comprises a second selection sub-unit selecting the intermediate subbands at said each level i and the detail subbands for the image Y based on a number of the intermediate and the detailed subbands required for achieving the accuracy.

28. The system of claim 27, further comprising:
(a28) at the first selective aggregation unit (a26ii):
(a28i) a first level i-intermediate subbands aggregation unit aggregating, for said each level i, the selected intermediate subbands for the image X producing an edge map at the level i for the image X;
(a28ii) a first detail subbands aggregation unit aggregating the selected detail subbands for the image X producing an edge map at the level N for the image X; and
(a28iii) a first edge map determination unit aggregating the edge map at said each level i for the image X with the edge map at the level N for the image X; and
(b28) at the second selective aggregation unit (b26ii):
(b28i) a second level i-intermediate subbands aggregation unit aggregating, for said each level i, the selected intermediate subbands for the image Y producing an edge map at the level i for the image Y;
(b28ii) a second detail subbands aggregation unit aggregating the selected detail subbands for the image Y producing an edge map at the level N for the image Y; and
(b28iii) a second edge map determination unit aggregating the edge map at said each level i for the image Y with the edge map at the level N for the image Y.

29. The system of claim 28, wherein:
(a29) the first edge map determination unit (a28iii) further comprises a first computation unit for:
multiplying the edge map at said each level i for the image X with a predetermined weight for the level i;
multiplying the edge map at the level N for the image X with a predetermined weight for the level N; and summing products resulting from the multiplying the edge map at said each level for the image X and the multiplying the edge map at the level N for the image X;

(b29) the second edge map determination unit (b28iii) further comprises a second computation unit for:

multiplying the edge map at said each level i for the image Y with the predetermined weight for the level i;

multiplying the edge map at the level N for the image Y with the predetermined weight for the level N; and summing products resulting from the multiplying the edge map at said each level for the image Y and the multiplying the edge map at the level N for the image Y.

30. The system of claim 29, wherein:

(a30) the first level i-intermediate subbands aggregation unit (a28i) comprises a first level i-computation unit for:

squaring each selected intermediate subband for the image X for said each level i;

multiplying a result of the squaring with a predetermined weight for said each selected intermediate subband for the image X;

summing products resulting from the multiplying; and applying a square root function to a result of the summing producing the edge map at the level i for the image X;

(b30) the first detail subbands aggregation unit (a28ii) comprises a first detail subbands computation unit for:

squaring each said selected detail subband for the image X;

multiplying a result of the squaring with a predetermined weight for said each selected detail subband for the image X;

summing products resulting from the multiplying; and applying a square root function to a result of the summing producing the edge map at the level N for the image X;

(c30) the second level i-intermediate subbands aggregation unit (b28i) comprises a second level i-computation unit for:

squaring each said selected intermediate subband for the image Y for said each level i;

multiplying a result of the squaring performed with a predetermined weight for said each selected intermediate subband for the image Y;

summing products resulting from the multiplying;

applying a square root function to a result of the summing producing the edge map at the level i for the image Y; and (d30) the second detail subbands aggregation unit (b28ii) comprises a second detail subbands computation unit for:

squaring each said selected detail subband for the image Y;

multiplying a result of the squaring with a predetermined weight for said each selected detail subband for the image Y;

summing products resulting from the multiplying; and applying a square root function to a result of the summing producing the edge map at the level N for the image Y.

31. The system of claim 27, wherein the intermediate subbands at said each level i for the image X and the image Y include for each respective image:

level i-detail subbands and level i-wavelet packet (WP) subbands;

the level i-WP subbands comprising level i-WP approximation subbands and level i-WP detail subbands; and the level-WP approximation subbands further comprising a level i-horizontal WP approximation subband, a level i-vertical WP approximation subband and a level i-diagonal WP approximation subband.

32. The system of claim 31, wherein:

(a32) the first selection unit (a26i) further comprises a first WP-detail selection sub-unit selecting one or more of the level i-WP approximation subbands and one or more of the detail subbands for the image X; and (b32) the second selection unit step (b26i) further comprises a second WP-detail selection sub-unit selecting one or more of the level i-WP approximation subbands and one or more of the detail subbands for the image Y.

33. The system of claim 32, wherein:

(a33) the first WP-detail selection sub-unit (a32) further comprises a first detail-selection module including one or more of the level i-detail subbands for the image X in the selecting; and (b33) the second WP-detail selection sub-unit (b32) further comprises a second detail-selection module including one or more of the level i-detail subbands for the image Y in the selecting.

34. The system of claim 33, wherein:

(a34) the first selective aggregation unit (a26ii) further comprises:

(a34i) a first horizontal edge map unit aggregating the level i-horizontal WP approximation subband for the image X at said each level i and the horizontal subband for the image X producing a horizontal edge map for the image X;

(a34ii) a first vertical edge map unit aggregating the level i-vertical WP approximation subband for the image X at said each level i and the vertical subband for the image X producing a vertical edge map for the image X;

(a34iii) a first diagonal edge map unit aggregating the level i-diagonal WP approximation subband for the image X at said each level i and the diagonal subband for the image X producing a diagonal edge map for the image X; and (a34iv) a first combination unit aggregating the horizontal edge map, the vertical edge map and the diagonal edge map for the image X; and (b34) the second selective aggregation unit (b26ii) further comprises:

(b34i) a second horizontal edge map unit aggregating the level i-horizontal WP approximation subband for the image Y at said each level i and the horizontal subband for the image Y producing a horizontal edge map for the image Y;

(b34ii) a second vertical edge map unit aggregating the level i-vertical WP approximation subband for the image Y at said each level i and the vertical subband for the image Y producing a vertical edge map for the image Y;

(b34iii) a second diagonal edge map unit aggregating the level i-diagonal WP approximation subband for the image Y at said each level i and the diagonal subband for the image Y producing a diagonal edge map for the image Y; and (b34iv) a second combination unit aggregating the horizontal edge map, the vertical edge map and the diagonal edge map for the image Y.

35. The system of claim 34, wherein the level i-WP detail subbands for the image X and the image Y further comprise for each respective image, a level i-WP horizontal subband, a level i-WP vertical subband and a level i-WP diagonal subband; and (a35) the first horizontal edge map unit (a34i) further comprises a first horizontal sub-unit including the level i-WP horizontal subband for the image X in the aggregating;

(b35) the first vertical edge map unit (a34ii) further comprises a first vertical sub-unit including the level i-WP vertical subband for the image X in the aggregating;

(c35) the first diagonal edge map unit (a34iii) further comprises a first vertical sub-unit including the level i-WP diagonal subband for the image X in the aggregating;

(d35) the second horizontal edge map unit (b34i) further comprises a second horizontal sub-unit including the level i-WP horizontal subband for the image Y in the aggregating;

(e35) the second vertical edge map unit (b34ii) further comprises a second vertical sub-unit including the level i-WP vertical subband for the image Y in the aggregating; and (f35) the second diagonal edge map unit (b34iii) further comprises a second diagonal sub-unit including the level i-WP diagonal subband for the image Y in the aggregating.

36. The system of claim 34, wherein:
(a36) the first combination unit (a34iv) comprises a first combination sub-unit for:
applying a square root function to the horizontal edge map, the vertical edge map and the diagonal edge map for the image X; and
summing results of applying said square root function; and
(b36) the second combination unit (b34iv) comprises a second combination sub-unit for:
applying a square root function to the horizontal edge map, the vertical edge map and the diagonal edge map for the image Y; and
summing results of applying said square root function.

37. The system of claim 35, wherein:
(a37) the first combination unit (a34iv) comprises a third combination sub-unit for:
summing the horizontal edge map, the vertical edge map and the diagonal edge map for the image X; and
applying a square root function to result of the summing; and
(b37) the second combination unit (b34iv) comprises a fourth combination sub-unit for:
summing the horizontal edge map, the vertical edge map and the diagonal edge map for the image Y; and
applying a square root function to result of the summing.

38. The system of claim 25, wherein the first decomposition unit (a1) and the second decomposition unit (b1) comprise computational means for applying an N level discrete wavelet transform (DWT).

39. The system of claim 38, wherein the discrete wavelet transform is a Haar transform.

40. The system of claim 38, wherein the discrete wavelet transform is one of a Newland transform, or wavelet transform using a Daubechies filter.

41. The system of claim 27, comprising one or more of the following:
(a41) at the first decomposition unit (a25):
(a41i) a first level 1 decomposition unit applying the multiresolution decomposition to the image X producing intermediate subbands at the level 1 for processing at level 2;
(a41ii) a first level i decomposition unit applying the multiresolution decomposition to one or more of the intermediate subbands produced by the multiresolution decomposition performed at the level i−1, with i ranging from 2 to N;
(b41) at the second decomposition unit (b25):
(b41i) a second level 1 decomposition unit applying the multiresolution decomposition to the Image Y producing intermediate subbands at the level 1 for processing at level 2;
(b41ii) a second level i decomposition unit applying the multiresolution decomposition to one or more of the intermediate subbands produced by the multiresolution decomposition performed at the level i−1, with i ranging from 2 to N.

42. The system of claim 26, wherein the approximation quality measure is an approximation quality map, and the edge quality measure is an edge quality map, and the quality measure unit (g25) further comprises:
(a42) a contrast map unit generating a contrast map, including assigning corresponding values to the pixels of the approximation subband and the edge map of the image X and the image Y according to their respective importance to human visual system;
(b42) a first pooling unit performing weighted pooling of the approximation quality map using the contrast map to produce an approximation quality score;
(c42) a second pooling unit performing weighted pooling of the edge quality map using the contrast map to produce an edge quality score; and
(d42) a score combination unit combining the approximation similarity score from the step (b42) with the edge similarity score from the step (c42) to determine the measure of quality.

43. The system of claim 25, further comprising computational means for determining N as a function of a minimum size of the approximation subband, S, which produces a substantially peak response for human visual system.

44. The system of claim 25, wherein:
(a44) the approximation quality measure unit (c25) comprises an approximation SSIM map unit applying a SSIM IQM to the approximation subband of the image X and the approximation subband of the image Y to produce an approximation structural similarity (SSIM) map, $SSIM_A$;
(b44) the edge quality measure unit (f25) comprises an edge SSIM map unit applying the SSIM IQM between the edge map of the image X and the edge map of the image Y to produce an edge SSIM map, $SSIM_E$; and
(c44) the quality measure unit (g25) comprises a $SSIM_{DWT}$ score unit processing the $SSIM_A$ and the $SSIM_E$ to determine a $SSIM_{DWT}$ score as the measure of quality.

45. The system of claim 25, wherein:
(a45) the approximation quality measure unit (c25) comprises an approximation AD map unit applying an AD IQM to the approximation subband of the image X and the approximation subband of the image Y to produce an approximation AD map, $AD_A$;
(b45) the edge quality measure unit (f25) comprises an edge AD map unit applying the AD IQM between the edge map of the image X and the edge map of the image Y to produce an edge AD map, $AD_E$; and
(c45) the quality measure unit (g25) comprises an $AD_{DWT}$ score unit processing the $AD_A$ and the $AD_E$ to determine an $AD_{DWT}$ score as the measure of quality.

46. The system of claim 25, wherein:
- (a46) the approximation quality measure unit (c25) comprises a PSNR approximation quality score unit applying a PSNR IQM to the approximation subband of the image X and the approximation subband of the image Y to produce a PSNR approximation quality score, $PSNR_A$;
- (b46) the edge quality measure unit (f25) comprises a PSNR edge quality score determination unit applying the PSNR IQM between the edge map of the image X and the edge map of the image Y to produce a PSNR edge quality score, $PSNR_E$; and
- (c46) the quality measure unit (g25) comprises a $PSNR_{DWT}$ score unit processing the $PSNR_A$ and the $PSNR_E$ to determine a $PSNR_{DWT}$ score as the measure of quality.

47. The system of claim 25, wherein:
- (a47) the approximation quality measure unit (c25) comprises a VIF approximation quality score unit applying a VIF IQM to the approximation subband of the image X and the approximation subband of the image Y to produce a VIF approximation quality score, $VIF_A$;
- (b47) the edge quality measure unit (f25) comprises a VIF edge quality score determination unit applying the VIF IQM between the edge map of the image X and the edge map of the image Y to produce a VIF edge quality score, $VIF_E$; and
- (c47) the quality measure unit (g25) comprises a $VIF_{DWT}$ score unit processing the $VIF_A$ and the $VIF_E$ to determine a $VIF_{DWT}$ score as the measure of quality.

48. The system of claim 26, wherein:
- (a48) the first aggregation unit (a26) further comprises computational means for choosing the selected intermediate subbands at said each level i and the detail subbands for the image X, having substantially same resolution, for aggregating; and
- (b48) the second aggregation unit (b26) further comprises computational means for choosing the selected intermediate subbands at said each level i and the detail subbands for the image Y, having substantially same resolution, for aggregating.

49. A non-transitory computer readable storage medium, having computer readable program code instructions stored thereon, which, when executed by a processor, perform the following:
- (a49) applying an N level multiresolution decomposition, comprising levels 1, 2, . . . i, i+1, . . . N, to the image X, to produce:
  - for each level i, with i ranging from 1 to N−1, intermediate subbands of image X for processing at level i+1; and
  - for the level N, an approximation subband containing main content of the image X and detail subbands containing edges of the image X;
- (b49) applying said N level multiresolution decomposition, comprising levels 1, 2, . . . i, i+1, . . . N, to the image Y, to produce:
  - for each level i, with i ranging from 1 to N−1, intermediate subbands of image Y for processing at level i+1; and
  - for the level, N, an approximation subband containing main content of the image Y and detail subbands containing edges of the image Y;
- (c49) applying an image quality metric (IQM) to the approximation subband of the image X and the approximation subband of the image Y to produce an approximation quality measure characterizing similarity between the main content of the image X and the main content of the image Y;
- (d49) aggregating the intermediate subbands at the level i for the image X, with i ranging from levels 1 to N−1, and the detail subbands of the image X to produce an edge map of the image X characterizing the edges of the image X;
- (e49) aggregating the intermediate subbands at the level i for the image Y, with i ranging from 1 to N−1, and the detail subbands of the image Y to produce an edge map of the image Y characterizing the edges of image Y;
- (f49) applying the IQM between the edge map of the image X and the edge map of the image Y to produce an edge quality measure characterizing similarity between the edges of the image X and the edges of the image Y; and
- (g49) processing the approximation quality measure and the edge quality measure to determine the measure of quality.

\* \* \* \* \*

UNITED STATES PATENT AND TRADEMARK OFFICE
CERTIFICATE OF CORRECTION

PATENT NO. : 8,515,182 B2
APPLICATION NO. : 12/906112
DATED : August 20, 2013
INVENTOR(S) : Soroosh Rezazadeh et al.

It is certified that error appears in the above-identified patent and that said Letters Patent is hereby corrected as shown below:

In the Claims

Column 50, line 25, "similarity" should be deleted and should be replaced with -- quality --.

Column 50, line 25 and 26, "from the step (b18)" should be deleted.

Signed and Sealed this
Twenty-ninth Day of October, 2013

Teresa Stanek Rea
*Deputy Director of the United States Patent and Trademark Office*